(12) United States Patent
Krupke et al.

(10) Patent No.: US 10,060,173 B2
(45) Date of Patent: Aug. 28, 2018

(54) MULTIPLE SPEED PROFILES IN BARRIER OPERATOR SYSTEMS

(75) Inventors: Leroy G. Krupke, Carrollton, TX (US); Mark Kenneth Siegesmund, Brookfield, WI (US); Mark Raymond Wilzbach, McKinney, TX (US)

(73) Assignee: Overhead Door Corporation, Lewisville, TX (US)

( * ) Notice: Subject to any disclaimer, the term of this patent is extended or adjusted under 35 U.S.C. 154(b) by 0 days.

(21) Appl. No.: 13/477,620

(22) Filed: May 22, 2012

(65) Prior Publication Data

US 2012/0297681 A1 Nov. 29, 2012

Related U.S. Application Data

(60) Provisional application No. 61/519,579, filed on May 24, 2011.

(51) Int. Cl.

| | | |
|---|---|---|
| *E05F 15/60* | (2015.01) | |
| *E05D 15/06* | (2006.01) | |
| *E05D 15/38* | (2006.01) | |
| *F16B 7/04* | (2006.01) | |
| *E05F 15/684* | (2015.01) | |
| *E05F 15/70* | (2015.01) | |
| *E05F 15/77* | (2015.01) | |

(Continued)

(52) U.S. Cl.
CPC .......... *E05F 15/60* (2015.01); *E05D 15/0652* (2013.01); *E05D 15/38* (2013.01); *E05F 15/00* (2013.01); *E05F 15/603* (2015.01); *E05F 15/684* (2015.01); *E05F 15/70* (2015.01); *E05F 15/77* (2015.01); *F16B 7/0413* (2013.01); *F16B 7/0433* (2013.01); *E05Y 2201/656* (2013.01); *E05Y 2201/668* (2013.01); *E05Y 2201/672* (2013.01); *E05Y 2900/106* (2013.01); *F16B 7/042* (2013.01); *Y10T 16/379* (2015.01); *Y10T 29/49959* (2015.01)

(58) Field of Classification Search
CPC ......... E05F 15/18; E05F 15/60; E05F 15/684; E05F 15/77; E05F 15/70; E05F 15/1653; E05F 15/20; E05F 15/2076; E05F 15/603
USPC ..................... 49/197, 199
See application file for complete search history.

(56) References Cited

U.S. PATENT DOCUMENTS

| | | | | |
|---|---|---|---|---|
| 3,414,786 A | * | 12/1968 | Kasmer et al. | ............... 318/601 |
| 4,348,625 A | | 9/1982 | Sharp | |
| 4,510,266 A | * | 4/1985 | Eertink | ........................ 318/696 |

(Continued)

OTHER PUBLICATIONS

International Search Report for Co-Pending PCT Application No. PCT/US2012/038995 mailed Sep. 7, 2012.

*Primary Examiner* — Gregory J Strimbu
(74) *Attorney, Agent, or Firm* — Foley & Lardner LLP

(57) ABSTRACT

Barrier operator systems and methods of operation include a mechanical drive subsystem with a segmented and self-locking rail unit, rail mounting supports, belt and chain drive tensioning, and drive assembly carriage and interface; electronics and software routines for controlling operation of the various barrier operator functions; wall console communicating with the barrier operator; encryption and decryption of access codes; establishment and monitoring of travel limits and barrier speed and force profiles; thermal protection of barrier operator drive motors; and establishment and control of wireless communications from the barrier operator to accessories.

12 Claims, 36 Drawing Sheets

(51) Int. Cl.
  *E05F 15/603* (2015.01)
  *E05F 15/00* (2015.01)

(56) References Cited

U.S. PATENT DOCUMENTS

| | | | |
|---|---|---|---|
| 4,887,205 A | 12/1989 | Chou | |
| 4,959,598 A | 9/1990 | Yoshida et al. | |
| 5,040,332 A * | 8/1991 | Aquilina | E05F 15/59 49/200 |
| 5,872,513 A | 2/1999 | Fitzgibbon et al. | |
| 6,034,497 A | 3/2000 | Tamagawa et al. | |
| 6,118,243 A | 9/2000 | Reed et al. | |
| 6,172,475 B1 * | 1/2001 | Fitzgibbon | E05D 15/38 318/266 |
| 6,246,196 B1 | 6/2001 | Fitzgibbon et al. | |
| 6,640,494 B2 | 11/2003 | Hormann | |
| 6,690,796 B1 | 2/2004 | Farris et al. | |
| 6,710,560 B2 | 3/2004 | Fitzgibbon et al. | |
| 6,720,747 B1 | 4/2004 | Fitzgibbon et al. | |
| 7,176,647 B2 | 2/2007 | Parsadayan et al. | |
| 7,280,031 B1 | 10/2007 | Rodriguez et al. | |
| 7,382,063 B2 * | 6/2008 | Mullet et al. | 307/64 |
| 8,122,645 B2 | 2/2012 | Theile et al. | |
| 8,473,110 B2 * | 6/2013 | Leany et al. | 700/282 |
| 2003/0192254 A1 * | 10/2003 | Brookbank et al. | 49/199 |
| 2004/0006918 A1 * | 1/2004 | Fitzgibbon | 49/28 |
| 2004/0249513 A1 | 12/2004 | Anderson et al. | |
| 2005/0237013 A1 * | 10/2005 | Maslov et al. | 318/254 |
| 2006/0197481 A1 * | 9/2006 | Hotto et al. | 318/280 |
| 2006/0279399 A1 | 12/2006 | Chuey | |
| 2007/0001637 A1 | 1/2007 | Murphy et al. | |
| 2008/0299915 A1 | 12/2008 | Fink | |
| 2009/0315672 A1 | 12/2009 | Nantz et al. | |
| 2010/0107498 A1 * | 5/2010 | Ley | 49/199 |
| 2010/0217441 A1 * | 8/2010 | Eichman | F25D 29/00 700/275 |

* cited by examiner

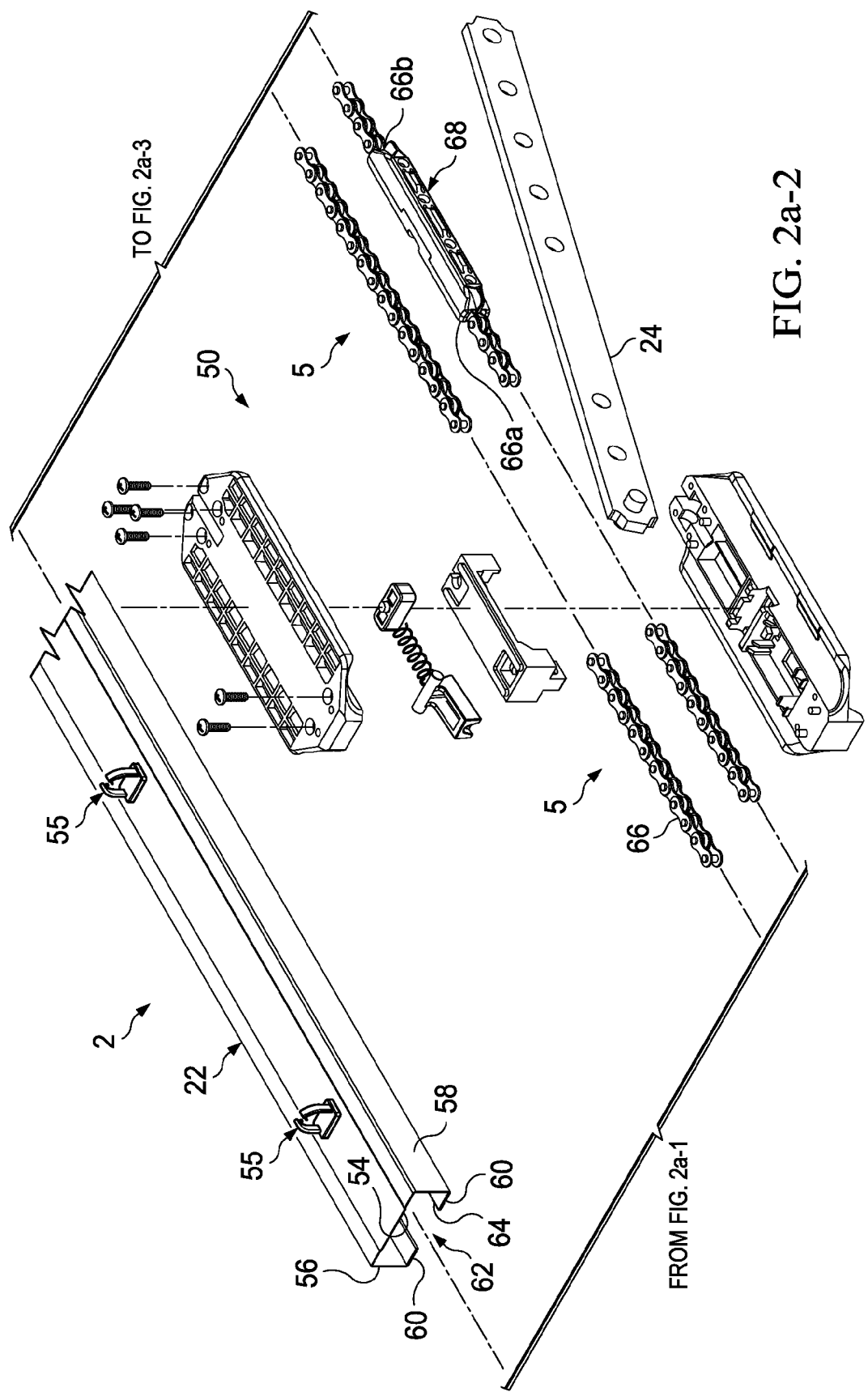

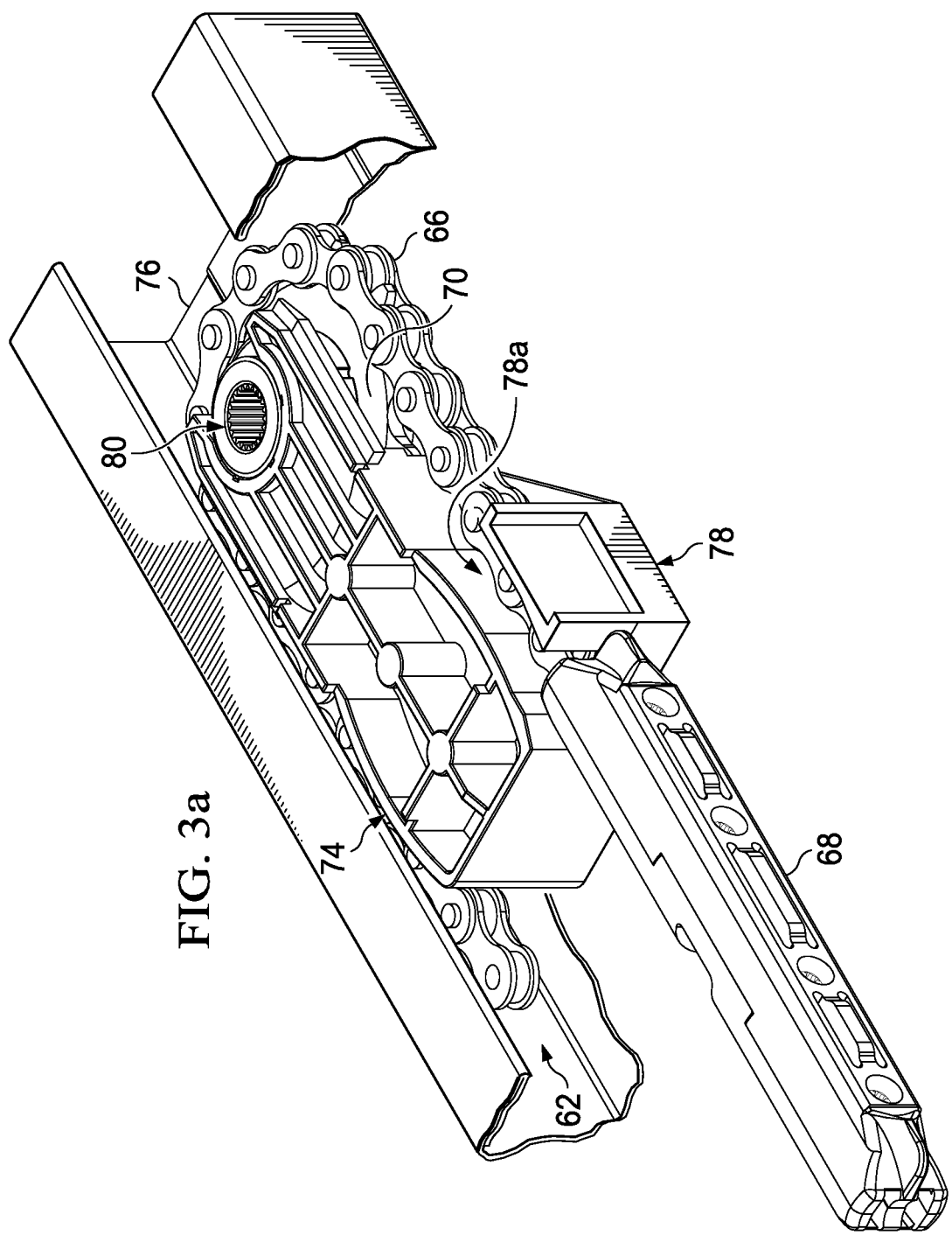

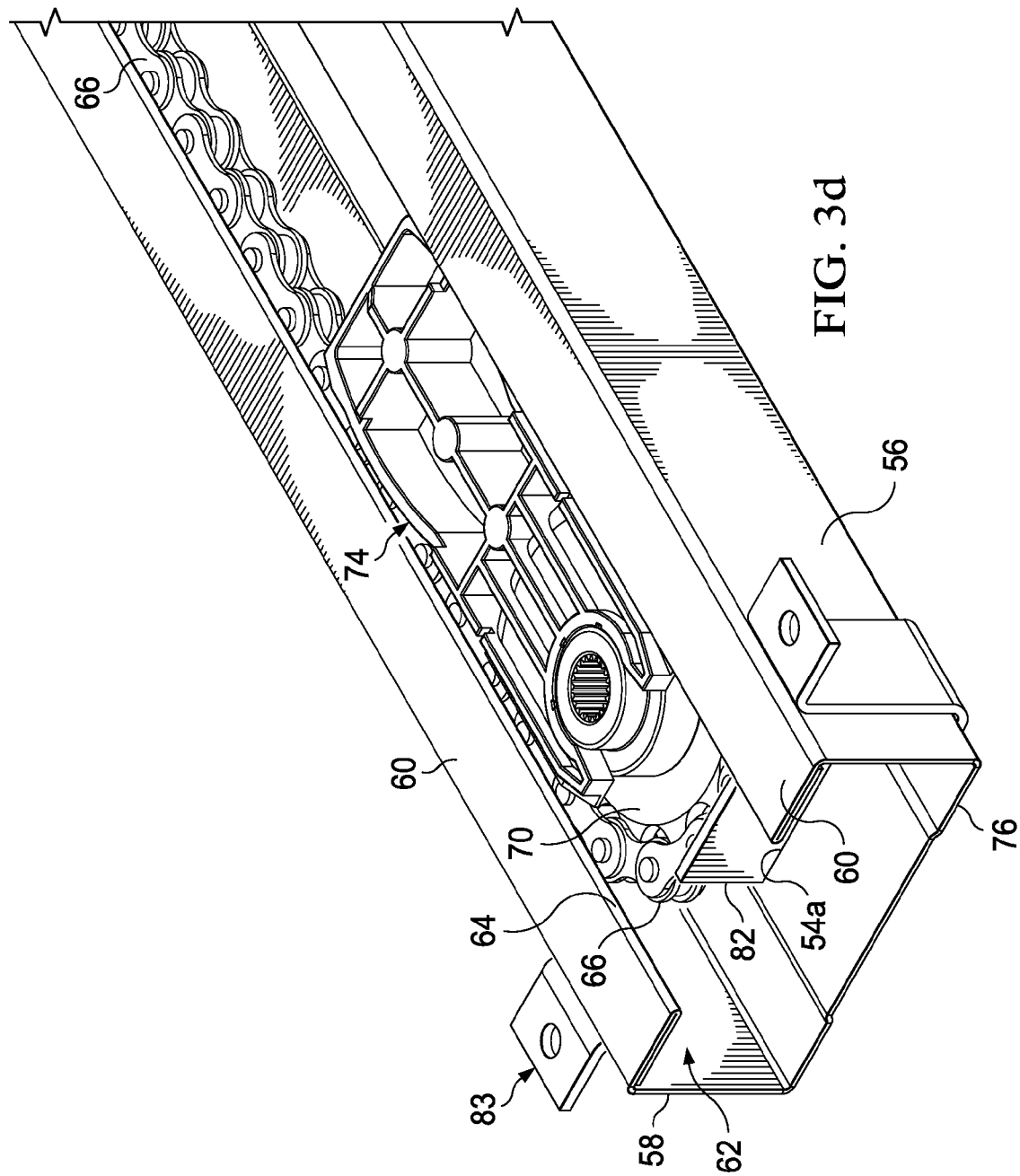

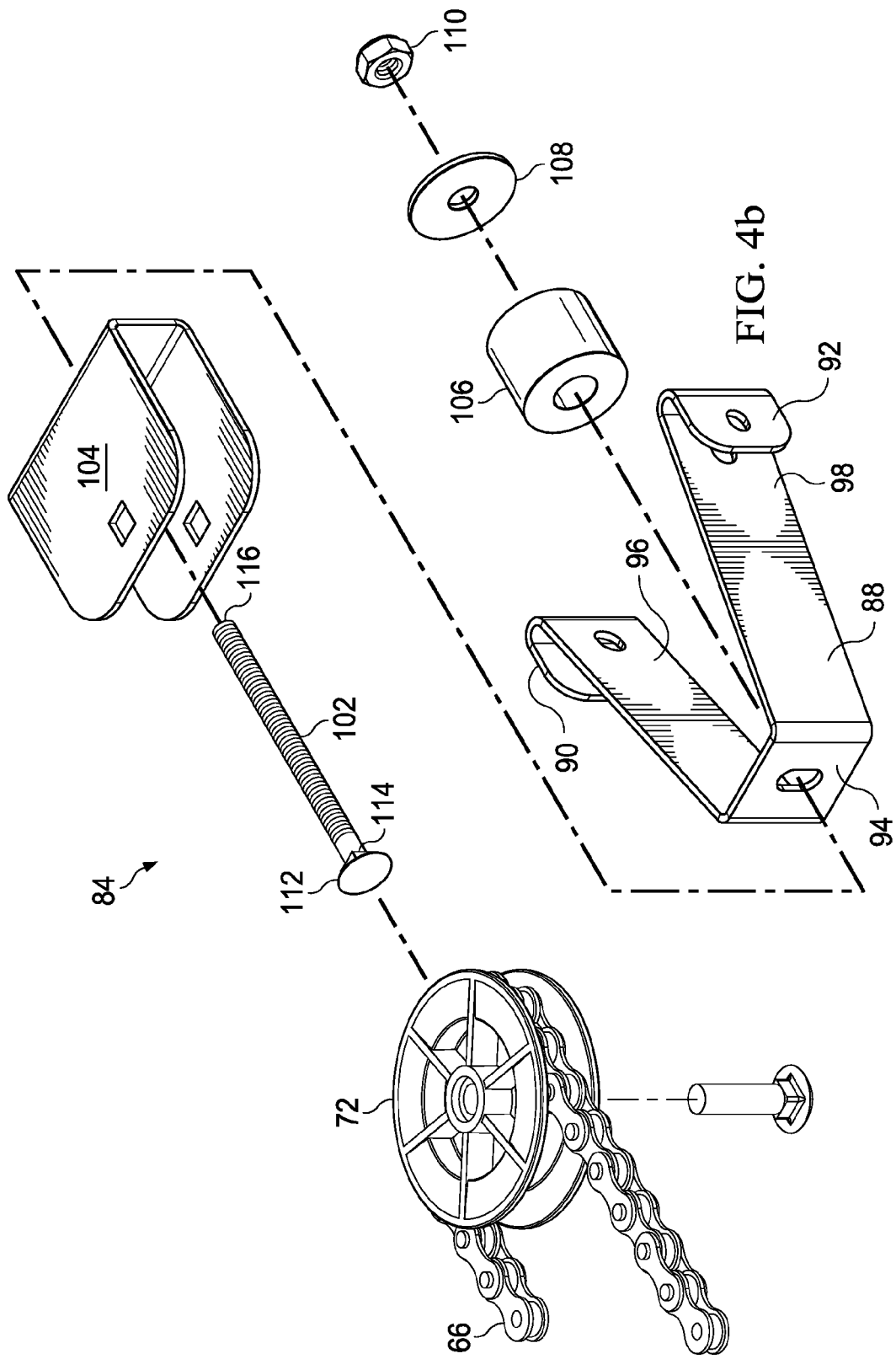

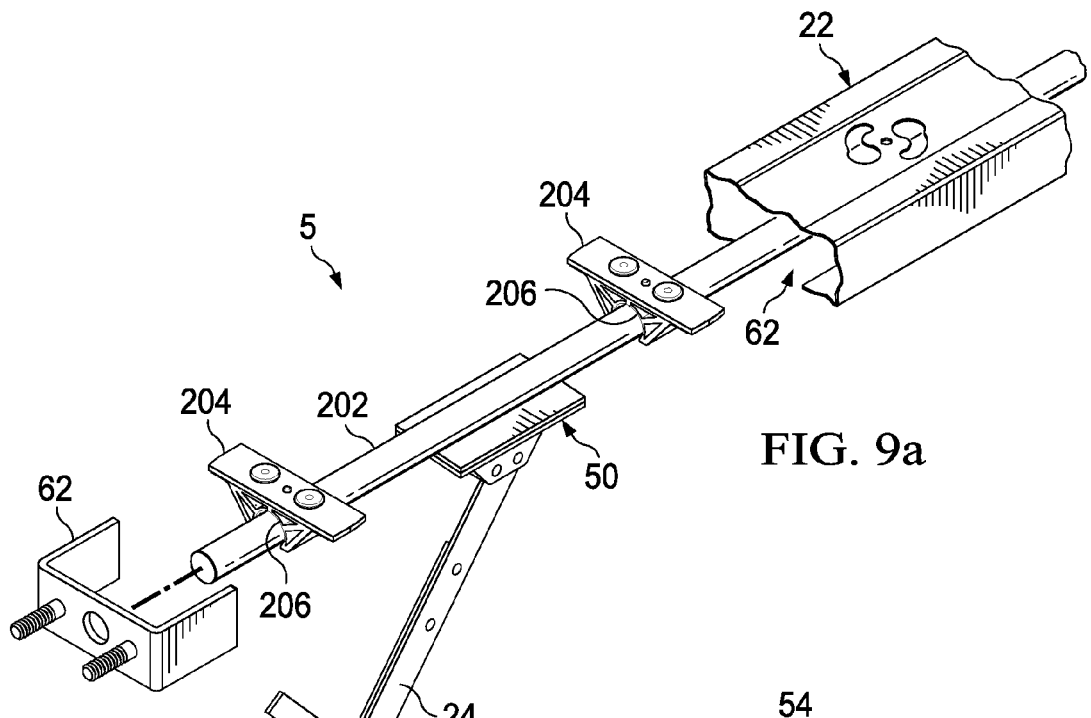
FIG. 9a
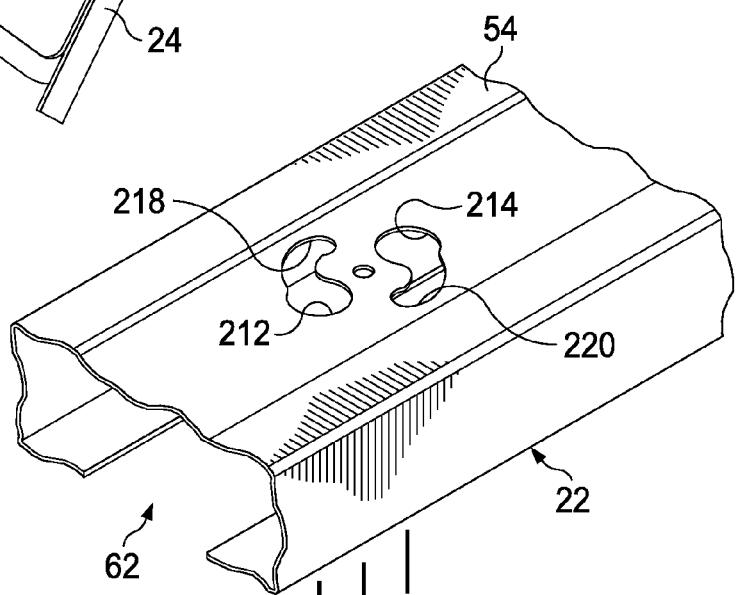
FIG. 9b
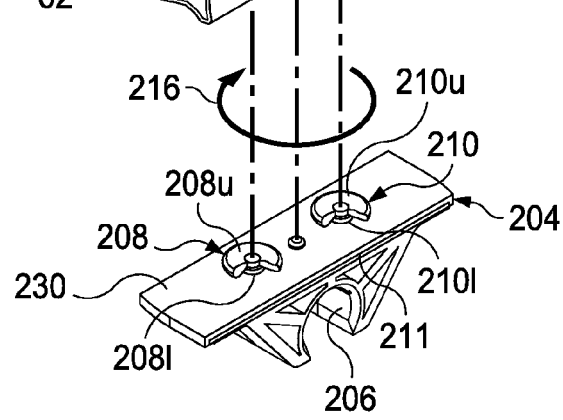

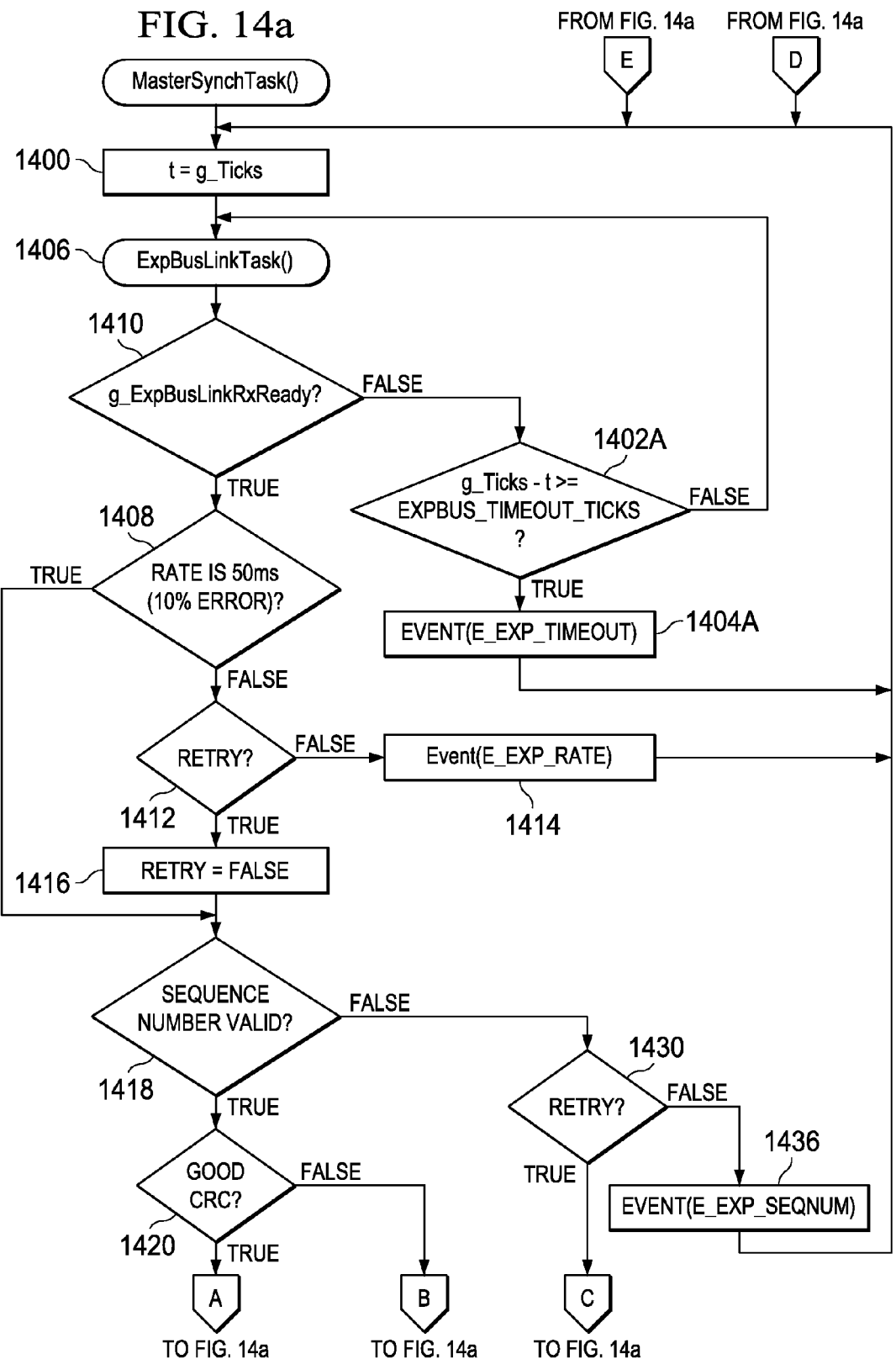

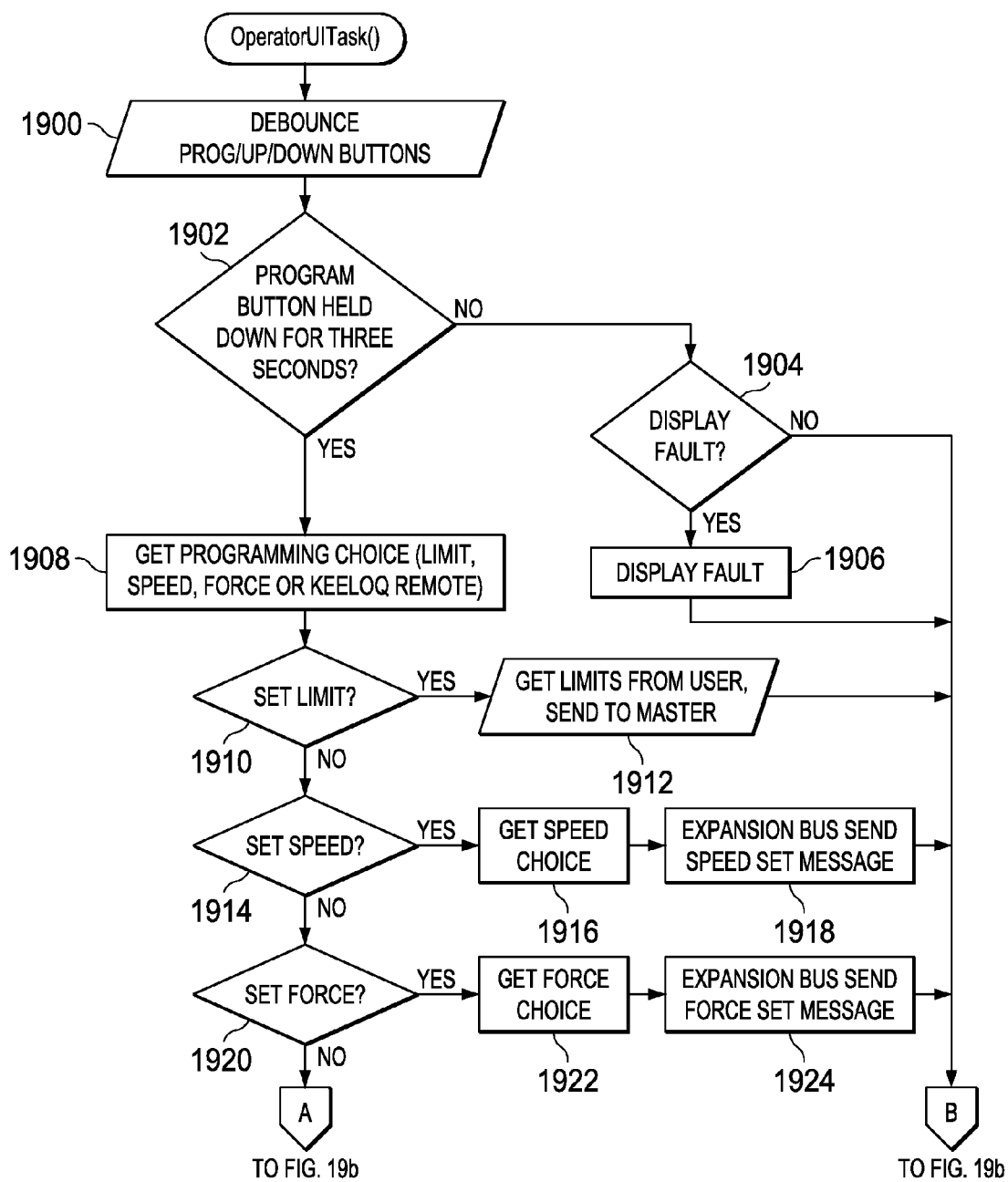

MULTIPLE SPEED PROFILES IN BARRIER OPERATOR SYSTEMS

PRIORITY CLAIM

This application claims priority from U.S. Provisional Application Ser. No. 61/519,579, filed on May 24, 2011, which is hereby incorporated herein by reference in its entirety.

TECHNICAL FIELD

The present invention relates generally to remotely controlled barrier operator systems for opening and closing garage doors, gates, and other barriers, and relates in particular to multiple profiles for opening and closing speeds.

BACKGROUND

Systems for controlling the movement of barriers, such as upward acting sectional or single panel garage doors, rollup doors, gates, and other types of motor operated barriers, utilize remotely controlled barrier operators for effecting the requisite control. The remote control of the barrier operator is typically provided by user-actuation of interior or exterior building mounted consoles, in wired or wireless communication with the barrier operator, as well as by remotely located hand held or vehicle mounted wireless transmitters, transmitting barrier movement commands, typically access code encrypted, to the barrier operator. A microprocessor or microcontroller based controller unit associated with the barrier operator receives and decrypts these encrypted commands, and based thereon, instructs an associated motor to respectively open, close, halt the travel of, or otherwise move, the barrier in accordance with the transmitted commands.

The wireless transmissions are typically in the form of radio frequency (RF) transmitted data packets, the data packets thereafter received by an appropriately tuned RF receiver associated with the barrier operator, where they are then decoded and processed by the barrier operator controller. A typical RF communication protocol now in use by the industry adopts code-hopping encryption of the access codes, sometimes referred to as "rolling codes", to prevent capture of the access codes by those not authorized to control the barrier operator.

Various drive assemblies are used to move the garage door or other barrier in accordance with the instructed operation. For example, it is typical in garage door installations for an AC or DC motor to reciprocatingly drive a coupled screw, belt or chain to correspondingly move a carriage interconnected with the garage door back and forth along a building mounted rail, thereby moving the door in the respectively instructed direction. The barrier operator, directing the motor shaft to turn in one direction or the other, thus causes the door to be moved by the drive assembly along a pair of oppositely disposed curved tracks between a fully vertical (closed) position and a fully horizontal (open) position. A large compression spring, along with associated pulleys and trained cables connected to the door, provide assistance to the door opening and closing operations.

Various techniques are also known to those of ordinary skill in the art for electronically setting the open and close travel limits of the carriage as well as electronically establishing the force sensitivity limits. The electronically set force sensitivity limits determine the upper limits of the force to which the door can be subjected as it travels along its path before there is an indication of an obstruction. Exceeding these limits then typically results in either the stoppage, or the stoppage and reversal, of the motor (and thus the door travel), respectively depending upon the door's then existing direction of travel.

While the past years have witnessed increased sophistication in the design and operation of these barrier operator systems, the present systems are not entirely satisfactory for all conditions of service. Consequently, it is the principal object of the herein described inventions to provide such improvements and additions to existing barrier operator systems, particularly in the area of a new and improved mechanical drive sub-system as well as to the electronics and software controls thereof, so as to provide improved operating characteristics of the resulting systems.

SUMMARY

For example, significant improvement to the mechanical drive sub-system of the barrier system of the present invention includes, inter alia, a uniquely segmented and self locking rail upon which the carriage travels, improved rail mounting, modified drive screw supports, more efficient tensioning of the belt and chain drives, and a new and improved redesign of the drive assembly's carriage and its interaction with other components of the drive assembly.

Significant improvements to the electronics and software control throughout the barrier operator system have been made. For example, the remotely positioned wall console in the interior of the garage has a plurality of buttons or other user-operated control mechanisms for respectively initiating different operations of the barrier operator, the respective operations differentiated by signals of respectively different frequencies. Moreover, wireless transmissions, whether from hand-held or vehicle mounted transmitters or from wall mounted consoles, use uniquely different encryption protocols or methodologies, but are uniquely able to be processed by the same barrier operator. The barrier operator controller also comprises multiple microprocessors serving as mutual safety checks on the other, as well as attending to their respectively different assigned functions.

The establishment of the force sensitivity limits in the barrier operator system of the present invention is carried out by the creation of unique force sensitivity threshold profiles using offsets of increased value in the form of a stepped configuration. These profiles are generated during the "learn" mode of the operator, and when the door is moved between its "open" and "close" position. Provision is made for the user to increase or decrease, within a limited range, the force sensitivity threshold levels. The force sensitivity threshold profiles are then used during the "operate" mode of the barrier operator to detect obstructions.

For barrier operator system versions utilizing a DC motor, thermal protection of the DC motor is carried out without the use of a thermal sensor by the use of a unique algorithm that correlates motor temperature as a function of multiple factors, including motor load and running time of the motor. A novel arrangement is also provided to enable user selection between "good", "better", "best" speed profiles.

BRIEF DESCRIPTION OF THE DRAWINGS

Additional features of the invention, as well as more details thereof, and the overall improved barrier operator system of the present invention, will become readily apparent from a review of the following detailed description, taken in connection with the appended drawings, in which:

FIGS. 2a-1 through 2a-3 are exploded views of the barrier operator mechanical drive sub-system shown in FIG. 1, in which a rail assembly and a drive assembly chain drive are employed to advantage, and constructed in accordance with the principles of the present invention;

FIGS. 3a through 3d are illustrations of a bottom side of a drive mount and a return pulley disposed within the rail assembly depicted in FIGS. 2a-1 through 2a-3, and constructed in accordance with the principles of the present invention;

FIGS. 4a and 4b are illustrations of a tensioning system of the barrier operator drive assembly of FIG. 1, constructed in accordance with the principles of the present invention;

FIGS. 9a and 9b are illustrations of a portion of the rail of the barrier operator drive assembly shown in FIG. 1, in which a screw drive is employed to advantage, and constructed in accordance with the principles of the present invention;

FIGS. 14a and 14b are flow diagrams illustrating a master synchronization process carried out by the secondary microcontroller of the controller unit of FIG. 10;

FIGS. 19a and 19b are flow diagrams illustrating an operator user interface task carried out by the secondary microcontroller of the controller unit of FIG. 10.

Figure 1:
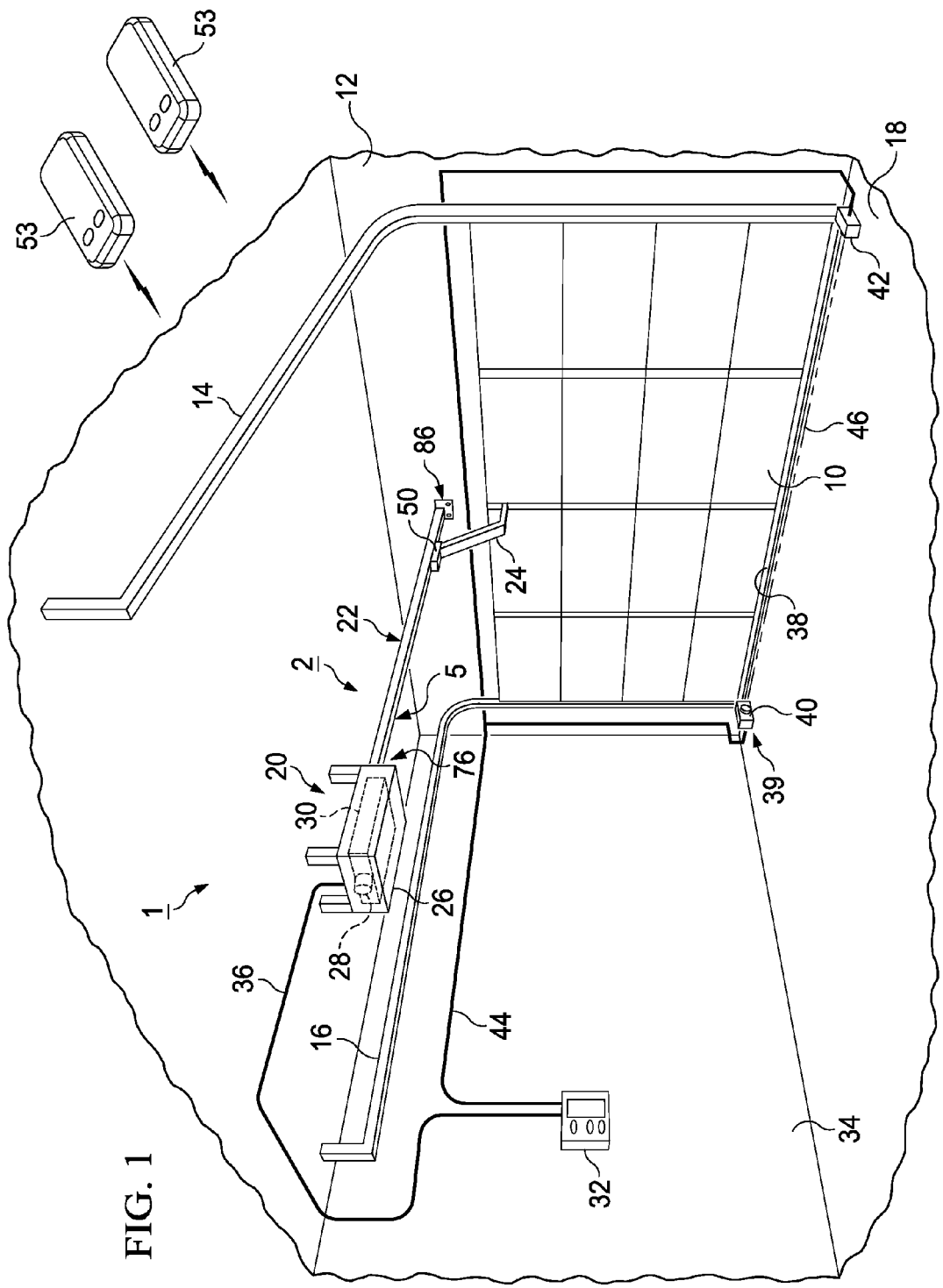
FIG. 1 is a broad perspective view of a garage door installation, illustrating the major components of a barrier operator system for moving the garage door.

In the following detailed description, like elements are marked throughout the specification and drawings with the same reference numerals, respectively. The drawing figures are not necessarily to scale and certain elements are shown in generalized or schematic form in the interest of clarity and conciseness. It should be understood that the embodiments of the disclosure herein described are merely illustrative of the principles of the invention.

DETAILED DESCRIPTION

Referring initially to FIG. 1, there is illustrated a garage door installation including a barrier operator system 1 for moving a barrier, which in this example is an upward acting sectional garage door 10. The door is movable along opposed sets of guide tracks 14 and 16 between a lowermost closed position, as shown, covering an opening in a wall 12, and an upwardmost open position, in which the door 10 would be parallel to the floor 18. In its closed position, the door 10 would typically be in sealing engagement with the floor 18 or at least in close proximity to such surface. Barrier operator 20 is disposed within a housing or head unit 26 and includes (i) an antenna and RF receiver unit (not shown) for receiving wireless transmissions and a (ii) microcontroller based controller unit 30 for, among other functions, processing the incoming wired and wireless transmitted door commands, and generating motor control signals corresponding to such commands to a DC or AC motor 28. As subsequently described in greater detail, and in accordance with a feature of the present invention, the controller unit 30 preferably comprises multiple microcontrollers under respective software control.

Specifically encrypted RF transmissions emanate from hand held (or vehicle mounted) transmitters 53 representing door commands to the barrier operator 20. Commands can also be transmitted from an interior wall mounted console 32, and/or an exterior wall mounted keyless entry console (not shown). The barrier operator 20 may be similar, for example, to that described in U.S. Pat. No. 6,118,243, issued Sep. 12, 2000 to Reed et al., assigned to the assignee of the present invention and incorporated herein by reference for all purposes, but having the hereinafter described additions, modifications and features.

The barrier operator system 1 additionally includes a mechanical drive sub-system 2, the novel details of which are subsequently described, and generally comprises as its major components, (i) an elongated beam or rail assembly 22 connected at one end 86 to wall 12 and at its opposite end 76 to the barrier operator head unit or housing 26; (ii) a drive assembly 5, which can be a reciprocatingly driven drive belt or chain or a rotatably driven screw drive, supported by the rail assembly 22, and (iii) a carriage 50 operably connected to the drive assembly 5. The carriage 50 is disconnectably engageable with an arm 24 which, in turn, is firmly connected to the door 10. Accordingly, motor 28, under control of the barrier operator 20, drives the belt, chain or rotatable screw in one direction or the other, consequently transporting the carriage 50 to respectively raise (open) or lower (close) the door 10. A compression spring and trained cables assembly (not shown) is connected with the door so as to aid the opening and closing of the garage door, in the manner well known to those of ordinary skill in the art.

The wall console 32 is supported on one of the internal sidewalls 34 and enables communication with the barrier operator 20 to provide user-instituted instructions to the controller 30. These instructions are initiated by the depression of different buttons on the console initiating signal communications to the barrier operator 20 respectively representing, for example, door movement commands, worklight instructions, and vacation lock mode (set or release). Additional details regarding this operation are subsequently described. The signal communications from console 32 are transmitted to the barrier operator either by way of hardwire conductor means 36, as shown, or alternatively by wireless communication. In similar manner, a keyless entry console (not shown) is in wired or wireless communication with the barrier operator 20 and similarly enables user-instructed instructions to the controller 30.

Figure 10:
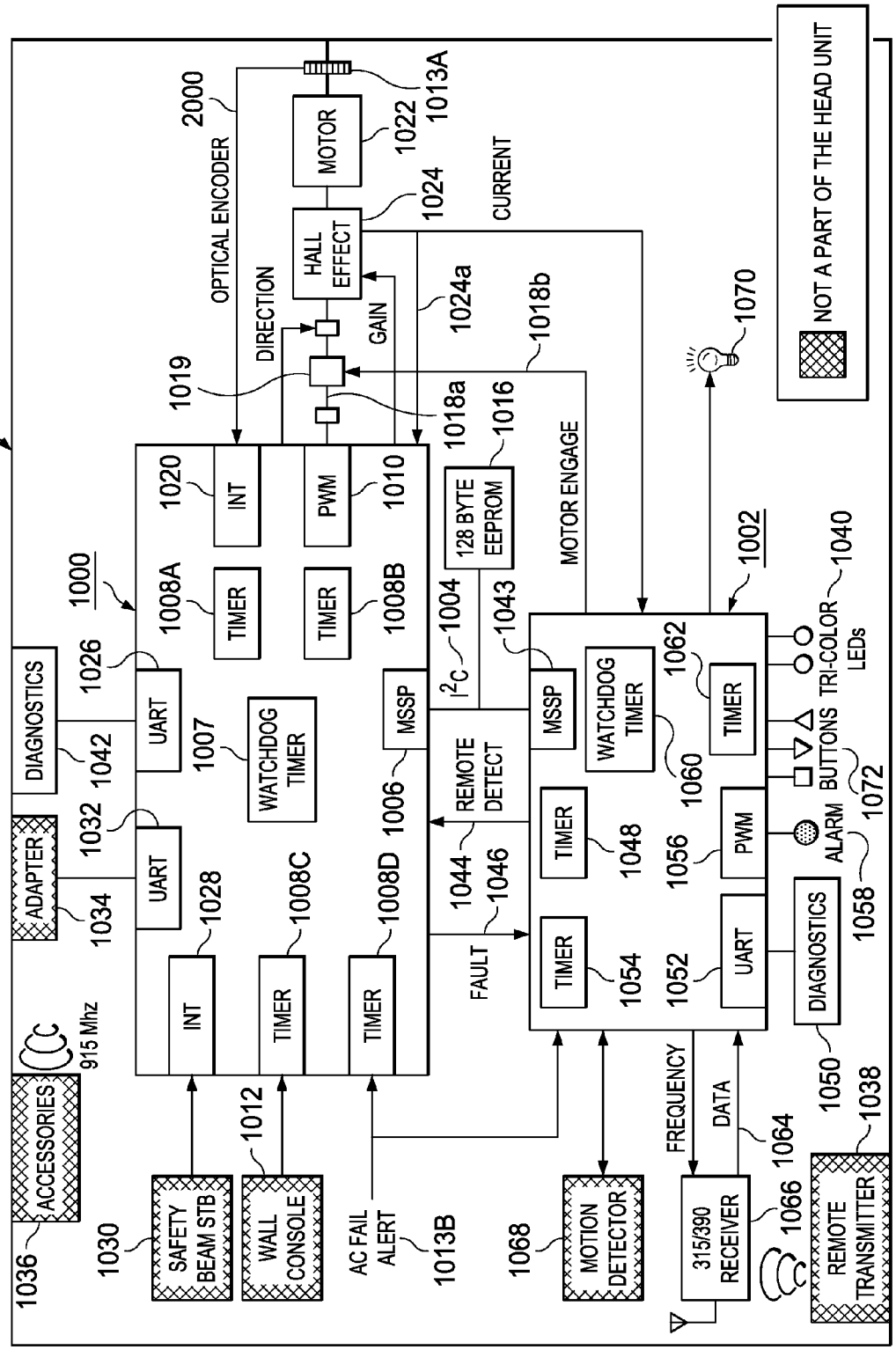
FIG. 10 is a schematic block diagram of a preferred embodiment of the controller unit of the barrier operator system depicted in FIG. 1, in accordance with the principles of the present invention.

The barrier operator system 1 illustrated in FIG. 1 may also include one or more types of external entrapment devices, well known to those of ordinary skill in the art, for detecting and effecting a response to obstructions that may be encountered by the door 10 as it is being closed. A first type of such device is disclosed as an elongated sensor strip 38 that is mounted on the lower edge of the door 10 and is operable, upon engagement with an obstruction in the doorway, to transmit a signal to the controller 30 to halt the downward movement of the door, typically followed by its return to the open position. A second type of external entrapment device may be an optical assembly 39 comprising an optical beam transmitter 40, typically of the infrared type, disposed on one side of the doorway opening, and a receiver 42 disposed on the opposite side of such opening and positioned to receive the beam 46 from the transmitter 40. This assembly, often referred to as a safety beam or STB, is operable to transmit a signal to the controller 30 to halt the downward movement of the door whenever an obstruction in the doorway opening interrupts the beam 46, and is illustrated in FIG. 10 as item 1030. Either one, or both, of these external entrapment devices may be used with an internal entrapment approach which is based upon the sensing of a change in motor operation characteristics (e.g., increased torque) due to the engagement of an obstruction, the details of which are subsequently described.

Barrier Operator Mechanical Drive Sub-System

Figures 1, 2A:
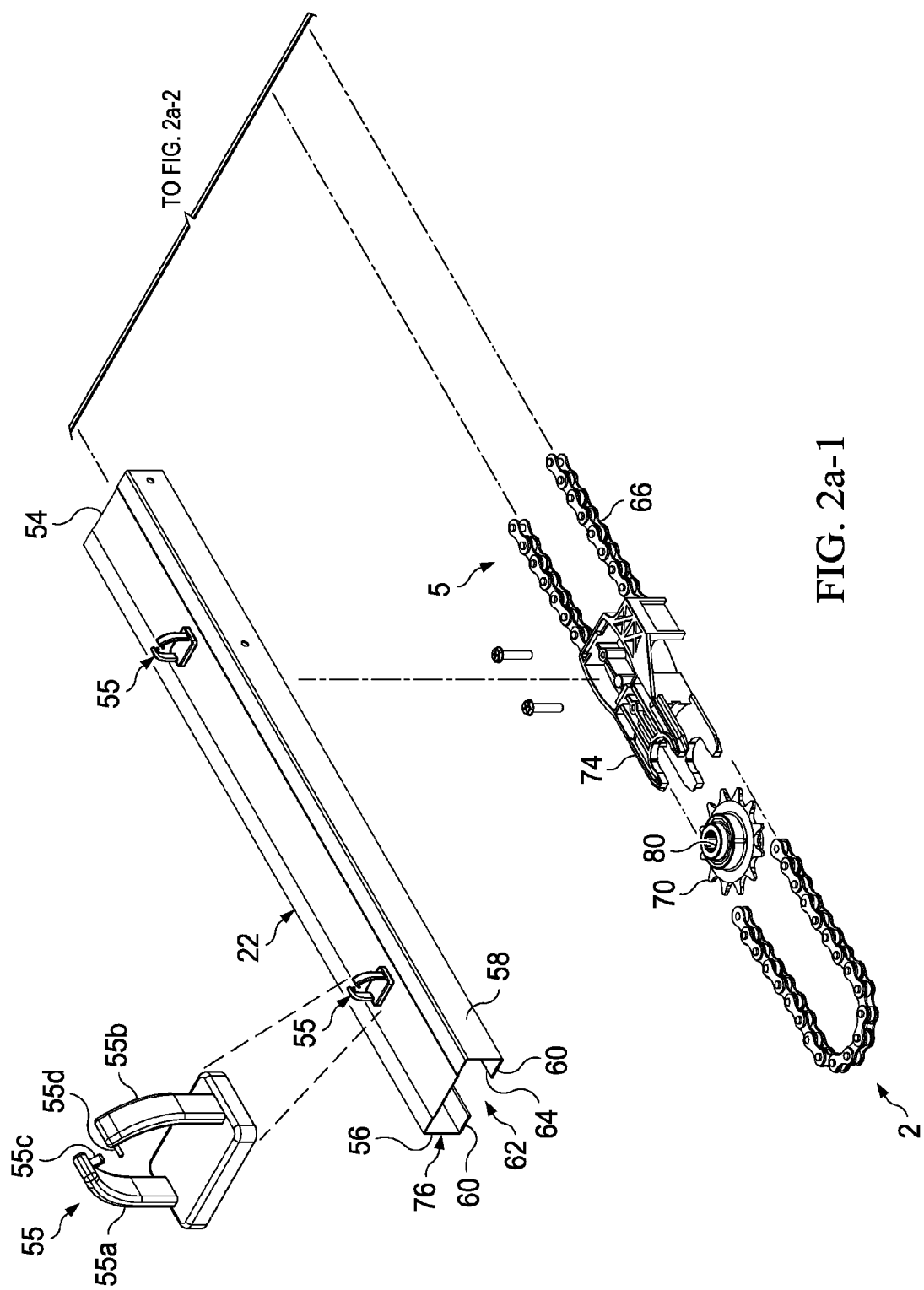

Referring to FIGS. 2a-1 through 9b, there is now described preferred embodiments of new and improved versions of the barrier operator mechanical drive sub-system 2 constructed and operating in accordance with the principles of the present invention. Accordingly, elongated rail assembly 22 is configured to receive a belt or chain drive assembly 5 (for exemplary purposes, shown in the drawings as a chain drive 66 in the initial views of FIG. 2a-1 through FIG. 5). Specifically, and as seen in FIG. 2a-1, the elongate rail assembly 22 has a top wall 54, a pair of sidewalls 56 and 58, extending wall portions 60 opposite top wall 54, and a channel 62 formed to receive the drive mechanism 5. Wall portions 60 define a longitudinal slot 64 disposed along the length of rail assembly 22 forming an opening to provide insertion of, and access to, the barrier operator drive assembly 5, and enables the arm 24 (FIG. 1) to extend through the rail 22 for connection to door 10.

Referring specifically to FIGS. 2a-1 through 2a-3, the barrier operator drive system 2 further includes the carriage 50, a drive sprocket 70, a return pulley 72, and an endless drive chain 66 having ends 66a and 66b connected via a bullet member 68 (FIGS. 2a-2 and 7a-7d) to enable the endless drive chain 66 to be wrapped and/or otherwise trained around drive sprocket 70 on one end and return pulley 72 on the other end. In operation, and as subsequently described in more detail, motor 28 turns sprocket 70, which in turn causes movement of carriage 50, and thus movement of door 10. As previously mentioned, while the drive assembly 5 is illustrated in FIGS. 2a-1 through 2a-3 as an endless chain 66, it should be understood that as an endless drive, it can alternatively comprise other items, for example a belt.

Referring to FIGS. 2a-1, 3a and 3b, a drive mount member 74 is illustrated mounted within channel 62 at rail end 76 to rotatably support drive sprocket 70. Drive sprocket 70 includes a centralized opening 80 shaped to receive the output drive shaft (not illustrated) from motor 28 (FIG. 1) so that the rotation of the output drive shaft correspondingly rotates the drive sprocket 70 for reciprocal translation of the chain 66. Preferably, drive mount member 74 is secured within channel 62 via bolts 74a (FIG. 3b), which extend through rail top wall 54 and into corresponding openings (not illustrated) disposed on drive mount member 74.

Figures 2, 2A, 3:
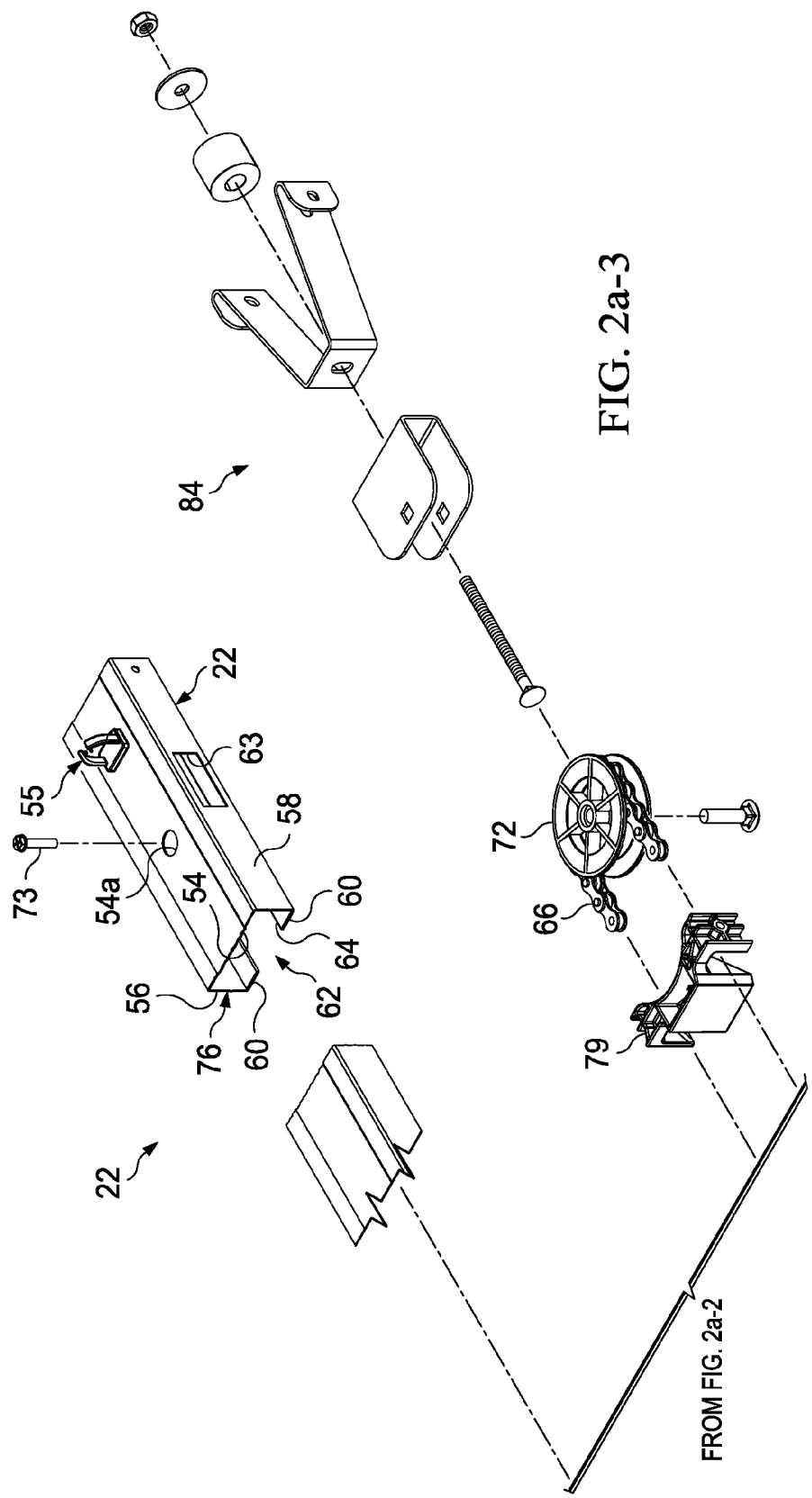
Figure 3B:
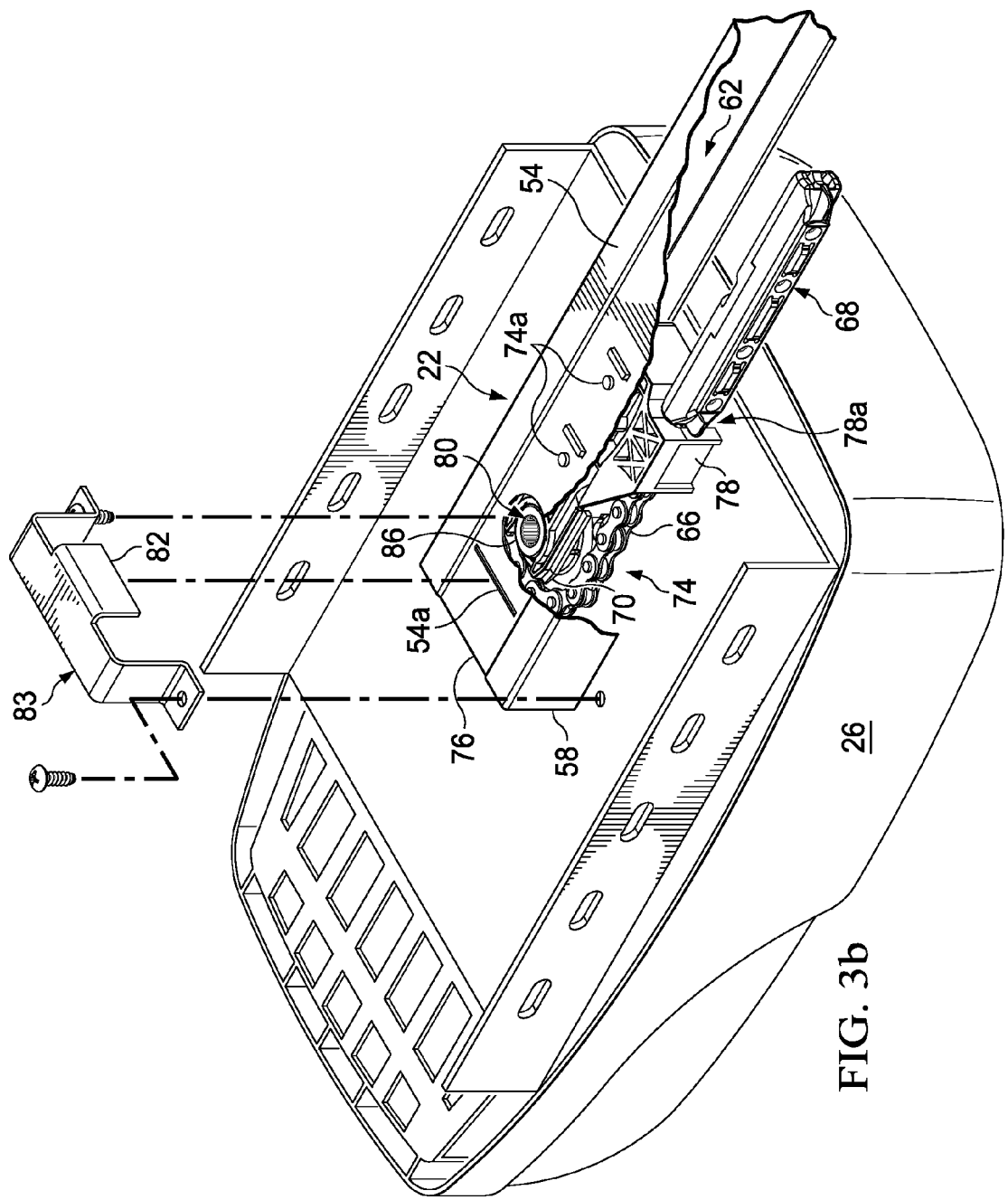
Figure 3C:
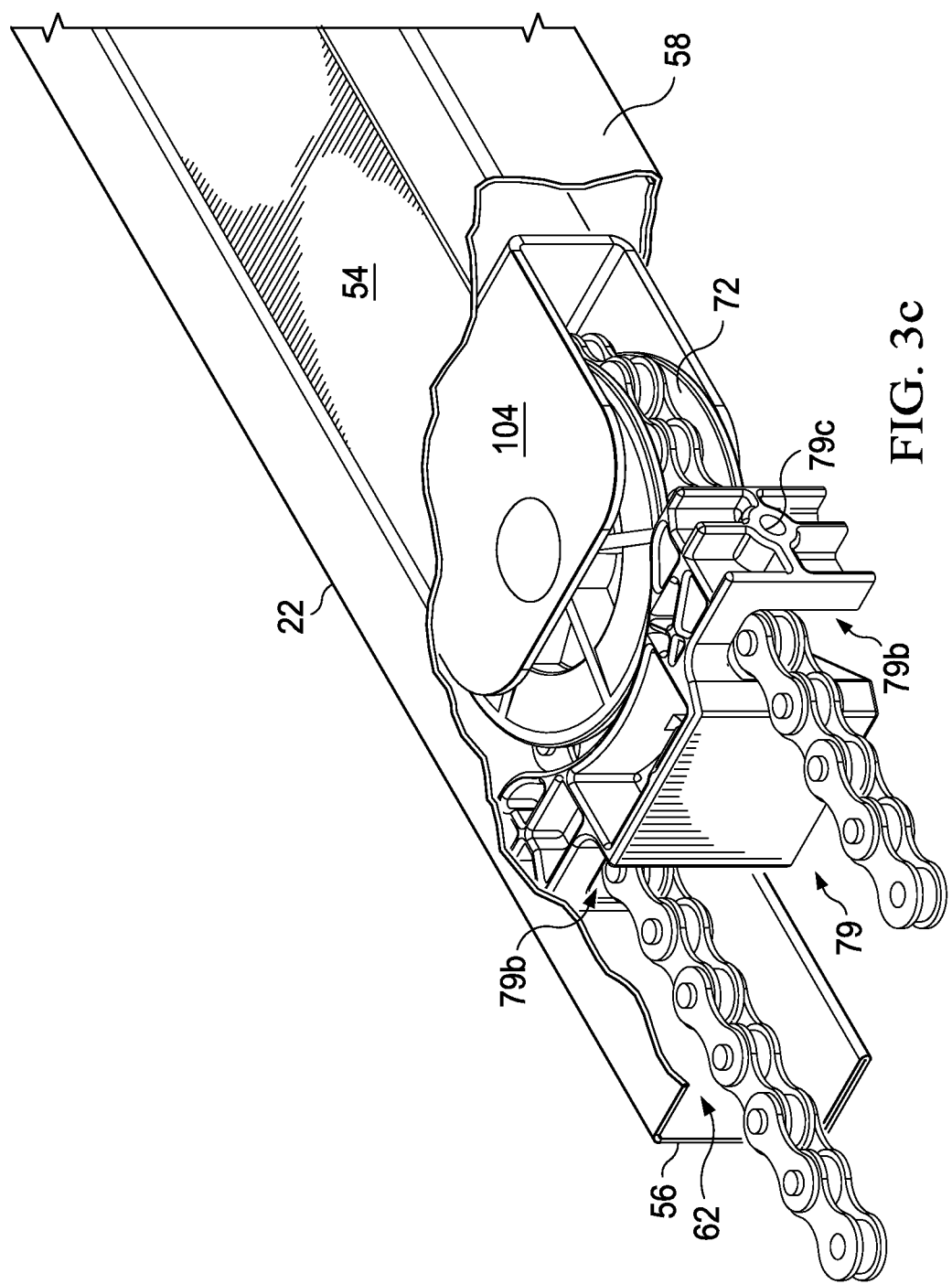

In the embodiment depicted in FIGS. 3a-3d, a bullet stop 78 is integrally formed with mount 74 and includes a slot 78a large enough to enable chain drive element 66 to fit therein while small enough to prevent entry of bullet 68 (FIGS. 3a & 3b). Similarly, a stop 79 is coupled to rail 22 (FIG. 3c) and disposed adjacent to return pulley 72 and includes slots 79b which are large enough to permit endless chain drive 66 to fit therein while small enough to prevent entry of bullet 68. Preferably, stop 79 is disposed within channel 62 and secured to sidewalls 56 and 58 via a pair of screws (see FIG. 8c illustrating screw 22c). In particular, each screw is inserted through an opening on each respective sidewall 56 and 58 and into respective openings 79c (FIG. 3c) on each side of stop 79 to prevent movement of stop 79 relative to elongate rail 22. Thus, as bullet 68 moves within channel 62, stop members 78 and 79 function to prevent over-travel of carriage 50 and/or bullet 68 (i.e., crashing into sprocket 70 and/or return pulley 72) and thus avoid potentially damaging portions of the barrier operator drive assembly.

Referring specifically to FIGS. 3b and 3d, drive mount 74 is disposed within channel 62 such that the outer diameter of drive sprocket 70 is disposed near a rail tab 82. Rail tab 82 is spaced apart from drive sprocket 70 a distance slightly larger than the thickness of endless chain drive 66 so as to enable unimpeded movement of chain 66 while also preventing separation of the chain 66 from the drive sprocket 70 in the event of loss of tension on drive element 66.

As illustrated in FIGS. 3b and 3d, rail tab 82 is inserted through a rail opening 54a and extends from a dual purpose bracket member 83, which is also used to secure rail assembly 22 to operator housing or head 26 (as best seen in FIG. 3b). In the embodiment illustrated in FIG. 3b, dual purpose bracket member 83 is formed to overlay rail assembly 22 and attach directly to operator housing or head 26.

Alternatively, rail tab 82 can be formed integral with rail 22 such that tab 82 extends perpendicularly from top wall 54 into channel 62.

Figure 4A:
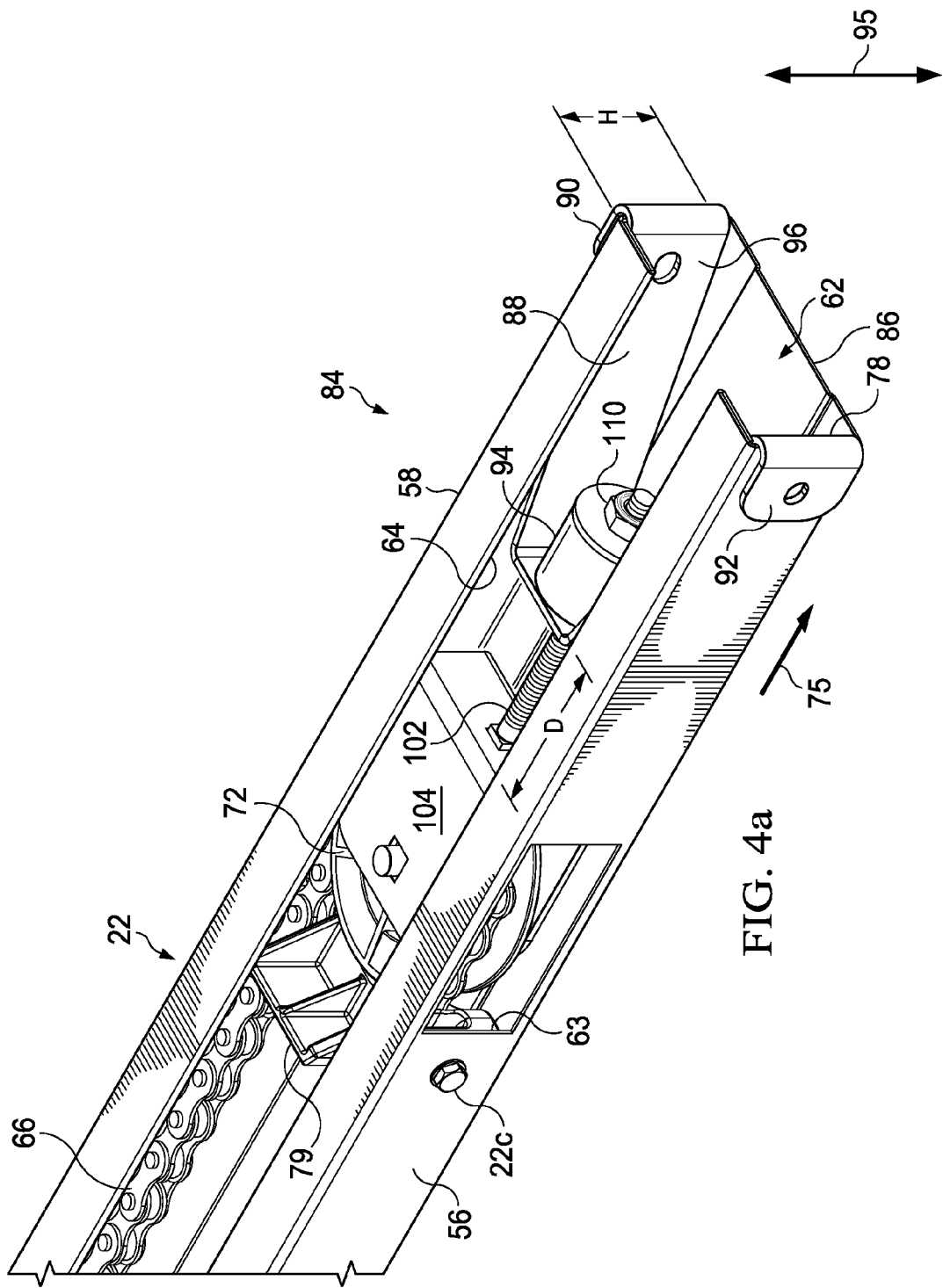

Referring now to FIGS. 4a and 4b, a tensioning system 84 is illustrated for adjusting the tension of endless drive element 66 when such element is trained around drive sprocket 70 and return pulley 72. Tensioning system 84 is disposed within channel 62 and accessible through slot 64. In addition, an opening 63 disposed on rail sidewall 56 enables access to drive element 66 and return pulley 72. It should be understood that opening 63 can be of any length suitable to facilitate access to drive element 66 and return pulley 72 to facilitate installation and maintenance thereof. In the illustrated embodiment, tensioning system 84 includes an end bracket 88 having hooks 90 and 92 sized to receive and otherwise engage rail sidewalls 56 and 58 at the rail end 86. As illustrated particularly in FIG. 4b, end bracket 88 is generally "V" shaped having a base section 94 and legs 96 and 98 angularly extending from base member 94 such that hooks 90 and 92 can receive sidewalls 56 and 58 therein. As best seen in FIG. 4a, end bracket 88 is sized to have a height "H" generally corresponding to the height of rail 22 so as to prevent relative vertical movement between end bracket 88 and rail 22 in the direction indicated by arrows 95.

Continuing reference to FIGS. 4a & 4b, tension on endless drive element 66 is adjusted by a tensioning screw 102, which secures a pulley support member 104 and thus return pulley 72, to base member 94. Tensioning screw 102 extends from support member 104 and through base member 94 and is of a sufficient length to receive a spacer/dampener 106, a washer 108 and a nut 110 to adjustably secure pulley support 104 to end bracket 88. In particular, tensioning screw 102 includes a first end 112 having a head 114 and a threaded second end 116 configured to threadingly engage bolt 110. As illustrated in FIGS. 4a and 4b, spacer 106 and washer 108 are disposed on screw 102 between base member 94 and bolt 110. When adjusting the tension of chain drive 66, bolt 110 is rotatable to travel along threaded end 116 to increase or decrease the distance between base member 94 and pulley support 104. For example, when increasing the tension on the chain 66, bolt 110 is positioned along screw 102 so as to cause the distance "D" (FIG. 4a) between base member 94 and pulley support 104 to decrease. Similarly, when decreasing the tension on drive element 66, the bolt 110 is rotatably positioned along screw 102 in the opposite direction to cause the distance "D" between base member 94 and pulley support 104 to increase.

Referring to FIGS. 2a-3, 4a and 4b, when installing tensioning system 84, return pulley 72 is inserted within channel 62 to enable endless drive element 66 to be trained therearound. Return pulley 72 is mounted within pulley support member 104, both being aligned such that a central opening in each of the return pulley 72 and support member 104 are aligned with a service opening 54a that is formed on top wall 54. Opening 54a is sized to receive a pin 73 therethrough to secure pulley 72 on support member 104. Once inserted therein, pulley support member 104 is pulled in the direction of arrow 75 to increase the tension on endless drive element 66. End bracket 88 is disposed on the end of rail 22 to enable tensioning screw 102 is inserted through base section 94 for adjusting the tension of tensioning system 84, as previously described.

Figure 5:
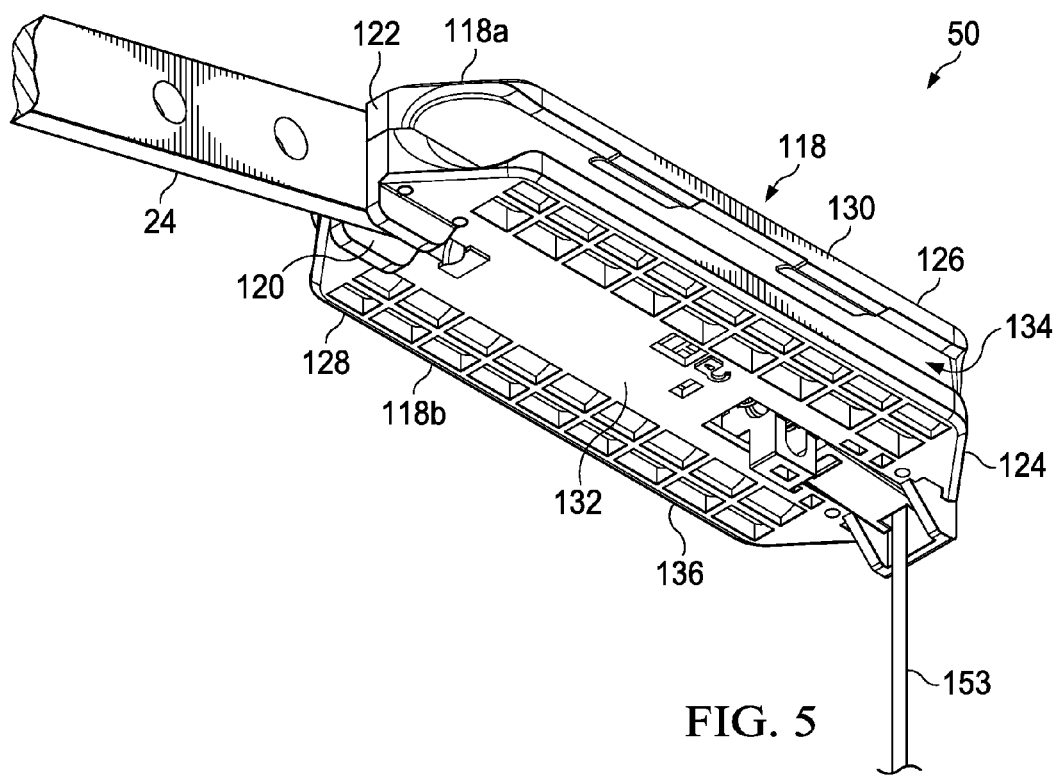
FIG. 5 is an illustration of the carriage assembly shown in FIG. 1, constructed in accordance with the principles of the present invention.
Figure 6:
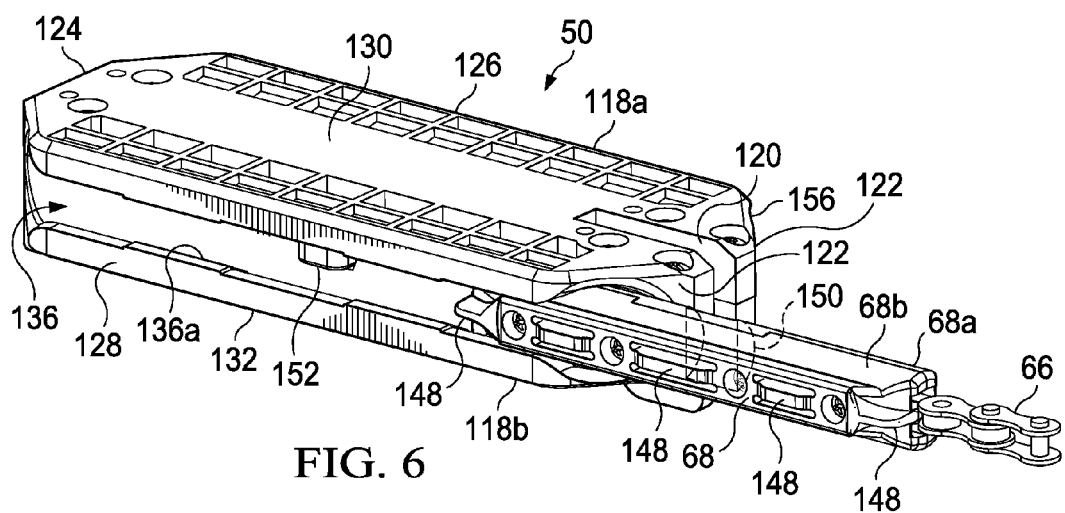
FIG. 6 is an illustration of a self-aligning bullet entering the carriage assembly of FIG. 5.

In order to move door 10 between the open and closed positions, drive motor 28 is operable to move endless chain drive 66, which positions carriage 50 between first and second ends 76 and 86. Referring to FIGS. 5 and 6, carriage 50 includes a body portion 118 preferably formed of upper and lower members 118a and 118b and having a slot 120 formed therein to pivotally receive an end of arm 24, which is pivotably connected to door 10 at the opposite end of arm 24 (FIG. 1). Body portion 118 includes a front surface 122, a rear surface 124, a pair of side surfaces 126 and 128, and top and bottom surfaces 130 and 132, all sized such that body 118 is slideably disposed within channel 62. Body 118 includes longitudinal slots 134 and 136 extending between front surface 122 and rear surface 124, both having a cross sectional area sized slightly larger than the diameter of bullet 68 to enable bullet 68 (and thus drive chain 66) to travel inside slots 134 and/or 136. As explained in further detail below, carriage 50 contains a locking mechanism 152 (FIG. 6) positionable between a locked position and an unlocked position in response to pulling forces exerted on pull cord 153 (FIG. 5) so as to secure bullet 68 within carriage 50. In this position, as bullet 68 is moved via drive element 66, carriage 50 moves along therewith.

Figure 7A:
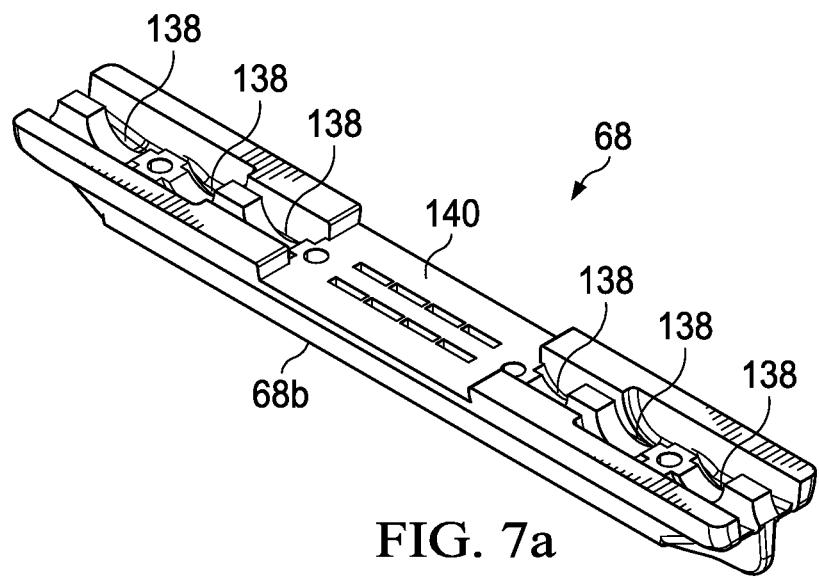
FIGS. 7a-7d are illustrations of respectively different portions of the self aligning bullet depicted in FIG. 6.
Figure 7B:
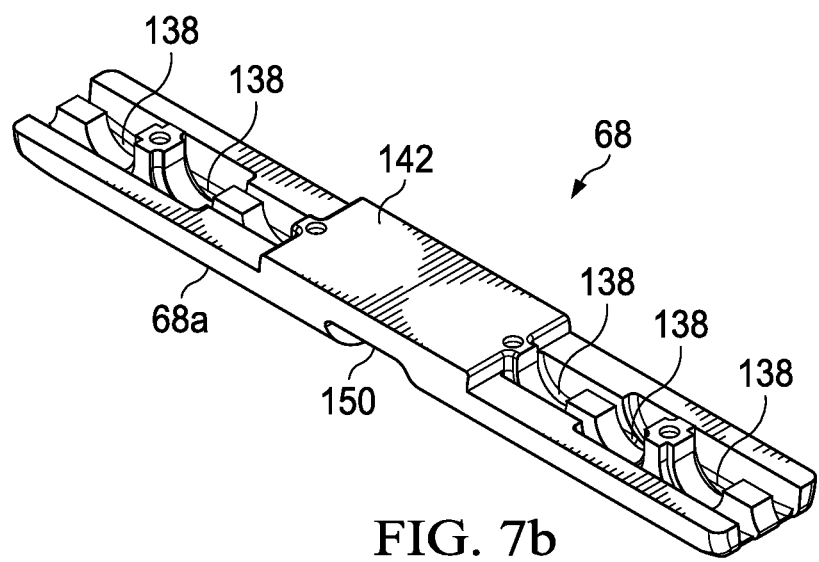

Referring specifically to FIGS. 6 and 7a-7d, bullet 68 is formed of a generally circular cross section corresponding generally to the cross sectional area of longitudinal slots 134 and 136. Bullet 68 contains first and second sections 68a and 68b that are coupled together to sandwich each respective end 66a and 66b of drive chain 66 (FIG. 2a-2). Referring specifically to FIGS. 7a and 7b, sections 68a and 68b contain engagement grooves or recesses 138 to receive and secure respective ends 66a and 66b (FIG. 2A-2) of endless drive element 66. Section 68b includes a recessed portion 140 to cooperatively receive extension 142 on section 68a to facilitate alignment of sections 68a and 68b when assembling bullet 68. A plurality of fasteners 144 (FIG. 7c) are configured to secure sections 68a and 68b together. In operation, fasteners 144 and the cooperative engagement of recess 140 with extension 142 act to resist longitudinal forces generated by movement of drive element 66.

Figure 7C:
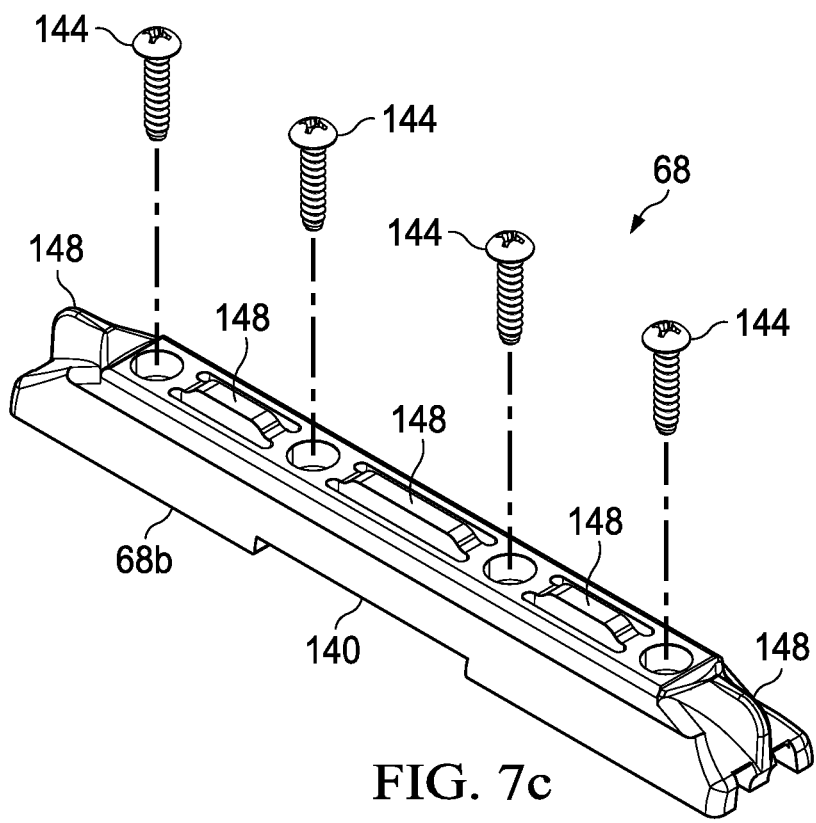
Figure 7D:
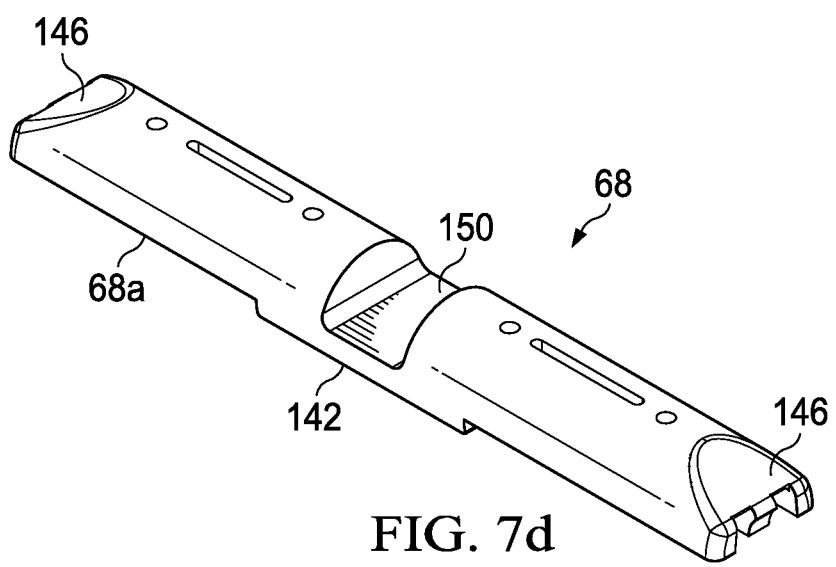

Referring specifically to FIGS. 6, 7c and 7d, bullet 68 is configured to self-align with longitudinal slot 134 or 136 in response to bullet 68 entering carriage 50. In operation, sloped surfaces 146 along with extensions 148, which extend outward from bullet 68, are all configured to axially and rotationally align bullet 68 relative to longitudinal slots 134/136 in response to bullet approaching and entering carriage 50. For example, as bullet 68 approaches longitudinal slots 134/136, surface 146 slideably engages end surface 122 of carriage 50 to co-axially align an axis of bullet 68 with an axis of longitudinal slot 136. As bullet 68 enters longitudinal slot 136, extensions 148 align with and extend within a sidewall slot 136a via contact with end surface 122 to orient and/or otherwise rotate bullet 68 such that a recess 150 on bullet 68 is inwardly positioned to receive locking bar 152. Locking bar 152, when disposed within recess 150, prevents relative movement between carriage 50 and bullet 68 such that when drive motor 28 turns, drive mechanism 5 moves bullet 68 and thus carriage 50.

Rail assembly 22 can be formed as a single continuous portion, or in accordance with a feature of this invention, an assembly formed of multiple segmented portions that are secured together. For example, referring specifically to FIGS. 8a and 8b, rail 22 contains two segments 154 and 156 secured together, as explained in further detail below, via connector section 160 to enable rail assembly 22 to be stored and/or otherwise shipped in a disassembled and compact fashion while also being easily assembled on-site. It should be understood, however, that while rail assembly 22 is shown as two segments, it can also be formed of a greater number of sections. For example, it can be formed of three segments respectively secured together via two connector sections 160.

As described, the elongate rail segments 154 and 156 can be assembled without the use of tools by using a snap-fit connection via rail connecting sections 160. Connecting sections 160 comprise a top wall 160a, a bottom wall 160b having a slot 64, and a pair of sidewalls 160c and 160d forming a channel to receive segments 154 and 156. For example, referring specifically to FIGS. 8a and 8b, each rail connector 160 contains a rail engaging tab 162, which is biased to fit within a corresponding opening 164 on rail section 154. When connecting sections 154 and 156 of elongate rail 22, sections 154 and 156 are inserted into respective ends of rail connecting section 160 until engaging tabs 162, which are inwardly biased, and snap or are otherwise disposed within respective openings 164 on sections 154 and 156. When in this position, connector section 160 prevents separation of sections 154 and 156. When disassembling sections 154 and 156 of elongate rail 22, access to engaging tab 162 through slot 64 enables a force to be applied to engaging tab 162 to lift and remove each tab 162 from each corresponding opening 164. Once removed, rail sections 154 and 156 can be separated from rail connector 160.

Figure 8A:
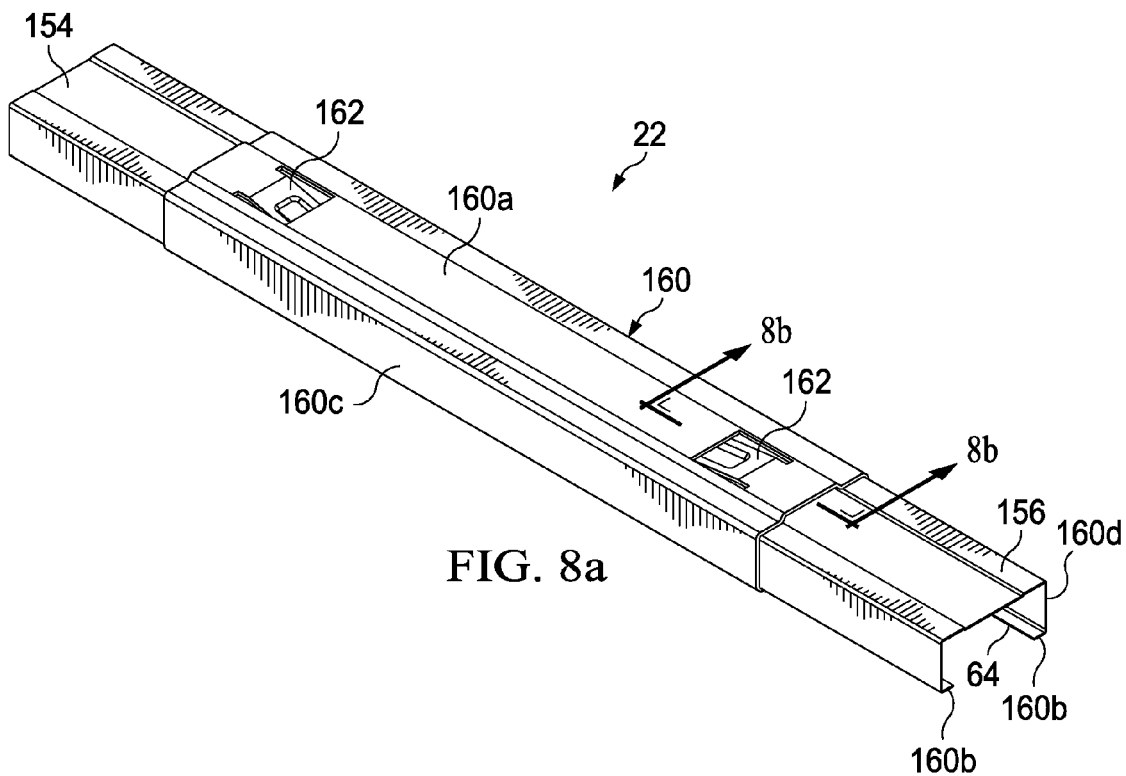
FIGS. 8a and 8b are illustrations of a connector member for the rail assembly depicted in FIG. 1 and constructed in accordance with the principles of the present invention.
Figure 8B:
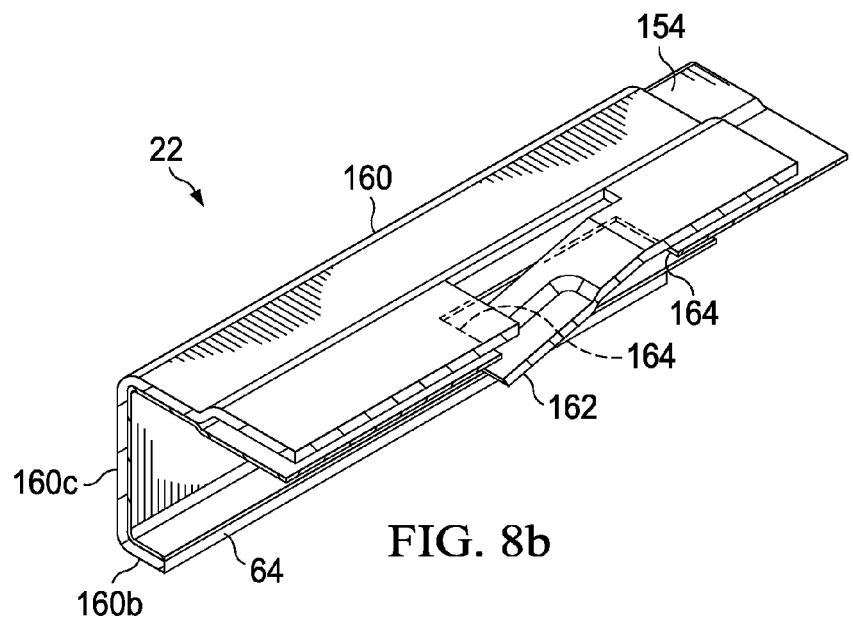
Figure 8C:
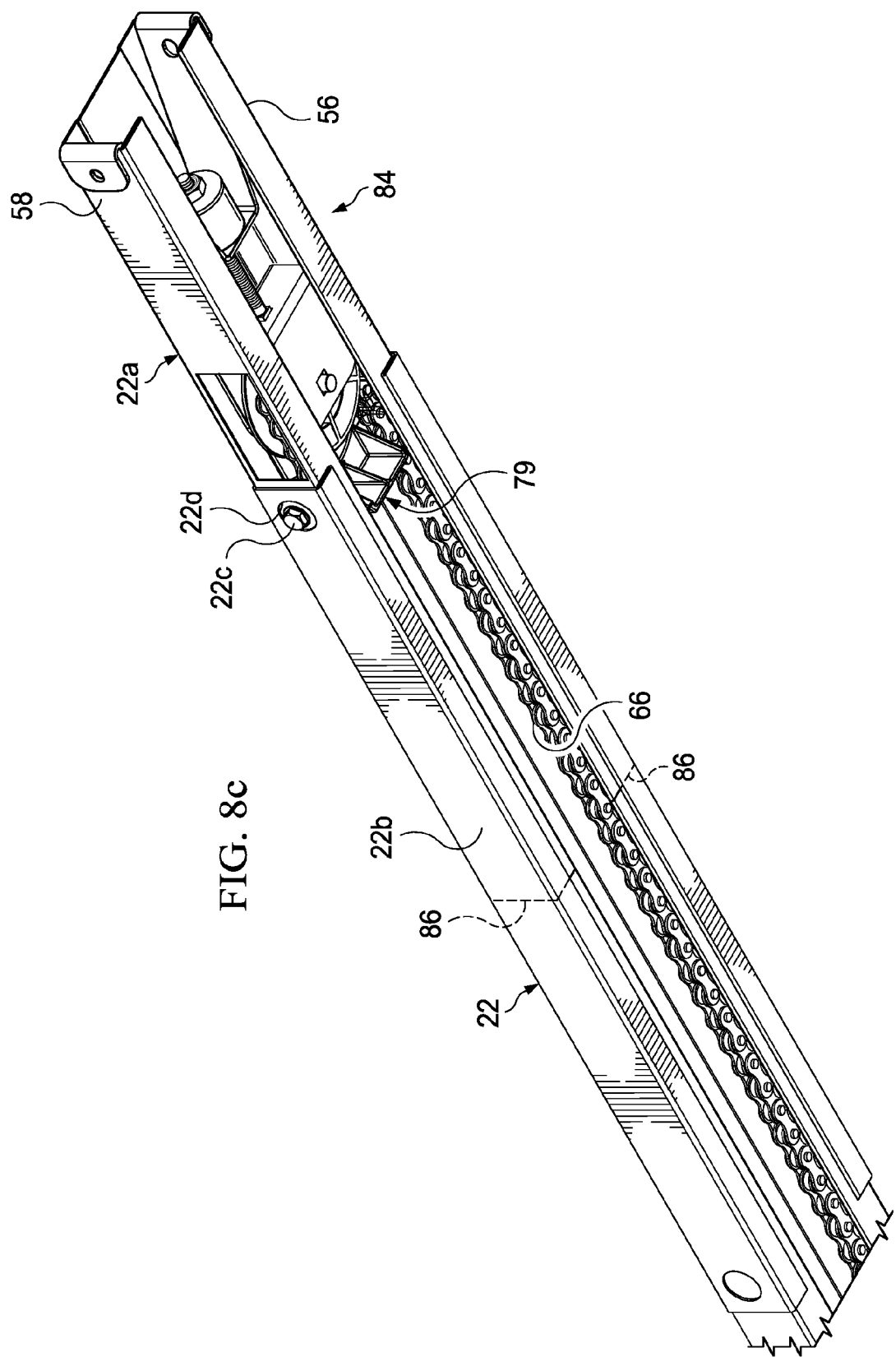
FIG. 8c is an illustration of a coupler member for coupling an extension member to the rail assembly of the barrier operator drive sub-system shown in FIG. 1.

While the embodiment illustrated in FIGS. 8a and 8b utilizes a flexible engaging tab 162 for securing rail sections 154 and 156 together, it should be understood that engaging tabs 162 may be otherwise configured. For example, in lieu of tabs 162 and respective openings 164, connector section 160 may include detents engageable with corresponding recessed portions disposed on rail sections 154 and/or 156 to maintain frictional contact between the members. In addition, it should be understood that rail sections 154 and/or 156 can be configured with engaging tabs 162 and corresponding openings 164 without the need for connecting sections 160. Alternatively, sections 154 and 156 can be secured together via a friction fit.

Referring specifically to FIG. 8c, elongate rail 22 may be extended via a rail extension section 22a, which is connected to rail 22 via a coupler member 22b. Preferably, rail extension 22a extends a length of approximately 12 inches and abuts rail end 86 so that the overall length of elongate rail 22 is extended by the length of coupler member 22b. When securing rail extension 22a, coupler member 22b is positioned to overlay a portion of rail end 86. Rail extension 22a is inserted inside the opposite end of coupler member 22b so that coupler member 22b is able to resist relative lateral movement (i.e., movement in any direction other than along the longitudinal axis of rail 22) between rail 22 and extension 22a. Once rail extension 22a is positioned and tensioning system 84 has been inserted and properly tensioned therein to set the proper tension for endless drive element 66 (previously described), the tensioned drive element 66 prevents axial separation between rail extension 22a and rail 22. As an added protection to resist axial separation between extension 22a and rail 22, screws 22c (screw 22c on wall 56 not illustrated), which as previously described are utilized to secure stop 79 within channel 62, can be inserted through openings 22d in coupler member 22b. Thus, the screws 22c are operable to perform a dual function: (i) in the event there is a force on the system that could cause axial separation between extension 22a and rail 22, the screws 22c will prevent separation between the components and (ii) secure stop 79 within channel 62.

Referring to FIGS. 9a and 9b, the drive assembly 5 is a screw drive disposed within elongate rail assembly 22. In operation, drive motor 28 (FIG. 1) rotates a screw member 202 which, in turn, causes carriage 50 to travel within channel 62. In FIG. 9a, screw 202 is supported within rail assembly 22 via a plurality of spaced apart screw support members 204, which contain a centralized slot 206 to receive and support screw 202 therein.

According to the embodiments disclosed herein, screw support members 204 are fixedly secured within channel 62 without the use of tools or other fastening mechanisms. For example, screw supports 204 include a pair of extensions 208 and 210 sized to frictionally fit into corresponding openings 218 and 220 formed in top wall 54 of rail assembly 22. In particular, top planar portions 208U and 210U of extensions 208 and 210 are aligned with and inserted through openings 212 and 214 so as to be positioned above top surface 54. Once inserted therein, screw support 204 is rotated in the direction of arrow 216 until lower post portions 208L and 210L of support extensions 208 and 210 (i.e., the posts supporting the top planar portions of extensions 208 and 210 above support 204) are disposed within and frictionally engage the sidewall of smaller openings 218 and 220. When in this configuration, the frictional engagement of lower post portions 208L and 210L with openings 218 and 220 and size of the top planar portions 208U and 210U, which are larger than openings 218 and 220, prevent relative movement of support 204 with respect to rail 22 and maintain alignment of slots 206 with the longitudinal axis of rail assembly 22 so as to receive screw 202. When disassembling rail 22, screw supports 204 are manipulated in opposite fashion for removal from channel 62.

Screw support member 204 optionally includes a rubber dampener 230 overlaying top surface 211 of screw support 204 to isolate screw supports 204 from rail 22 to reduce vibration and ultimately, minimize vibrations and sounds resulting from vibrations during operation. Preferably, rubber dampener 230 is over molded with a soft rubber and is of a sufficient thickness to isolate dampener 230 from rail 22. Preferably, dampener 230 overlays the entire top surface 211 to separate screw support member 204 from rail 22.

Referring back to FIGS. 1 and 2a-1 through 2a-3, top surface 54 of elongate rail assembly 22 optionally includes clips 55 extending therefrom for securing wires, such as, for example, in the event it is desired to extend wires 36 from barrier operator 20 toward wall 12 for connection with optical beam transmitter 40 and receiver 42. Each clip 55 includes upward extending and arched arms 55a and 55b and cantilevered portions 55c and 55d expending generally perpendicularly therefrom to form an opening to receive one or more wires 36.

Barrier Operator System Electronic Controls
Multiple Microcontrollers and their Respective
Software Controls As previously described, the controller unit 30 is effective to carry out the various control operations of the barrier operator 20. While all of these operations may be performed by using a single microcontroller, in accordance with an advantageous feature of this invention, multiple microcontrollers are utilized to carry out respectively assigned functions, the required software appropriately divided among the microcontrollers, with each microcontroller also serving as a safety check on the other to assure appropriate conditions before motor 28 can operate.

Thus, and with initial reference to FIG. 10, the preferred embodiment of the controller unit 30 comprises two separate software controlled microcontrollers 1000 and 1002, both located in the head unit 26. In this embodiment, microcontroller 1000 is the main microcontroller and has primary responsibility for control over the operation of the motor 28, as well as particular safety features (e.g., thermal protection of motor 28), while microcontroller 1002 is the secondary microcontroller and has primary responsibility for control over other assigned functions, such as processing the encrypted RF data input from receiver 1066, controlling work light 1070, actuating and deactuating motion detector 1068, and actuating alarm 1058 (activated, for example, by a panic button on a hand-held transmitter 53), as well as carrying out such additional safety features not attended to by main microcontroller 1000. Moreover, and as a significant feature of this invention, the microprocessors 1000 and 1002 act as watchdogs over one other to preclude motor operation in the event of, inter alia, a fault or other operation infirmity in one or the other.

Communications between the two microprocessors in the head unit can be accomplished, in principal part, utilizing an I²C expansion bus 1004, for example. Accordingly, a master slave synchronous port (MSSP) 1006 of the main microcontroller 1000 can be used in I²C master mode to enable the main microcontroller 1000 to communicate with the secondary microcontroller 1002. Similarly, the MSSP 1043 can be used to enable the secondary microcontroller 1002 to communicate with the main microcontroller 1000 along the I²C expansion bus 1004.

Moreover, the hardware and software of controller unit 30 are designed such that both the main microcontroller 1000 and secondary microcontroller 1002 must "agree" that there are no faults or other adverse system conditions in operator 30 before the motor 28 may operate. In accordance with one exemplary embodiment for accomplishing this objective, the main and secondary microcontrollers have respective motor enable output lines 1018*a* and 1018*b* connected as inputs to motor enable circuitry 1019. Motor enable circuitry 1019, which, for example, can be a main power relay or other switching element, is effective to enable operation of motor 28 only when there are signal inputs to motor enable circuitry 1019 at both outputs 1018*a* and 1018*b*. This requirement allows for safety so that if one microcontroller senses a fault, such as the secondary microcontroller determining that the main microcontroller 1000 is locking up to continue the motor 28 closing the door when it should not do so, the secondary microprocessor can deactivate its motor enable output 1018*b* and thereby halt motor operation.

Alternate embodiments for carrying out this safety protection can be implemented. For example, under control of the appropriate software, when the main microcontroller 1000 receives a command (e.g., from remote transmitter 53 or wall console 32) to move the door, it sends out a message to the secondary microcontroller on the I²C expansion bus 1004 indicating that it is about to move the door. If the secondary microcontroller 1002 has no issue with this operation (e.g., detects no faults), it confirms to the main microcontroller 1000 that it may proceed. In that event, the main microcontroller 1000 performs its actions, such as, for example, proceeding with pulse width modulation ("PWM") control at 1010 in the case of a DC motor. The motor 28 will then operate, moving the door to the instructed position. At any time, prior to or during the door movement, if either microcontroller thereafter detects a fault, then that particular microcontroller can stop the motor. The secondary microcontroller 1002, for example, can interrupt any signal output at 1018*a*, thus deactivating the motor enable circuitry 1019. The main microcontroller 1000, for example, can also deactivate the PWM circuitry 1010, thus similarly switching off the motor enable circuitry 1019. Additionally, the microcontrollers can be configured and programmed in such a way that either the main microcontroller 1000, or the secondary microcontroller 1002, can prevent operation of the motor 28 in the event of excessive motor torque (referred to as "torque-out").

In performing as an I²C slave, the secondary microcontroller 1002 can require that the primary microcontroller transmit a periodic message at a predetermined rate (e.g., every fifty milliseconds), indicating normal and no-fault operation. Then, if the secondary microcontroller 1002 senses that the main microcontroller 1000 has ceased sending messages at this rate, the secondary microcontroller 1002 can disable motor enable circuitry 1019, which then results in cessation of operation of motor 28.

In the main microcontroller 1000, the process 1100 (see program flow chart of FIG. 11) for sending the periodic message to the secondary microcontroller 1002 stores outgoing requests in a queue. A method is then available for the task/process that sent the request to get the response. Since there may be several tasks attempting to send requests at once, it may take a few cycles before a request is properly sent and a response read. Therefore, if sending a request, a state machine, for example, is employed to wait for the response.

In communicating with the secondary microcontroller 1002, the main microcontroller 1000, for example, opens a number of sockets and reserves one of those sockets for uninitiated requests, while the remaining sockets allow simultaneous requests from multiple tasks to be sent at once. An outgoing queue and queue information can be maintained, for example, in a structure that contains one packet queue for each task. In this way, the main microcontroller 1000 can maintain status of each queue (e.g., whether it is empty or full) and each socket (e.g., busy or free, transmitting or receiving, etc.). Accordingly, appropriate methods can permit allocation of available queue buffers to tasks as needed on a dynamic basis.

In accordance with a feature of the invention, if there is a problem with communication, the process 1100 for periodically communicating with the secondary microcontroller 1002 performs an event that causes the main microcontroller 1000 to halt execution. The secondary microcontroller 1002 can then notice that the main microcontroller 1000 has stopped executing, and it can perform a reset of the main microcontroller 1000. During this process, the secondary microcontroller 1002 verifies that the main microcontroller 1000 has not reset too many times within a set period. In this case, the secondary microcontroller 1002 can keep track of the number of resets. If too many resets have occurred in the set period, then it can assume that the device is behaving improperly and, in response, halt the system operation. In turn, the main microcontroller 1000 can verify with the secondary microcontroller 1002 that the A/D values are valid with a request for current message.

Since, in this embodiment, the secondary microcontroller 1002 bears primary responsibility for interfacing with users via remote transmitter devices 53, the secondary microcontroller 1002 can relay user commands received from these devices 53 to the main microcontroller in the form of uninitiated packets. Thus, the main microcontroller 1000 can respond to uninitiated packets from the secondary microcontroller 1002 by setting, clearing, or adjusting barrier travel limits, setting, clearing, or adjusting a barrier force profile (see FIG. 24), and/or setting, clearing, or adjusting barrier movement speed settings.

When the uninitiated packet contains a command related to programming travel limits, the main microcontroller 1000 can respond appropriately while observing certain predefined safety conditions. In particular, the main microcontroller 1000 can determine the motor idle state and/or check whether limits set are too close together. Thus, when a command is received to enter a process for initially programming travel limits, then when a limit set command is received, it can be ignored if the motor is not idle, and a message can be queued to the secondary microcontroller 1002 that the command was invalid. Upon receipt of a first acceptable limit, the stored limits (FIG. 23) and force profiles (FIG. 24) can be cleared and this new limit position stored. Then, a second limit set command can be ignored if the position indicated is too close to the first end of travel barrier position. In this case, a message can be queued to the secondary microcontroller 1002 that the command was invalid. Otherwise, when a limit set command is received that is acceptable, the open or close limit can be set at the current door position, and a status message can be queued to the secondary microcontroller 1002 that the command was accepted. Once both limits are set, the distance between the limits can be compared to a predetermined threshold (e.g., six feet) to determine whether a sectional or one piece door is in use, and a variable for door type stored in the EEPROM 1016 can be set accordingly.

In order to communicate at the proper rate, the main microcontroller 1000 can call a process 1104 for communicating with the secondary microcontroller 1002 at the very beginning of its main loop 1100, which is first entered following initialization at 1106, and which is thereafter iteratively reentered upon time expiring (e.g. fifty-milliseconds) at decision step 1102. When this process 1104 is called, the main microcontroller 1000 can either send the next queued data packet or ask the secondary microcontroller 1002 for an un-initiated packet. Since the secondary microcontroller 1002 is using this request as a method of determining the freedom of faults of the main microcontroller 1000, this process 1104 can be called at a constant rate (e.g., every 50 ms). Placing the process 1104 at the beginning of the main loop 1100 ensures that it is not delayed by execution of other processes in the loop 1100.

Figure 12:
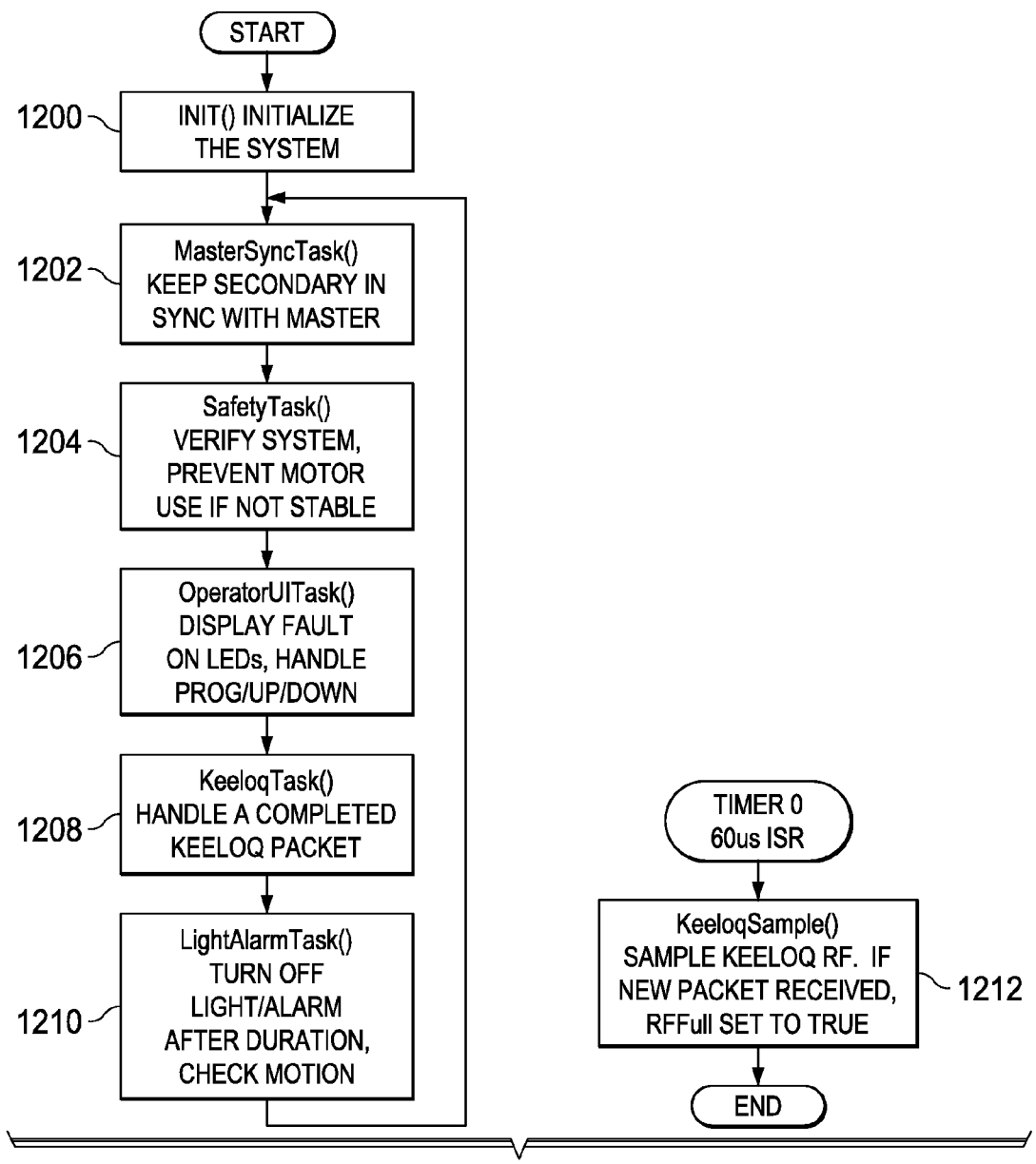
FIG. 12 is a software flow diagram of a method of operation of the secondary microcontroller of the controller unit of FIG. 10, illustrating a main loop and KEELOQ® interrupt.

As previously described, preceding the process 1104, the initialization step 1106 is performed. This initialization step 1106 can be performed each time the main microcontroller 1000 is started up (e.g., reset). The secondary microcontroller 1002 also has an initialization step 1200 (see FIG. 12), the details of which are described below with reference to FIG. 13. Together, the two initializations are carried out each time the barrier operator is powered on to accomplish power on self-test activities. For example, these activities can include testing communication between the main microcontroller 1000 and the secondary microcontroller 1002. Also, these activities can include an EEPROM CRC check, as well as reading the configuration bits out of EEPROM 1016 to determine whether the barrier operator has a belt, chain or screw type drive, or is of the "good", "better", "best" type. The reason for such is subsequently described.

During this step 1106, a fault can be logged if either one of two watchdog timers caused a reset. Additionally, a watchdog timer 1007 (FIG. 10) maintained on board the main microcontroller 1000 can be started, and analog and digital I/O pins on the board can be initialized, as can be on-chip items, such as the I²C expansion bus 1004, timers 1008A-1008D, and PWM circuitry 1010 (e.g., CCP1 unit operating in PWM mode at zero percent duty).

In accordance with this specific embodiment, timer 1008A is used to measure various events in the system. The timer is free running, never reset, and the overflows counted. An eight times prescaler can be used; in this case, with the sixteen megahertz MCU clock, each timer increment representing two microseconds. As a result, a sixteen bit timer can be used to measure events up to one-hundred thirty milliseconds. Timer 1008A can also be used to run a seconds counter in the main idle loop. It is additionally used to track the door speed by measuring the time between opto-coupler inputs. When timer 1008A overflows, an interrupt can be triggered that increments a sixteen bit overflow counter. This overflow count, along with the sixteen bit timer value, provides a thirty-two bit timer. This thirty-two bit timer can be used by on optical wheel code to achieve wider timing capabilities during slower movement.

Timer 1008B can be used by the PWM circuitry 1010 to drive a DC motor. The timer 1008B prescaler and period register operate together to set the frequency of the pulse width modulation to ten kilohertz. Accordingly, there are no interrupts associated with timer 1008B. The PWM circuitry 1010 can be controlled by a duty cycle having, for example, ten bits of resolution.

Wall Console

Timer 1008C can be used in a counter mode to count pulses from the wall console 32. The wall console unit 32, being one of the units for the homeowner to activate the opener, preferably has, in connection with appropriate software control, three buttons, a first user-actuated button to open and close the barrier, a second user-actuated button to turn the lights on the head on and off, and a third button to place the system in, or release it from, vacation lock mode. This operation is subsequently described in greater detail. The software is also employed to activate the lights on the head when the door is commanded to move, and then automatically turns the light off a defined period (e.g., four minutes) later. If the light button on the wall console 32 is pushed, then this button press can cause the lights to stay on until the light button is again pushed.

The main microcontroller 1000 has the ability to turn the power to the wall console 32 on and off. It can also flash an LED on the console to indicate that the barrier operator is in vacation lockout mode. This flashing can be performed at a rate that allows for the console 32 to still maintain power, yet provides an adequate indication of vacation lock mode. Once the unit is in vacation lock mode, and the LED on the console 32 is flashing, the door can move as always until the close limit is reached. Once the close limit is reached, the door is prevented from moving until the homeowner presses the vacation lock button again, thereby releasing the barrier operator from vacation lock mode, all under software control.

Figure 11:
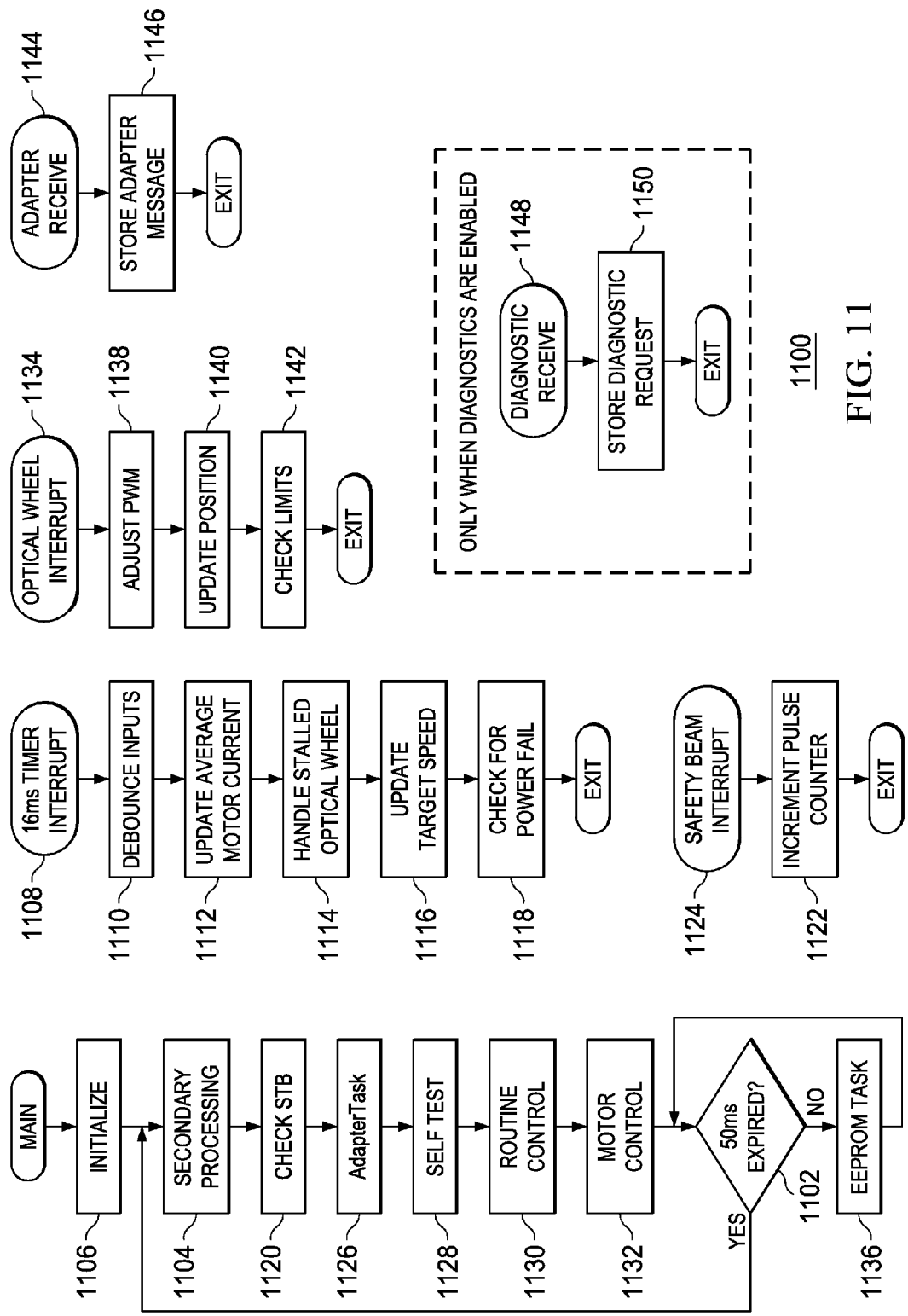
FIG. 11 is a software flow diagram of a method of operation of the main microcontroller of the controller unit of FIG. 10.

The buttons on the wall console 32 can all be debounced for a period of time (for example, ninety-eight milliseconds) (see FIG. 11). That is, a button should preferably be off for at least that long, and then on for a period of time, say sixty-five milliseconds, to be considered a valid button press. One exception to this requirement can be the manual override function of the door button, in which it is held down until the door reaches the floor.

In accordance with a particular feature of the present invention, user-actuation of the different buttons on the wall console 32, respectively indicating different commands to the controller 30 of operator 20, transmits a series of electronic pulses, in which different frequencies of these pulses respectively represent these different commands. The controller 30, and more specifically main microcontroller 1000, is effective to receive and process these pulses and perform the operation respectively represented by the particular frequency of the received pulsed signals.

As examples, different button functions (commands) can be represented by the frequencies set out hereinafter in TABLE 1:

TABLE 1

| Freq. | Button Function/Command |
|---|---|
| 3.8 kHz ± 20% | Vacation Lock Mode (set and release) |
| 7.0 kHz ± 20% | Light (on and off) |
| 16.0 kHz ± 20% | Door (open and close) |

Of course, any other functions or commands may be similarly programmed.

The wall console 32 preferably uses an on-board timer to create the required frequency signal for the particular button function. In the case of residential garages with multiple doors, a separate door operator and a separate wall console 32 can be used for control of each of the doors, with the same or similar frequency selection.

Figure 21:
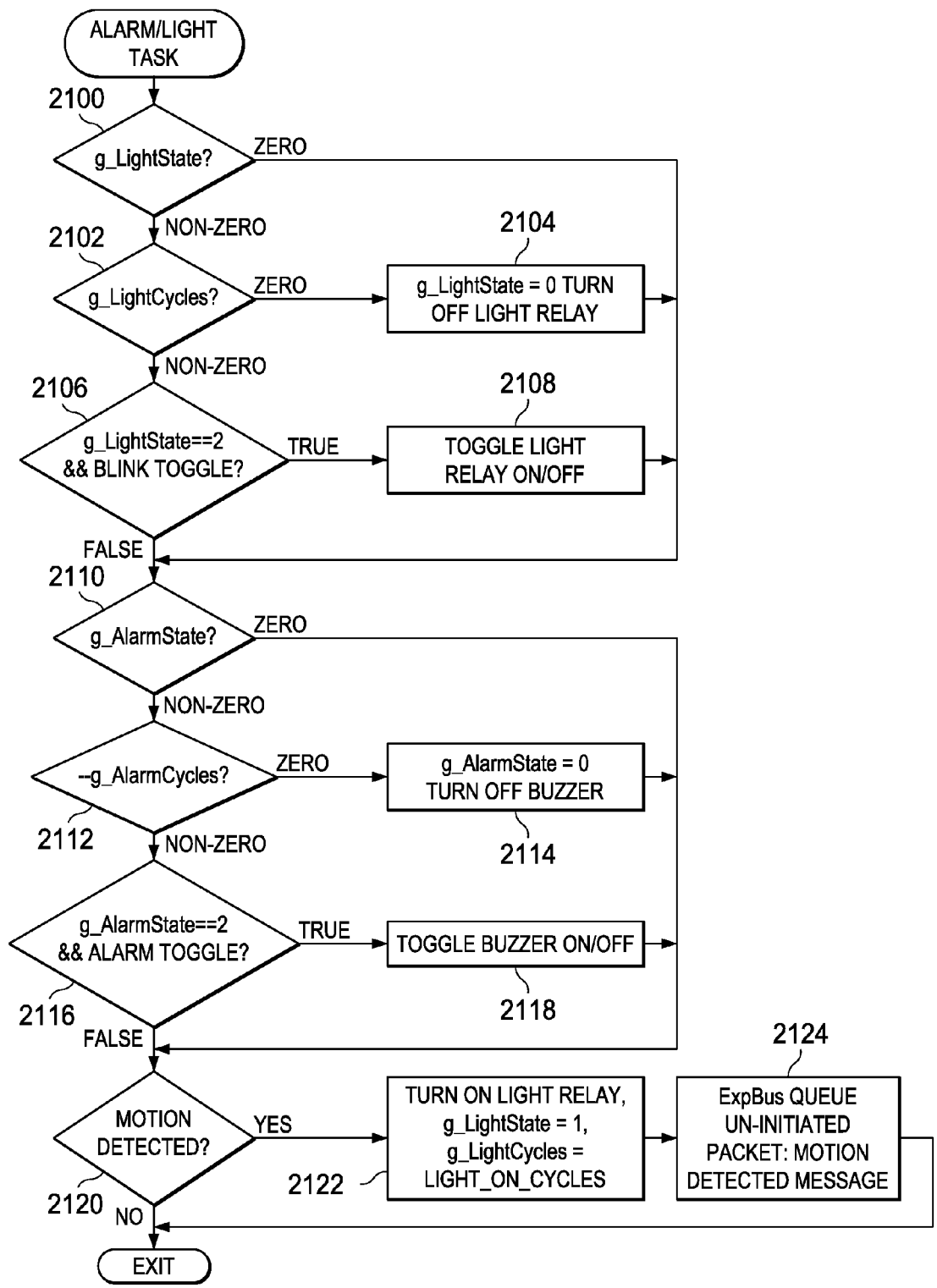
FIG. 21 is a flow diagram illustrating a light/alarm task carried out by the secondary microcontroller of the controller unit of FIG. 10.

As previously described, commands to effect movement of the door 10 may also come from a RF remote transmitter 53. Software associated with the secondary microcontroller 1002 is also relied upon to carry out the function of automatically turning on the light 1070 when a valid command to move the door is received. With reference to FIG. 21, in accordance with steps 2100-2124, the lights can stay on for a predetermined period of time, after which software can instruct the lights to be turned off. A button on the remote transmitter actuates a panic function, which the software in the secondary microcontroller 1002 receives and decodes, and results in sounding of an alarm 1058. Signals from any one of the remote transmitters 53 can also be appropriately debounced.

Timer 1008D can be set to periodically interrupt the processor 30 operation. This interrupt process at 1108 (FIG. 11) can be used to gather inputs, perform filtering and de-bouncing, and detect wall console pulses at step 1110. Debouncing inputs can involve ignoring inputs for a period of time (e.g., one second) after power up to avoid false reads to unstable signals. After the debouncing period, a condition can require that the button be released before it can be activated for the first time. This requirement can prevent a button from triggering an operation if it is held down during power up.

The inputs debounced at step 1110 can be pulse input signals from wall console 32, as mentioned above. For example, depression of the door command button of the wall console 32 can be detected if the value counted on timer 1008C is in a predefined frequency range for a number of interrupts, in which case a flag can be set to indicate that the wall console door button was pressed. This flag can be cleared if the value of timer 1008C does not fall into the range for a larger number of interrupts. This flag can also be cleared once it has been serviced, in which case reset of the flag can be prevented until the number of interrupts occurs in which the button is not pressed. Additionally, depression of the light button on the wall console 32 can be detected if the timer 1008C value lies in another predefined frequency range for the same number of interrupts, in which case a flag can be set to indicate that the wall console light button was pressed. Again, if the timer 1008C value is not in that range for the same number of interrupts, then this flag can be cleared. Also, the depression of vacation lock mode button on the wall console 32 can be detected if the timer 1008C value lies in another predefined frequency range for the same number of interrupts, in which case a flag can be set to indicate that the wall console vacation switch was actuated. As with the other button press flags, if the timer 1008C value is not in that range for the same number of interrupts, then this flag can be cleared. An RF keyless entry pin state of the secondary microcontroller can be received over remote detection line 1044. If this pin is low for a number of interrupts, a flag can be set to indicate that a door button of the remote transmitter 53 was pressed. As with the flags indicating status of wall console button presses, this flag can be cleared if the pin is low for a predefined number of interrupts. As with the wall console door button press flag, the door button press flag on the RF transmitter 53 can also be cleared once it has been serviced, in which case reset of the flag can be prevented until the precise number of interrupts occur in which the pin is seen low.

With respect to the location of barrier travel, the details of which are subsequently described, this interrupt process at 1108 (FIG. 11) can also update average motor current at step 1112, and check that the optical wheel 1013A (FIG. 22) is moving at step 1114 when the motor is on. At step 1114, the process 1108 can send a failure event if the optical wheel 1013a (FIGS. 10 and 22) has not moved for a period of time that can vary based on drive type and/or operating conditions. At step 1116, the target speed can be updated, and a power fail signal 1013B can be checked at step 1118 to determine whether or not a power fail handling process needs to be executed.

Referring again to FIG. 10, a dedicated hardware circuit can provide a digital AC power fail signal 1013B that transitions in the event that the AC power ever falls below a predetermined value (e.g., eighty-five volts AC). This signal 1013B is input to both the main microcontroller 1000 and secondary microcontroller 1002 so that they can both monitor the AC line. If the signal 1013B transitions, the software can recognize that a brown-out is occurring. Upon this signal 1013B going active, the microcontrollers can immediately stop the motor if it is in motion. This procedure can include the use of a quick stop signal as described below with reference to FIG. 17, which can cause the motor leads to be directly shorted out, resulting in the motor 1022 stopping more abruptly. Stopping the motor 1022 as soon as possible on power failure makes it possible to accurately recover by preventing the optical wheel 1013A from rotating more than one revolution after the power goes out. The software can perform necessary procedures to recover properly when power is restored. These procedures can include storing all necessary values in the EEPROM 1016, thus ensuring that the position can be recalled again upon the subsequent power-up.

If an AC power failure signal 1013B is active (i.e., high), then a battery backup unit, if available, can be optionally used and enabled. Otherwise, an active AC power failure signal 1013B can cause the main microprocessor to indicate, via fault signal 1046, that it has ceased operation.

Referring back to FIG. 11, following step 1120, an adapter task step 1126 can be performed in which the main microcontroller 1000 performs a scan to see if an adapter 1034 (FIG. 10) is installed that allows use of optional wireless accessories 1036. If so, the microcontroller 1000 utilizes a universal asynchronous receiver/transmitter (UART) interface 1032 to communicate with the adapter 1034. This adapter 1034 can enable wireless communication, for example of 915 MHz, with any number of external accessories 1036 with which the processor 30 cannot communicate natively. A connector port such as a serial port, provided in the power head, can be used to supply a connection between the UART interface 1032 and the adapter 1034. Other types of ports can alternatively be used, as appropriate, such as a parallel port or USB port. The accessories 1036 can include, for example, non-standard remote controls, other wall consoles, door status communication devices, setup and calibration modules, lights, security systems, and other desired equipment. A messaging protocol useful for communication between the interface 1032 and the adapter 1034 can implement reception of messages via an interrupt service routine 1144 (FIG. 11), and store received messages at step 1146 in a buffer for processing by the main loop. The adapter task step 1126 can parse any incoming messages and queue appropriate responses to be sent on the next cycle. In some embodiments, all of the incoming messages can be handled before sending any messages to the adapter 1034. When the main microcontroller 1000 sends an establish communications message to the adapter 1034, it can wait for a period of time (e.g., up to two seconds) for the authentication process to be completed. If it is not completed, the main microcontroller 1000 can resend the establish communications message. This attempt to establish communications can continue until an authentication is completed.

The controller unit 30, and particularly the main controller 1000, can handle many different types of messages. For example, because of the capability of the adapter 1034 to communicate with a wide variety of accessories 1036, messages that can be handled at step 1126 could include, as examples, authentication responses, head reset commands, operator status requests, door operation commands, light operation commands, alarm operation commands, vacation mode commands, learn remote commands, set limits commands, change position commands, existing and new force profile commands, set speed commands, set force commands, raise fault commands, request fault log commands, set LEDs commands, issue diagnostics commands, and/or general acknowledgements.

The authentication response, head reset commands, and status requests can be handled, for example, as follows. When an authentication response is received, the main microcontroller 1000 can attempt to validate an encrypted number, and can respond with either an acceptance message or an error message. When a head reset command is received, it can be encapsulated in an expansion bus packet and queued for relay to the secondary microcontroller 1002. The secondary microcontroller 1002 can respond by halting for a short period of time, and then resetting itself, which can allow the main microcontroller 1000 time to save any important data before it is reset during the secondary microcontroller's 1002 initialization. An establish communications command can then be sent once the head has re-initialized, while the adapter 1034 can allow enough time for the head to complete the requested reset. When an operator status request is received, a message can be prepared that contains operator status information, and this message can be sent to the adapter 1034.

The light operation commands, alarm operation commands, vacation mode commands, and learn remote commands can be handled, for example, as follows. When an operate light command or an operate alarm command is received, then a light message or alarm message, respectively, can be queued for communication to the secondary microcontroller 1002, and these messages can contain appropriate parameters to accomplish these operations. When a vacation mode message is received, then a vacation lock can be set or released, depending on the mode received; a lockout message can be queued for communication to the secondary microcontroller 1002 with the appropriate mode indicated. When a learn remote command is received, this message can be encapsulated in an expansion bus packet and queued for delivery to the secondary microcontroller 1002.

There are various types of learn remote modes that can be handled by the secondary microcontroller 1002. For example, if the mode is a door mode or an accessory mode, than the secondary microcontroller 1002 can enter a remote learning mode and learn any remote that is activated. Additionally, a complimentary cancel learn mode message can be handled by cancelling a learn mode already entered. Also, a clear all mode message can cause all remotes in the processor to be cleared, including both door and accessory remotes. In contrast, a clear accessory mode message can cause all accessory remotes learned by the processor to be cleared.

Set limits commands and change position commands can be handled at step 1126 as follows. Set limits commands that are received can be handled by the main microcontroller 1000 in much the same manner as described above with regard to process 1104, when such commands are received from the secondary microcontroller 1002. One additional procedure, however, is to set contents of an adapter mode variable to indicate whether the adapter mode is a limit setting mode or an idle mode. Then, when a change position command is received at step 1126, it can be ignored if the adapter mode is not the limit setting mode. Otherwise, the position of the door can be continuously driven to the new end of travel position in the direction indicated for setting or adjusting limits according to the distances traveled.

New force sensitivity profile commands, set speed commands, and set force commands can be handled at step 1126 as follows. The establishment of the force sensitivity profile, in accordance with the principles of the present invention, is subsequently disclosed in great detail. At this point, it is only pointed out that when a new force sensitivity profile command is received, the contents of a force profile generation variable can be set to a value that will cause a new force profile to be generated during the next open and close operations of the door 10, while still using the old force sensitivity profile during those two door operations. Once the new force profile is generated, it can be substituted for the old force profile, and the force profile generation variable can be reset to a different value that will not immediately result in generation of a new force profile. When either the set speed commands or set force commands are received, then these commands can be handled by the main microcontroller 1000 in much the same manner as described above with regard to process 1104, when such commands are received from the secondary microcontroller 1002.

Raise fault commands and request fault log commands can be handled at step 1126 as follows. When a raise fault command is received, the fault indicated can be passed to a safety event handler to be processed. The event handler can be used to do several things, such as halt the main processor 1000 in the event of a critical error, at which point the secondary processor 1002 can perform a reset after a timeout of expansion bus 1004 activity. The event handler can also disable or reverse the motor on a critical fault (e.g., STB 1030 failure, excessive force, etc), and keep a log in EEPROM 1016 of the last six critical/severe faults. A fault code (e.g., one byte) and a copy of the days-on counter (e.g., two bytes) can be saved for each entry. The event handler can further send information about faults and/or system states to the diagnostic port 1042. If the fault passed to the event handler at step 1126 causes the main microcontroller 1000 to halt, then the response can be queued and sent by the safety event handler instead of the main microcontroller 1000. When a request fault log command is received, then a fault log message can be prepared and sent to the adapter 1034.

Set LEDs commands, issue diagnostics commands, and/or general acknowledgements can be handled at step 1126 as follows. Set LEDs commands can be encapsulated in expansion bus packets and queued for delivery to the secondary microcontroller 1002, which can parse the message and set the operator LEDs 1040 accordingly. Similarly, issue diagnostics commands can be sent to a diagnostics system in the main microcontroller 1000, which can process the commands and prepare a response; this response can be packed into a diagnostics response message and sent back to the adapter 1034 and/or to the diagnostics module 1042. When general acknowledgements are not received from the adapter 1034 as expected, thus indicating error, then the last command sent from the main microcontroller 1000 to the adapter 1034 can be sent again. If the general acknowledgement fails to be received a predetermined number of times (e.g., three times in a row), then the main microcontroller 1000 can attempt to start an establish communications sequence as described above.

Additional steps in the software control (FIG. 11) include a self test procedure 1128 performed each cycle to verify the memory (e.g., UL1998 RAM/ROM tests), check the motor current, check execution flags to ensure that required modules are executing, and check for critical faults. Following the self test procedure 1128, a control logic routine 1130 can be performed to analyze data collected thus far in the main loop 1100, along with other state variables, and make various decisions. Motor action state variables can be set to be handled by the motor control procedure 1132. In some instances, the control logic routine can include a non-safety sub-routine that is performed before a safety subroutine.

The non-safety subroutine portion of control logic routine 1130 can be implemented as a series of nested, conditional (e.g., fuzzy logic) operations that accomplish control of various functions of the barrier operator. These functions can include activating or deactivating a work light, entering or leaving a vacation mode, processing a diagnostic message, and/or clearing and setting flags and contents of other variables that can affect subsequent motor operation during the motor control procedure 1132. For example, if a motor is in idle mode, and if force profiles have been set or cleared within a last cycle of the main loop 1100, then an expansion bus message can be queued for delivery to the secondary microcontroller 1002 that contains force profile status information.

The subsequent safety subroutine portion of control logic routine 1130 can be implemented as another series of nested, conditional (e.g., fuzzy logic) operations that accomplish safety measures implemented by the barrier operator. Such measures can include thermal protection of the motor, emergency barrier reversal (e.g., excess force detection and/or obstacle detection), and power fail handling operations. As mentioned above, routine 1130 can also reset the safety beam (STB) 1030 pulse counter variable to zero every main loop cycle. This pulse counter variable is the one that is incremented in step 1122 and read in step 1120.

Thermal Protection of Motor

The thermal protection of the motor 28 is a safety function preferably carried out by the main microcontroller 1000. With respect to the AC version of the motor 28, the thermal protection is preferably accomplished with use of a thermal sensor hardware switch in the AC windings that opens in response to excessive heating. The microcontroller 1000 monitors a status bit to indicate the aforementioned excessive thermal condition.

With respect to the DC version of the motor 28, and in accordance with a feature of the present invention, the process for detection of motor temperature is without use of a thermal sensor. Rather, the power consumed by the motor is monitored. Specifically, with the use of a conversion algorithm that correlates motor temperature as a function of both motor load and running time of the motor, the temperature of the DC motor 28 can be accurately assessed. The algorithm is based upon incrementing a number, referred to as the thermal effectivity parameter or thermal load value (TLV). The TLV number increases with (i) the time that the DC motor is running, as well as (ii) the extent of the load. If the TLV number ever exceeds a predetermined value, experimentally established for each motor, the software is then effective to shut down motor operation for a certain "cooling off" period. The cooling off period is determined by experimentation as to how much the thermal effectivity parameter should be decremented per second before the motor can be restarted.

The main microcontroller 1000 observes the amount of time during motor operation that is calibrated for a worst case ambient temperature condition. The TLV number is incremented during motor operation as a function of time (e.g. every main loop cycle when the motor is running) and at a dynamic rate governed in part by force measured as a function of motor current. The TLV number also is decremented as a function of time (e.g., every main loop cycle) and at a rate governed in part by a motor cool down constant (CDC) selected to simulate motor cool down characteristics under worst case ambient conditions. In some instances, the worst case can assume that a worst case type of motor, barrier, drive combination is employed from among many types of motors that might be employed with the barrier operator. In other instances, the actual configuration of motor, drive, and/or door type can be determined and used to select a TLV value determined for that combination of equipment under worst case ambient conditions. When the TLV number exceeds the predefined thermal overload threshold, a flag is set to indicate thermal overload and cause motor shut down until the motor has had time to cool to an acceptable level.

As explained below, an update interval threshold (e.g., one second) can be observed as a timer for updating a force value. When this threshold is exceeded, then the TLV value can also be incremented if the motor is in a run mode. To increment the TLV value, the main microcontroller 1000 can add a constant part and a variable part to the then-present TLV. For example, the maximum force value (MFV) measured since the last update interval threshold can be employed as a scalar for the variable part of the amount to add to the thermal load value. For example, the TLV can be calculated according to:

$$TLV = TLV + 24 + MFV^2/4.$$

Regardless of whether the motor is in a run mode when the update interval is exceeded, the TLV value can also be decremented whenever the update interval timer exceeds the update interval threshold. However, the amount of the decrement can depend on whether the TLV exceeds the aforementioned thermal CDC. In particular, if the TLV is greater than zero and less than the thermal CDC, then the TLV can simply be decremented by a fixed amount (e.g., one). However, if the CDC is exceeded, then the TLV can be calculated when the motor is not running as follows:

$$TLV = TLV - (TLV/CDC)$$

Whenever the update interval timer exceeds the update interval threshold, a check can also be executed to determine whether the TLV exceeds the aforementioned thermal overload threshold. If so, a thermal shutdown flag can be set to cause the motor to shut down, and an expansion bus message can be queued, for delivery to the secondary microcontroller 1002, that enables a thermal shutdown. Once the software determines that the thermal limit has been exceeded, it can stop responding to door commands. In addition, it can light the LEDs 1040 on the barrier operator 30 to indicate this fault mode. In some embodiments, disconnecting the power from the unit will not clear this condition (e.g., store value in EEPROM). Only passage of time (i.e., decrementing TLV) will allow the motor to operate again. Thus, the TLV can decrement over time in the manner described above, allowing the TLV to eventually fall below the thermal overload threshold. At that point, the thermal shutdown flag is cleared and an expansion bus message queued, for delivery to the secondary microcontroller 1002, in order to disable the thermal shutdown.

Establishment of Force Sensitivity Thresholds and Force Measurements

After the travel limits have been established (FIG. 23), as subsequently described, and when the controller 30 is in its "learn" mode, force sensitivity threshold limits can be established. Accordingly, as the first step in this process, the motor can be instructed to move the door from, for example, its closed position to its open position, during which time the respective forces that are required to move the door along the discrete segments of tracks 14 and 16 (FIG. 1), without interruption, are recorded and stored. Thereafter, offsets of increased value in the form of a stepped configuration are automatically generated and stored, resulting in a defined force sensitivity threshold profile 2400 (see FIG. 24). The procedure is then repeated for the movement of the door in the opposite direction (e.g., from its open to closed position), and the offsets of increased value in the form of a stepped configuration defining that profile also automatically generated and stored. These two profiles therefore respectively define the "door opening" and "door closing" force sensitivity thresholds, namely the upper limit of the respective forces to which the door can be subjected before there is an indication of an obstruction, as it travels the respectively different segments of the tracks 14 and 16 (FIG. 1), between its open and closed positions, and vice versa. In addition, after at least one full door travel cycle has been completed, in which these "door opening" and "door closing" preliminary force sensitivity profiles are established, and with the door in its stationary or "parked" position, by depression of appropriate buttons on the head unit 26, for example, the user may optionally instruct the microcontroller 1000 to either increase or decrease, within a limited range, the level of these thresholds. The limitation to be placed on the total range of user adjustability can be, for example, about fifty percent or more of the total permissible force, for small measured forces, and a lower percent for larger measured forces. With this user adjustment, the final force sensitivity threshold profiles can be stored to be used during the "operate" mode of operation.

The main microcontroller 1000 thereafter automatically switches to the operate mode, and the forces thereafter measured during normal door operation can be compared to the stored force sensitivity threshold limits of the two profiles. This measurement may or may not necessarily be on a one for one basis. For example, multiple measurements of the actual force can continue to be taken, and then put through an algorithm to determine what is, in essence, an "effectively measured force." Then, if the effectively measured force for a designated portion of door travel exceeds the corresponding stored force sensitivity threshold for that portion of travel, an obstruction can be indicated, and the appropriate response can result (e.g., the motor is stopped if the door is on the way up, or the motor is stopped and reversed if the door is on the way down.)

After a fixed number of cycles (e.g., approximately one-thousand cycles or two-thousand operations), the microcontroller 1000 can be re-programmed to automatically switch back into the "learn" mode and capture new force sensitivity threshold profiles in accordance with the previously described routine, using the previously stored force sensitivity threshold limits during this re-programming in the event of an obstruction while "learning" the new profiles. Thereafter, and subject to again allowing the user to increase or decrease the force sensitivity threshold limits, the new force sensitivity threshold limits establish the new final force sensitivity threshold limits profile(s), to be compared to the thereafter actual measured force values during the travel of the door during its "operate mode." If desired, this re-programming operation may be instituted by the user to request a new force sensitivity profile at any time by the user depressing a preselected combination of buttons on the powerhead 26.

The actual force value can be measured in alternate ways. For example, for the DC motor version, and taking advantage of the fact that force is proportional to the current through the motor, a Hall Effect sensor 1024 (FIG. 10) can be used for measuring motor current, with its output inputted along path 1024a to the main microcontroller 1000 (as well as to microcontroller 1002). For the AC motor version, for example, taking into consideration that force is inversely proportional to motor speed, the optical wheel 1013A can be used for measuring the speed of the motor 28, with its output inputted along path 2000 to the microcontroller 1000. In either event, if the force that is so measured during the operate mode exceeds the stored force sensitivity threshold limit (determined by the increase of current over the limit in the case of the DC motor version, or decrease of motor speed below the limit in the case of the AC motor version), such event indicates the presence of an obstruction. As a result, the microcontroller 1000 will instruct the motor 28 to either stop, or stop and reverse, depending upon the direction of door travel, ignoring any other commands for a predefined distance of door travel after reversal.

When the garage door 10 is in motion in the down direction and comes into contact with an obstruction, the software causes the door to stop and, after a period of time, reverse, if the force is greater than the force sensitivity limit for that segment of door travel as previously determined by the force sensitivity limit of the force sensitivity profile for that segment. This condition is known as "torque-out". Thereafter, the door 10 will move to the open position unless commanded otherwise, but commands otherwise (e.g., to stop) can be ignored for a short distance (e.g., two inches of opening door travel immediately after reversal). In the event that the door is travelling upwards and comes into contact with an obstruction, the software will cause the door to stop without reversing. Also, the force can be ignored for the first portion of door travel immediately upon starting the motor in order to account for the transient nature of the current when the motor is started.

The force readings can be taken repeatedly when the door is in motion, and an averaging process can be performed on a pool of recently collected samples. These sampled averages can then be compared against the force profile 2400

(FIG. 24) determined at power up, as a function of door position. These force checks can be performed, for example, at least every one inch of door travel. If the force exceeds the maximum allowable value that was determined at this position of the door during force profiling, then the software can stop the motor and perform the torque-out procedures (i.e., stop, or stop and reverse).

The value from the Hall Effect sensor 1024 can change based on temperature, and the main microcontroller 1000 can handle the variations by reading the sensor 1024 prior to starting the motor, and using the reading to calibrate the sensor readings that will be taken in the upcoming run. Then, the voltage reading taken at the main microcontroller 1000 during upward ($V_{up}$) or downward ($V_{down}$) movement of the barrier can be adjusted for the voltage reading taken at zero current ($V_0$) as follows:

$$V_{up} = V_0 - C^* V_{up}, \text{ and}$$

$$V_{down} = V_0 + C^* V_{down},$$

where C is a constant (e.g. sixty-six one-thousandths).

As previously described, the main microcontroller 1000 samples the force over the range of motion of the door in determining the force sensitivity profiles, the profiles stored in non-volatile memory, such as EEPROM 1016.

The torque profile margin or offset which the user is allowed to adjust is normally adjustable through a menu option. This margin can represent more force or less force depending on user preference. This torque margin can also be added for different door segments. As an example, the final force sensitivity profiling process can produce one number of profile numbers for the door opening direction, and another number of profile numbers for the door closing direction, these numbers representing the permitted force for the distinctly different segments of door travel.

In some instance, it may be desirable that actual force detection be performed to compare to the force sensitivity profile 2400 (FIG. 24) during the safety subroutine of routine 1130 (FIG. 11). For example, the main microcontroller 1000 can first determine whether an update interval timer has exceeded a predefined update interval threshold. This update interval timer can be incremented at routine 1130 every main loop cycle. The update interval threshold can have a value (in main loop cycles) preselected to cause update periodically (e.g., every second), at which point the update interval timer, and a periodic maximum force variable containing the maximum force value measured in a last period of time (e.g., one second), can be reset to zero in routine 1130. Thus, while the maximum force reading can be updated every cycle with the current force reading if the current reading is higher than the value stored in the maximum force reading, the update interval threshold can cause the maximum force reading to be cleared periodically (e.g., every second). Clearing the maximum force reading periodically (e.g., once per second) ensures that the maximum force reading reflects a force measured within the predetermined period of time (e.g., one second).

The obstruction-caused barrier stop and/or reversal operations carried out in routine 1130 involve excess force detection. For example, the force detection process involves creating and using a force profile that is developed from average motor current recorded for discrete ranges of barrier travel position. During normal operation, the average motor current is updated every cycle as part of interrupt process 1108. Thus, actual force (F) can be calculated every cycle from the average motor current (C), the zero current level ($C_0$) measured during initialization, PWM duty cycle (D), and a maximum duty cycle ($D_{MAX}$) as follows:

$$F = (\text{abs}(C - C_0)^* (D/D_{MAX})).$$

In the garage door operation previously described, separate profiles are developed for the upward travel path and for the downward travel path, respectively, and user adjustable offsets from these profiles used as thresholds to detect the excess force. After a break-in period, (for example, after one-thousand completed cycles of upward and downward garage door movement), the new force sensitivity profiles can be obtained, and flags can be set to indicate that new profiles do not need to be obtained again to account for a break in period. The old force sensitivity profiles can be considered to be reliable enough to use during this process, but then discarded once the new profiles are obtained. New profiles can also be obtained when travel limits are recalibrated, and the force profiles can be ignored during limit calibration and during the first two full runs after limit calibration. When a force profile is not used, a predefined maximum force limit can be employed (e.g., a maximum of thirty amps DC during calibration, a maximum of two amps if force profiles have not yet been calibrated).

Figure 24:
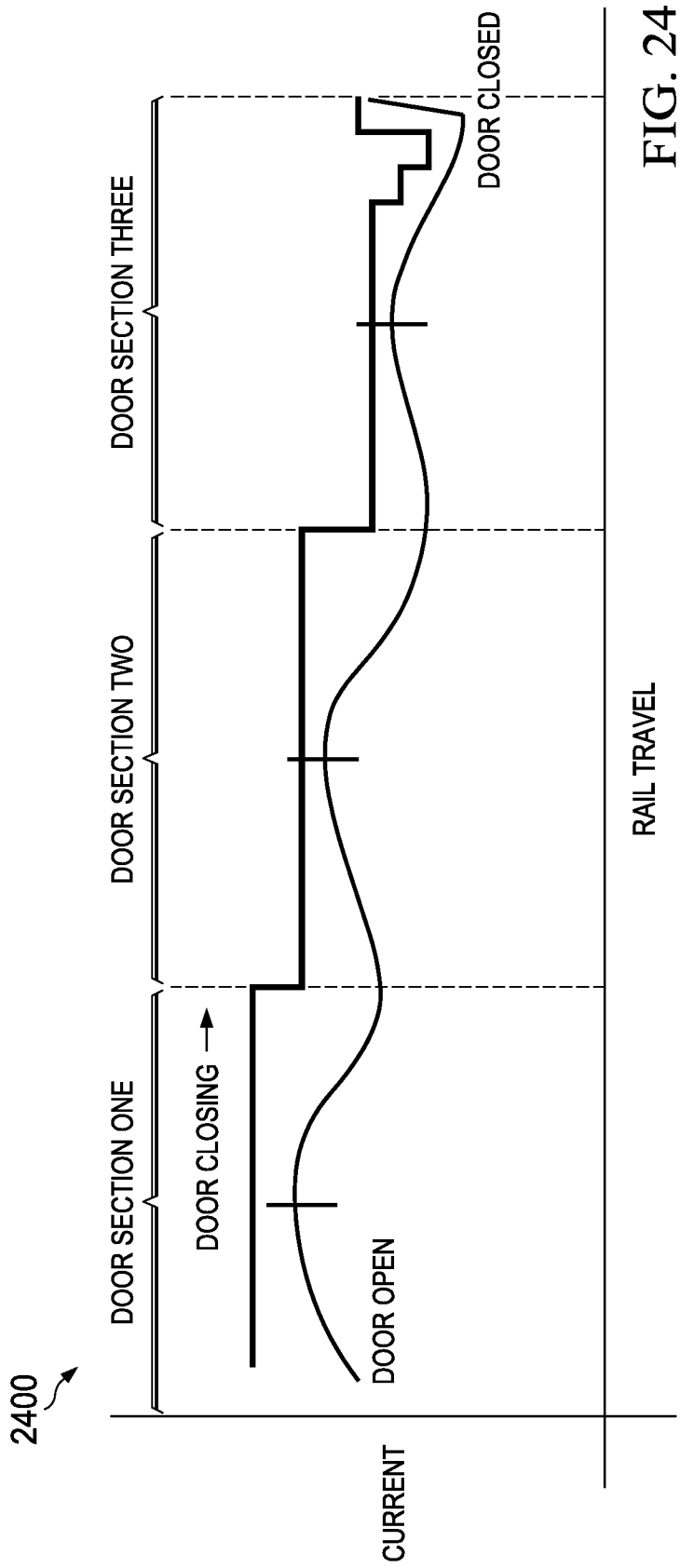
FIG. 24 is a graphical representation of the force sensitivity limits profile employed in the barrier operator system of FIG. 1.

As shown in FIG. 24, one component of the excess force detection carried out at routine 1130 can involve ignoring force limits 2400 imposed by a force sensitivity profile during the first few moments of motor operation. In ignoring these force limits 2400, the main microcontroller 1000 can compare a run time of the motor (i.e., a number of cycles since the motor was last started) to a predefined temporal threshold (e.g., number of cycles), and ignore the force limits 2400 if this temporal threshold is not exceeded. However, once the temporal threshold is exceeded, then the routine 1130 can calculate a current force value based on an average motor current reading, and obtain a force limit from a table of force limit values indexed by the barrier position and the user defined offset value.

If the motor is in a run mode, if the current door position is in a designated force measurement position for a predefined segment of door travel, and if no bit(s) or flag(s) have been set to indicate that a force profile update has already occurred for both up and down force profiles, then the current force value can be stored in a door position indexed array of measured force values at a location indexed for storing the measured force value for the current barrier position. This array can be used to collect a new profile that can be used to replace an old profile, if needed. However, if the motor is in an idle mode, then this array, the current force value, and the force limit can all be cleared or reset to zero.

In detecting excess force, routine 1130 can set the motor mode to a stop mode if the following conditions are met: the motor is in run mode, flags indicate that force sensitivity profiles are available, an AC power fail signal is low (indicating that AC power is available), and the calculated force is greater than the force limit. Following routine 1130, motor control procedure 1132 can proceed according to one of several top level motor states that the motor will enter based on data collected in the main loop as described above. For example, the motor can be stopped if a thermal shutdown mode has been triggered.

Following passage of the safety and non-safety start motor checks, a safety related initialization procedure can prepare the motor for movement. For example, if the lifetime cycle count exceeds a predetermined force profile update threshold (e.g., two-thousand cycles), and if a bit or flag has not been set to indicate that the force profile has already been updated, then a flag can be set to cause the force sensitivity profile to be updated based on the next two full runs.

Establishment and Monitoring of Travel Limits

Figure 22:
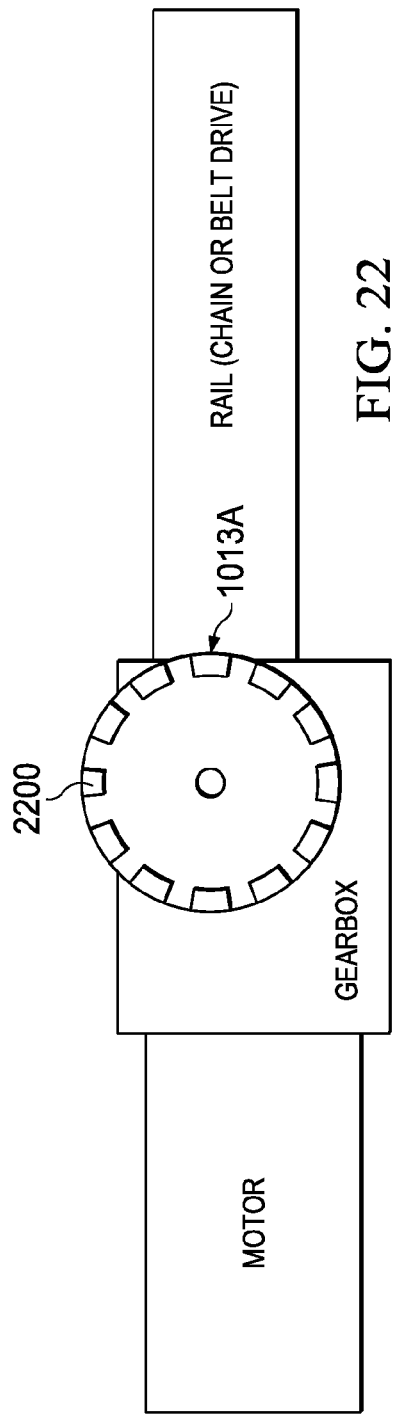
FIG. 22 is a perspective view of an optical wheel utilized to track position of the barrier controlled by the barrier operator system of FIG. 1.
Figure 23:
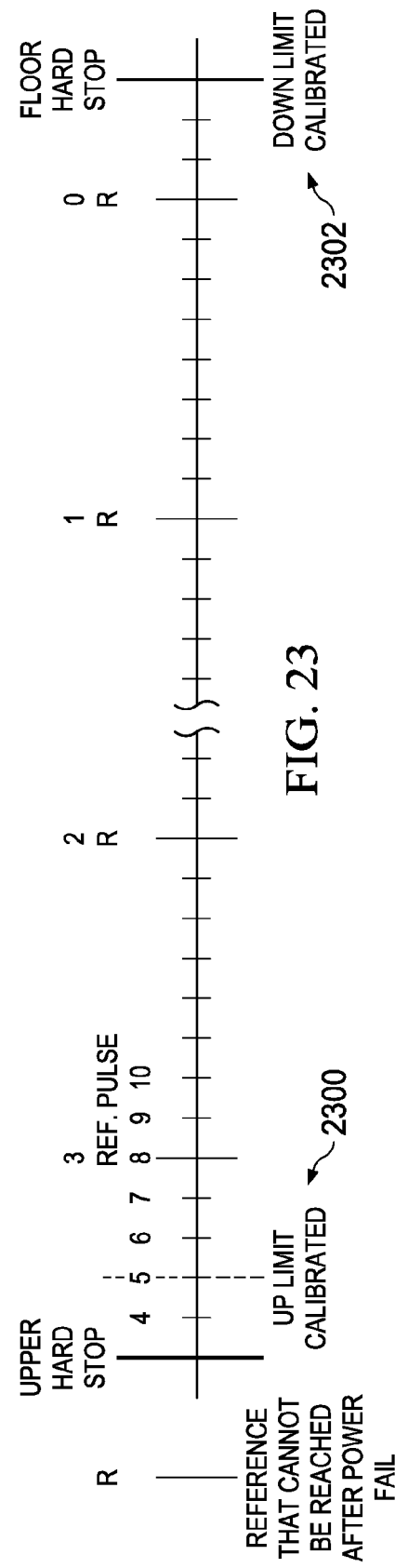
FIG. 23 is a graphical representation of the barrier travel limits employed in the barrier operator system of FIG. 1.

Referring now to FIG. 22 and FIG. 23, the establishment of the door travel limits is described. With the operator processor initially placed in the "learn" mode, these limits can be initially set (stored) by the "user" (e.g., homeowner, installer) in memory associated with the main microcontroller 1000 (FIG. 10), more particularly in the stand-alone on-board EEPROM 1016, during a full open/close cycle of the door. Specifically, the learn mode of the processor can initially be implemented through user-actuation of the button switches on the head unit. Then, after actuation of the motor to move the door, for example upwardly from its closed position, the user can press the appropriate button, halting the door when the door reaches the desired "open" position, and this position is stored as the upper travel limit 2300. The operator is then actuated to close the door, and the user in similar manner halts the door when it reaches the desired "closed" position, at which time the lower travel limit 2302 is stored. Alternatively, the user may choose to use this procedure to set and store the lower travel limit first, followed by the setting and storing of the upper travel limit when the operator 20 is thereafter moved to the "operate" mode; the electronically set upper and lower travel limits define the extent of door travel.

The method for determining position of the door employs an optical light beam sensor that outputs voltage pulses whenever the light beam is interrupted. Specifically, an optical wheel 1013A (FIGS. 10 and 22) is attached to the shaft of motor 28. The teeth or paddles of the wheel 1013A break the light beam as the motor shaft rotates, causing pulsed interrupts to the main microcontroller 1000. A multipaddle (i.e. four, eight, twelve, etc.) optical-wheel available from TORMATIC®, and as described in U.S. Pat. No. 7,339,338, which is incorporated herein by reference in its entirety for all purposes, can be used for this purpose. By keeping track of the number of interrupts that it has received, the main microcontroller 1000 can know and monitor the position of the door as it is moving up and down the rail. A counter can be incremented and decremented at step 1140 (see FIG. 11) as the door moves in either direction.

During the travel limit setting process, numbers can be obtained from this counter and stored in EEPROM 1016 (see FIG. 10), and these numbers correspond to the "up" (door open) travel limit 2300 and "down" (door close) travel limit 2302. These travel limits stored in EEPROM 1016 can be used from this time forward (or until they are reset) to stop the door at the ends of the tracks 14 and 16 (FIG. 1). In other words, as the main microcontroller 1000 (FIG. 10) is running the door up and/or down the tracks, it can, in step 1142 (FIG. 11), continually check the value of the position counter updated in step 1140 versus these pre-set limits, and it can shut the motor off when the travel position of the door is the same as the travel limit position. The main microcontroller (see FIG. 10) can disallow door motion until the travel limits 2300 and 2302 are set. The LEDs 1040 on the operator head unit 26 indicate this state.

As mentioned, the opto-sensor generates a pulse interrupt to the main microcontroller 1000 every time the optical wheel 1030A breaks the light beam. A timer can be used to measure the time between interrupts. By measuring the time of two consecutive periods, it can be determined if the reference paddle was seen (for the reference paddle, the two periods would no longer be 50/50 but roughly 70/30). The reference paddle 2200 can be used as a check to make sure that the physical location of the carriage 50 along rail 22 (and therefore the position of door 10 along tracks 14 and 16) is where it is intended to be. The number of reference paddle 2200 rotations can be used as a check because it can be known that a certain amount of reference paddles 2200 should correspond to a certain number of non-reference paddles.

It should be understood that various embodiments of the barrier operator can have different types of wheels, drives, motors, and reduction gears. For belt and chain units employing a CHIPPEWA® motor, a twelve tooth paddle wheel can be used in conjunction with a forty to one reduction gear. For screw drive units employing a JOHNSON® 1500 motor, a four tooth paddle wheel can be used in conjunction with a four to one reduction gear. Thus, a drive profile can specify the information needed to determine the barrier position, including the number of optical wheel paddles.

In the open position, the count can start at a number greater than zero to leave some room to mechanically slide past so that the counter never underflows. Reference pulses count from the opposite direction as shown in FIG. 23. In some embodiments, the software limits rely on the mechanical design having a trolley that can only re-attach at one point on the rail (for all types screw, belt, and chain). Without this single point of attachment, the software would be lost (unknowingly) in regards to true position of the door if the trolley was reattached in a different location. With the single attachment point, the software can keep accurate track of the door at all times with no drifting of the limits. This accuracy can also be accomplished in the event (or events) of any power outages (or brownouts), as well as under conditions when the power input is stable.

Returning now to FIG. 10 and FIG. 11 and referring generally thereto, the stop mode in procedure 1132 starts the process of stopping the motor. Its primary purpose is to disable the motor, but it is also responsible for modifying some state variables. For example, an expansion bus message can be queued for delivery to the secondary microcontroller 1002 to disable the motor relay, and this message can include information about whether or not the barrier stopped at a limit.

The stopping mode can respond to an almost full run by storing a set of force points associated with a door open or a door close (e.g., five force points for a door open, eight force points for a door close), and used to determine when an unusual force is encountered. A copy of these sets of force points can be stored in and initialized from EEPROM 1016 or set to zero in the event of a CRC failure, and filled in after motor stop on the first full open run after limit calibration. For example, if an almost full run occurs (e.g., within one optical wheel rotation of the upper and lower limits) then the set of force points for the direction of travel can be created in EEPROM 1016 if it is not already created or if it requires an update. If a limit to limit run was not completed, then this profile can be set to update on the next run. To complete the stopping mode, a current position can be recorded as an idle position, the motor direction can be set to off, and the run time can be set to zero. Then, a next direction field can be toggled, and the target time (i.e., the number of microseconds expected between paddles on the optical wheel) can be set to zero.

Following procedure 1132, at the bottom of the main loop, a local cycle counter as well as a cycle counter can be incremented. If the local cycle counter is greater than or equal to a predetermined threshold selected to reset the counter once per day, then a days on counter can be incremented in EEPROM 1016, and the local cycle counter can be reset. At this point, a watchdog timer can be reset, and this timer can be observed at step 1102 to wait for the timer to indicate fifty milliseconds have passed in this cycle before restarting the loop. While waiting for the next loop iteration, if the motor mode is not the run mode, then an EEPROM task step 1136 can be performed. The main microcontroller 1000 can store a copy of one-hundred twenty-eight bytes of the EEPROM 1016 in RAM and also have a corresponding set of one-hundred twenty-eight flags which can be set if a value changes. An EEPROM queue system can queue up writes for the data that has changed during the cycle. For example, if a motor configuration is changed, then this value can be written, and a CRC updated. Each changed data bit can have a bit changed in the changed array. At step 1136, the change bits for the EEPROM data (bottom up) can be checked and, if a change is found and the EEPROM 1016 is not busy, the byte can be written to the EEPROM 1016. The EEPROM 1016 can return an ACK ('0') when the write cycle is complete. The EEPROM 1016 can be polled and if it returns an ACK, then a write can be initiated.

As mentioned above, the secondary microcontroller 1002 in the head of the barrier operator system can have two primary responsibilities. The first is to act as a safety double check within the system. The secondary microcontroller 1002 can perform safety checks and, when appropriate, can disable the motor or perform other safety related functions. The safety checks can include some basic sanity checks for ensuring the main microcontroller 1000 is in good health. Secondly, the secondary microcontroller 1002 can provide some interface functions to the outside world; for example, managing a KEELOQ® protocol.

As described above, the secondary microcontroller 1002 can communicate with the main microcontroller 1000 over the expansion bus 1004. MSSP 1043 can be used for this task. The secondary microcontroller 1002 can be responsible for handling certain messages from the adapter 1034. These messages can be forwarded to the secondary microcontroller 1002 via the expansion bus 1004 protocol, and the responses can be sent as uninitiated requests which the main microcontroller 1000 then forwards to the adapter 1034.

In addition to the expansion bus 1004 as described above, the secondary microcontroller 1002 can communicate with the main microcontroller via one or more additional lines. For example, a remote detection line 1044 can be set HIGH to tell the main microcontroller 1000 that a KEELOQ® command has been received, and to open the door. Line 1044 can be set LOW after a predetermined amount of time (e.g., six hundred milliseconds). If the main microcontroller 1000 did not handle this pulse within the predetermined amount of time, then it can be assumed that the main microcontroller 1000 is busy, or that the STB 1030 or other event is stopping the barrier. Additionally, another line 1046 can be driven low by the main microcontroller 1000 to indicate that a fault has occurred. The secondary microcontroller 1002 can cease looking for expansion bus 1004 messages, disable an operator UI, and disable the motor enable and light relays. Once this is done, the secondary microcontroller 1002 can flash both of its operator LEDs 1040 red to indicate the halt. During this time, the secondary microcontroller can run on a sixty-five millisecond loop time using a timer 1048 overflow flag as a signal to begin a new loop.

The operator UI can allow a user to program speed, adjust force limits, calibrate door limits, and learn remotes. Updated values can be sent to the main microcontroller 1000 via the expansion bus 1004 based on user input. When idle, the operator UI can display specific fault conditions on the status LEDs 1040. Common fault conditions can be non-calibrated limits, torque-out, vacation mode, etc. These LEDs 1040 can also be used to indicate when a valid RF signal is heard while the motor is idle, and indicate whether the RF signal was of one access code protocol (e.g., INTELLICODE® I) or of another access code protocol (e.g., INTELLICODE® II), a description of which is subsequently described. INTELLICODE® I and INTELLICODE® II are the respective designations for two different access code protocols developed and used by Overhead Door Corporation, the assignee of the inventions of this application.

The INTELLICODE® I access code protocol is described in U.S. Pat. No. 6,667,684, specifically at Col. 4, line 49 through Col. 6, line 15, assigned to the assignee of the present invention; this patent is incorporated by reference herein in its entirety for all purposes. The controller software of the barrier operator 20 is effective to decode both the INTELLICODE® I code transmissions from one set of transmitters 53 and the INTELLICODE® II code transmissions from a different set of transmitters 53, the latter utilizing the secure signature bits, as described below with reference to FIG. 25.

INTELLICODE® II Access Code Protocol

The INTELLICODE® II code, described in greater detail below with reference to FIG. 25, includes, inter alia, the generation of a CRC checksum from the rolling code and signing the rolling code with a digital signature. It can then prepend a serial number and append part of the unsigned rolling code to arrive at a seventy-two bit rolling code. The INTELLICODE® II code protocol uses a twenty-four bit synchronization counter instead of a sixteen bit synchronization counter. Thus, it can be distinguished from the INTELLICODE® I code version by starting off generating the a thirty-two bit hopping code using the same encryption process as the INTELLICODE® I version, except with a twenty-four bit, rather than a sixteen bit, synchronization counter being included in the seed upon which the encryption is applied. Then, it calculates a checksum from the thirty-two bit hopping code. Thereafter, it uses a sixty-four bit signature key in applying a decryption process to a seed composed of part of that checksum and part of that hopping code, thus making a new thirty-two bit hopping code. Then, it attaches a twenty-eight bit serial number and another part of the first hopping code to the second thirty-two bit hopping code to arrive at the final seventy-two bit codeword.

Transmission of Access Codes

The hand-held transmitters 53 (and the keypad console when transmitting wireless RF transmissions) automatically toggle between 315 Mhz and 390 Mhz RF transmissions in response to a predetermined number (e.g., five) of identical information packets (e.g., KEELOQ® information packets) that are sent on each channel, the receiver in the door operator 20 synchronously toggling with such transmissions. This toggling enables the receiver to choose the strongest signal. Additional details regarding this functionality can be found in U.S. Pat. App. Pub. No. 2010/0301999, assigned to the assignee of the present invention, the disclosure of which is incorporated herein by reference in its entirety for all purposes.

In accordance with another feature of the inventions described herein, the transmitters 53 have the ability to switch back and forth to transmit both INTELLICODE® I access codes and INTELLICODE® II access codes. Specifically, and as an illustration, a user presses and holds a button on the transmitter down for a predetermined time followed by a confirmation depression, and pursuant to software control, the transmitter can then function to transmit INTELLICODE® I code transmissions while prior to that procedure, it was only transmitting INTELLICODE® II access codes.

The receiver in the operator 20 also has the ability to decode INTELLICODE® I or INTELLICODE® II transmissions. For example, after moving the operator to the "learn" mode, the user can initially transmit a previously learned INTELLICODE® II code from the transmitter, and the receiver can respond by opening a window of time for it to listen for an INTELLICODE® I signal, at which time a transmitter with the INTELLICODE® I code may be actuated, and the receiver learns the INTELLICODE® I code.

Accordingly, the LEDs 1040 can blink different colors depending on which type of signal was received. These LEDs 1040 can additionally be used to indicate learning mode states. For example, a right LED can blink one color (e.g., purple) while waiting for a signal to learn. Also, if a learned INTELLICODE® II remote is heard, then when a certain time window (e.g., thirty seconds) is opened for accepting new INTELLICODE® I remotes, both LEDs 1040 can blink purple during this thirty second window. Additionally, if an INTELLICODE® I remote is heard, both LEDs 1040 can stay solid color (e.g., purple) until it is heard again, at which point the information authorizing the remote can be saved to an internal EEPROM. However, if a user presses both up and down buttons on the remote and holds them down for a requisite period of time (e.g., three seconds) while the window for learning a remote is open, then all learned KEELOQ® information packets can be erased, and the LEDs 1040 can supply an appropriate confirmation of completion of this operation.

Secondary Microprocessor and Associated Software Routines

Timer 1048 of the secondary microprocessor 1002 can be used as a free standing timer. For example, timer 1048 can be set with a 2× prescaler to give timer 1048 a resolution of one millisecond per-tick, and a sixty-five and five-hundred thirty-five milliseconds overflow. In some embodiments, there may not be an over-flow interrupt, but the interrupt flag can still be polled. Timer 1048 can be used to determine a rate at which the main microcontroller 1000 is communicating over the expansion bus 1004, to determine if it is polling at the wrong rate, so that it can be verified that the main microcontroller is running at the correct speed, and can also be used for KEELOQ® tasks.

Secondary microcontroller 1002 can have a number of additional timers, an internal oscillator, and a secondary device. For example, timer 1054 and CCP2 1056 can be used for a PWM for a buzzer alarm 1058. Timer 1054 can be configured with a sixteen times prescaler, and a period register of 0xFF (i.e., approximate PWM frequency of one-hundred twenty-two hertz). The duty cycle can be set to fifty percent. Also, an internal oscillator can be set to operate the microcontroller, for example, at eight megahertz, resulting in the secondary microcontroller 1002 having a speed of one instruction every five tenths microseconds. A KEELOQ® interrupt, described below with reference to FIG. 12, can consume a significant portion of the secondary microcontroller 1002 processing power. Therefore, the operational instruction time can be much longer than five tenths microseconds. Additionally, a watchdog timer (WDT) 1060 can be set to reset the microcontroller every one-hundred forty-four milliseconds if the WDT 1060 is not cleared. Also, timer 1062 can be used by the KEELOQ® system to poll the RF line 1064 connected to receiver 1066.

Timer 1062 can be set to cause an interrupt at, for example, sixty microseconds. Further, the motion detector 1068 can be hard wired into a pin of the secondary microcontroller 1002 that is utilized for a secondary device. If the secondary device detects movement, then it can turn on a head lamp 1070 for a given number of cycles selected to turn on the light for a desired amount of time (e.g., four minutes).

The secondary microcontroller 1002 can have an internal EEPROM used to store configuration values, such as KEELOQ® serial numbers and KEELOQ® synch counters. The worst case write time for a byte to this internal EEPROM can be, for example, six milliseconds. Bytes of the internal EEPROM can be configured to store various types of bytes. For example, the synch counter of the first stored KEELOQ® remote can be stored, with an upper byte holding the lower eight bits of the discrimination bits in the case of an INTELLICODE® I remote. Also, the internal EEPROM can be used to store type information for the first remote. Additionally, for each stored remote, the internal EEPROM can store an encoding scheme (INTELLICODE® I or INTELLICODE® II) and whether it is an accessory remote or a door remote.

Referring now to FIG. 12 through FIG. 20, the flow diagram describing operation for the secondary microprocessor 1002 is now described. The process includes an initialization procedure 1200 (FIG. 12) and a main loop that can begin with a main synch task 1202. The main synch task 1202 can wait for a new request from the main microcontroller 1000. In the case that a new request is periodically sent by the main microcontroller 1000 (e.g., every fifty milliseconds), the tasks after the main synch task can assume that they will be called periodically (e.g., once every fifty milliseconds). These tasks can include a safety task 1204 that verifies the system and prevents motor usage if unstable, and an operator UI task 1206 that displays faults on the LEDs and handles program and up/down button presses. The tasks in the main loop can further include a KEELOQ® task 1208 that handles a completed KEELOQ® packet, and a light/alarm task 1210 that checks the motion detector and turns off the light and alarm after a given duration.

Figure 13:
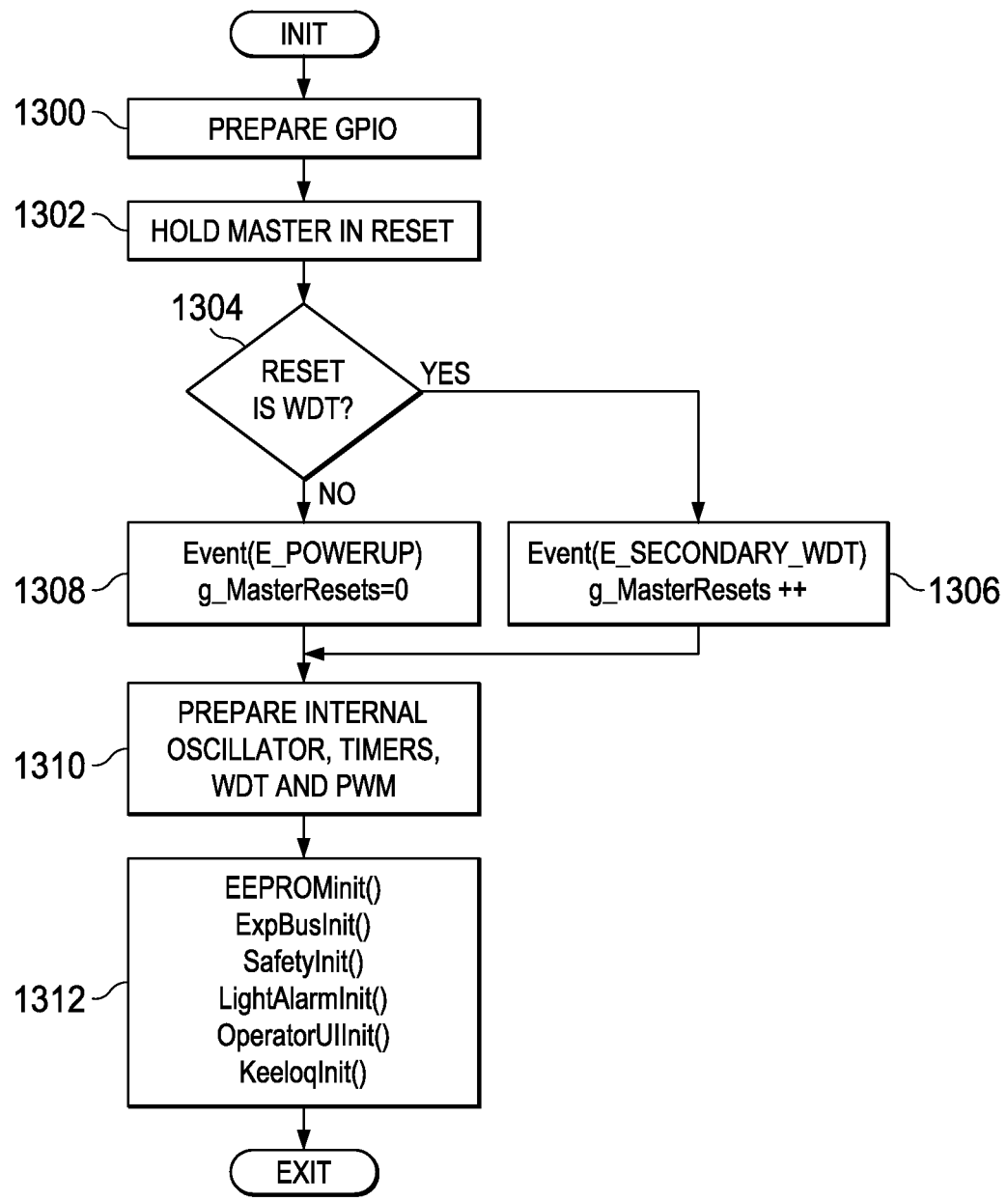
FIG. 13 is a flow diagram illustrating an initialization process carried out by the secondary microcontroller of the controller unit of FIG. 10.

Referring to FIG. 13, the initialization procedure 1200 (FIG. 12) can begin at step 1300 by preparing the general purpose input output ports of the secondary microcontroller 1002, followed by holding the master microcontroller 1000 in reset. If the cause of the reset is determined at decision step 1304 to be the WDT 1060 (FIG. 11), then a counter recording the number of resets of the master microcontroller 1000 can be incremented at step 1306. Otherwise, at step 1308, a power up event can be issued, and the counter recording the number of resets can be set to zero. Next, at step 1310, the internal oscillator, timers 1048, 1062, and 1054, WDT 1060, and PWM can be prepared as described above. Finally, at step 1312, initialization can be performed for the internal EEPROM, expansion bus (e.g., set the I²C slave address to a value stored in a configuration file), ADC and designated safety memory, headlamp, alarm, operator UI, and timer 1062 (see FIG. 11) interrupt service routine (e.g. decode and store incoming KEELOQ® RF data).

Figure 14B:
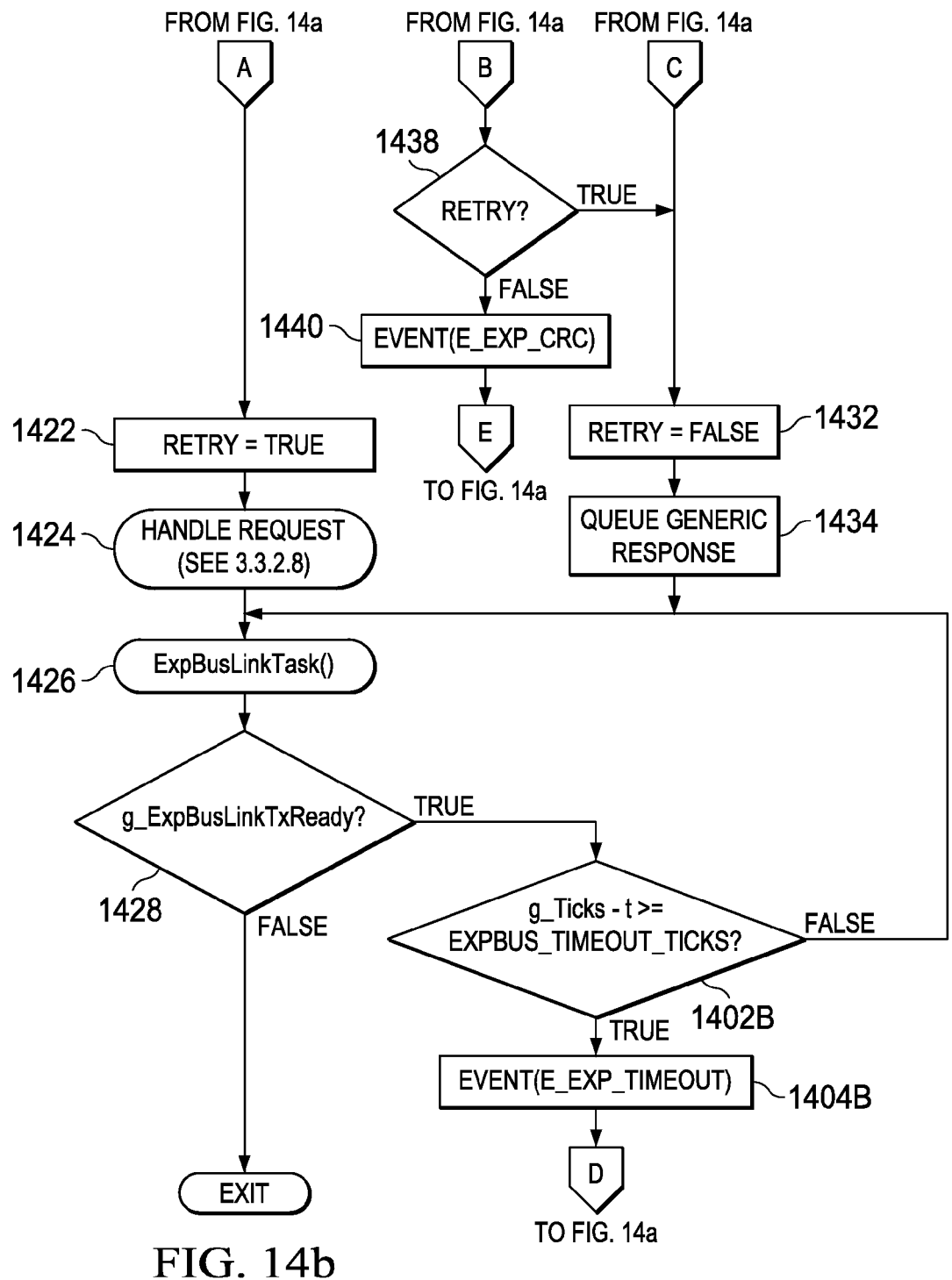

Turning now to FIG. 14, the main synch task 1202 (see FIG. 12) can set a variable at step 1400 equal to the value of the timer 1048 (see FIG. 11), so that it can be determined at decision steps 1402A and 1402B whether a maximum number of timer overflows has been exceeded. These decisions can be based on a difference between the value recorded at step 1400 and the respective timer values at steps 1402A and 1402B, and whether that difference exceeds a maximum overflow threshold. Exceeding this maximum overflow threshold can cause an appropriate timer overflow event to be triggered at steps 1404A and 1404B.

Figure 15:
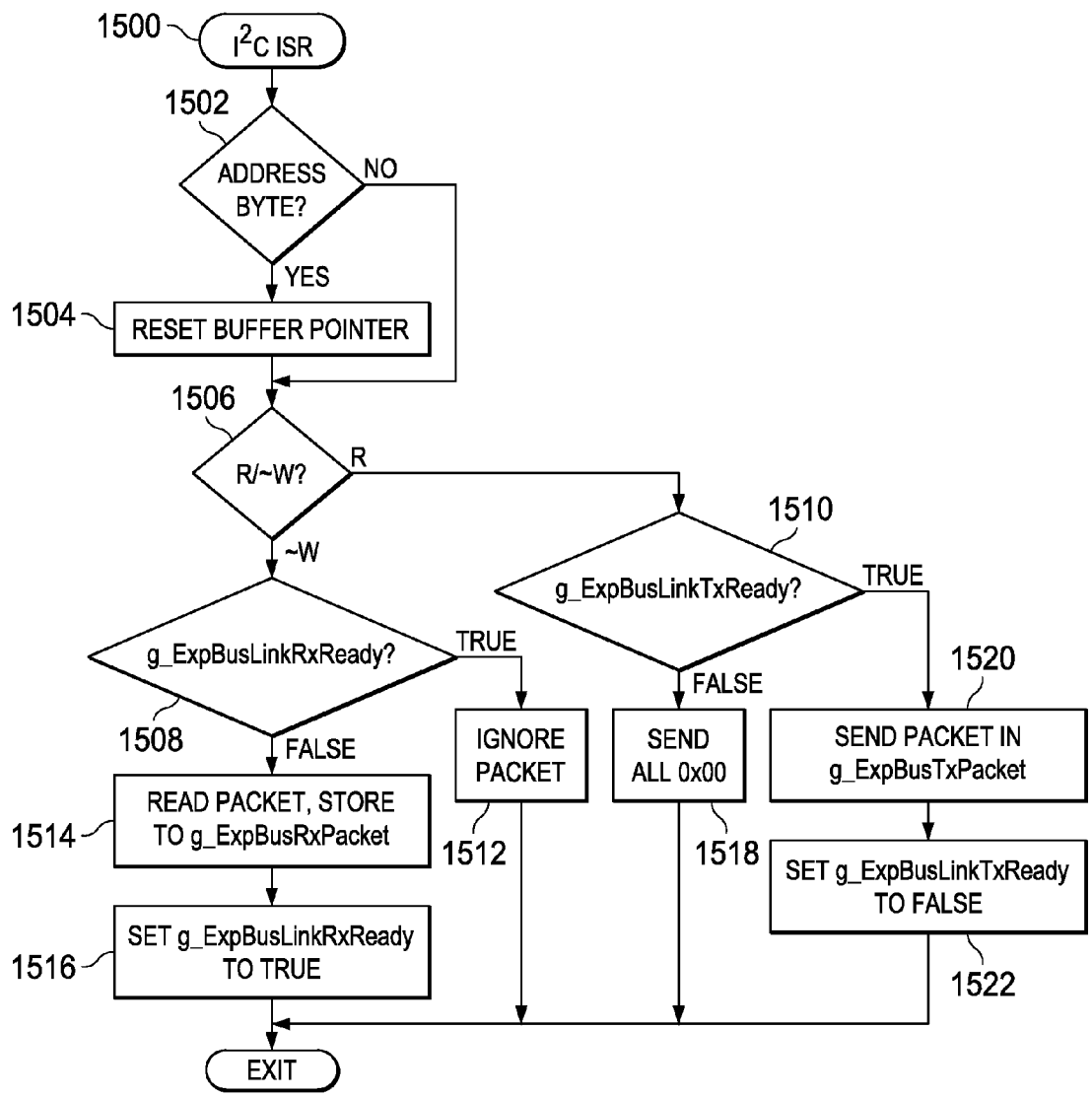
FIG. 15 is a flow diagram illustrating an expansion bus link task carried out by the secondary microcontroller of the controller unit of FIG. 10.

Following step 1400, an expansion bus link task can be conducted at step 1406, and this expansion bus link task is detailed in FIG. 15. In FIG. 15, the expansion bus link task can begin at step 1500 by polling the flag set by the I$^2$C interrupt service routine as discussed above. If the flag is not set, then the expansion bus link task can be skipped. Otherwise, a determination can be made at decision step 1502 whether an address byte is observed. If so, then expansion bus timer variables can be set to record the last two timer 1048 values so that these values can be compared to determine rate failure in the main synch task 1202 (see FIG. 12) at step 1408 (see FIG. 14). Then, depending on whether a read or write is being made, as determined at decision step 1506, further determinations can respectively be made, at decision steps 1508 and 1510, regarding whether the expansion bus receive queue contains a packet that needs to be dealt with, or whether the expansion bus transmit queue contains a packet that needs to be transmitted. For example, steps 1508 and 1510 can be accomplished by checking flags set to indicate these statuses. If it is determined at step 1508 that the receive queue already contains a packet, then the newly received packet can be ignored at step 1512. Otherwise, the new packet can be read and stored to the receive queue at step 1514, and the flag can be set to indicate that the receive queue contains a packet at step 1516. If it is determined at step 1510 that the transmit queue does not contain a packet already, then null values can be sent to all at step 1518. Otherwise, the packet in the transmit queue can be sent at step 1520, and the flag can be set at step 1522 to indicate that the transmit queue is empty.

Returning now to FIG. 14, following the expansion bus link task conducted at step 1406, a determination next follows, at decision step 1410, whether the flag is set to indicate that there is a packet in the receive queue. If not, then decision step 1402 determines whether excess overflow of timer 1048 (see FIG. 11) has occurred. If so, then the timeout event is triggered at step 1404A, and processing returns to step 1400. Otherwise, processing returns to step 1406. However, if decision step 1410 is passed, then the timer values are compared at step 1408 as discussed above to determine whether the rate of communication is within an expected range. If so, and if a determination is made, at decision step 1412, that a retry flag is set to prevent a retry, then a rate event is triggered at step 1414, LEDs are operated to show a fail status at step 2000 (see FIG. 20), and at step 2002 (see FIG. 20), a motor relay is disabled and a flag is set to indicate that the motor is not enabled.

If it is determined at decision step 1412 that a retry flag is not set to prevent a retry, then the retry flag can be set at step 1416 to prevent a retry attempt. Then, following step 1408 in the event the rate was in the acceptable range, and following step 1416, a determination can be made at decision step 1418 whether a sequence number is valid. If so, and if a CRC is also determined to be valid at decision step 1420, then the retry flag can be set to allow a retry attempt at step 1422, and an expansion bus request can be handled at expansion bus request handling step 1424.

Figure 16A:
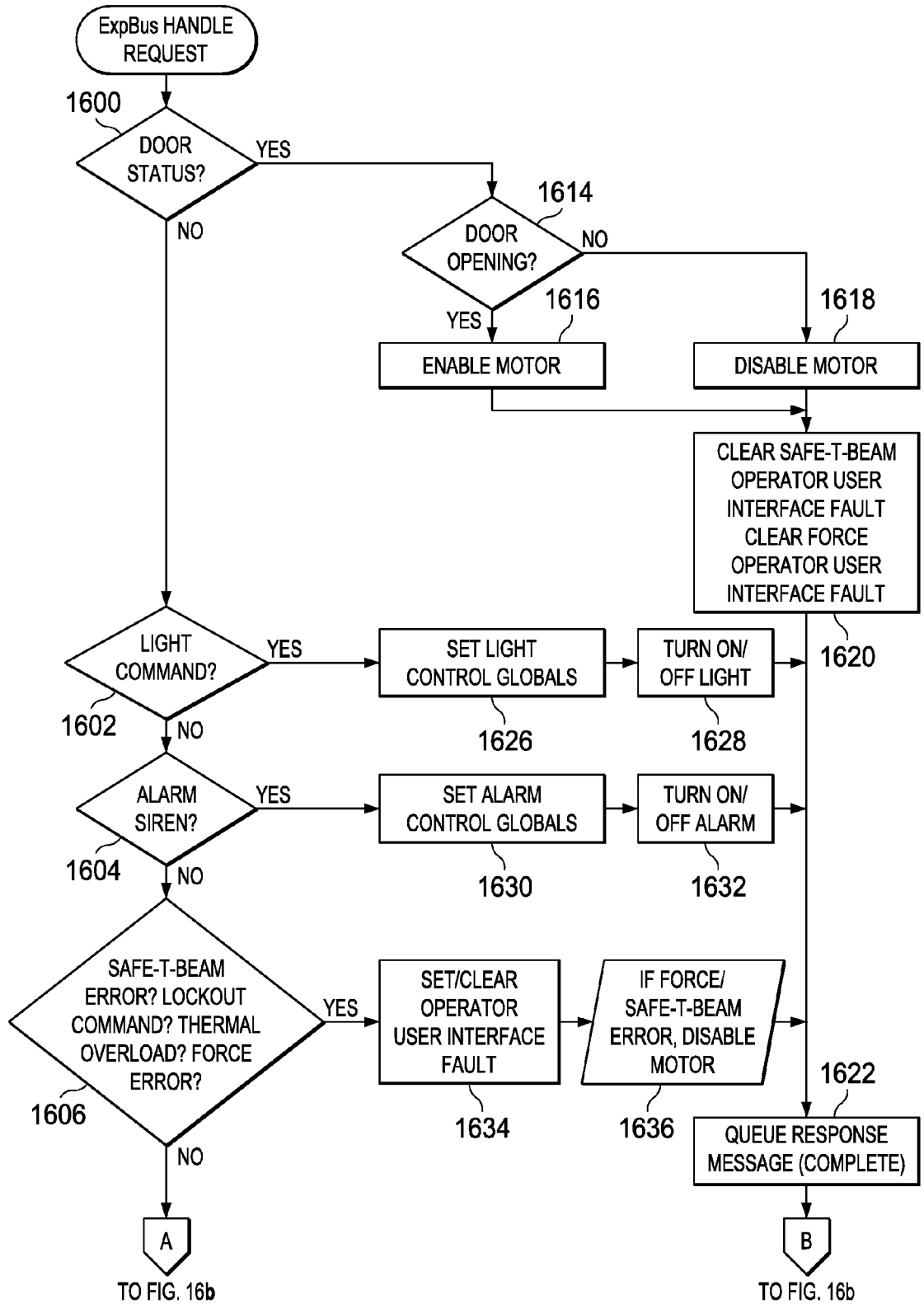
FIGS. 16a and 16b are flow diagrams illustrating an expansion bus request handling process carried out by the secondary microcontroller of the controller unit of FIG. 10.
Figure 16B:
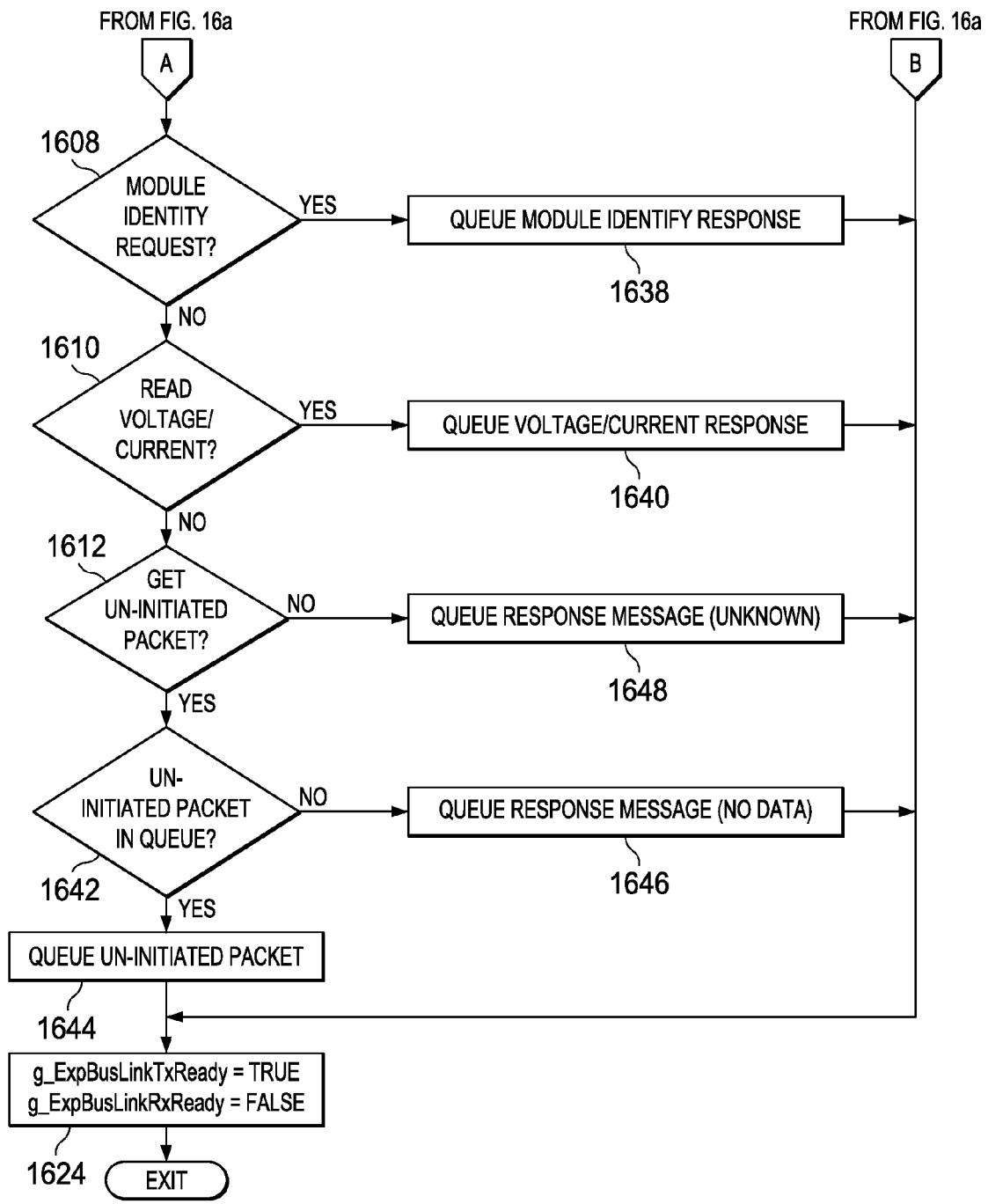

Turning briefly to FIG. 16, the process for carrying out the expansion bus request handling step 1424 (see FIG. 14) can first determine what kind of request is being handled. For example, determinations can be made at steps 1600-1612 whether the request is: a door status request (i.e., step 1600); a light command (i.e., step 1602); an alarm siren (i.e., step 1604); an STB error lockout command, thermal overload, or force error (i.e., step 1606); a module identity request (i.e., step 1608); a voltage/current read request (i.e., step 1610); or a get uninitiated packet request (i.e., step 1612). Processing of the request can vary depending on these conditions. However, if the request is not recognized at all, then a message can be queued at step 1648 for delivery over the expansion bus to indicate that the request was unknown, followed by setting expansion bus status flags at step 1624 to indicate that the expansion bus is ready to transmit, and that it is not ready to receive.

In the event of a door status request at step 1600, a further determination can be made at decision step 1614 whether the barrier is opening. If so, then the motor can be enabled at step 1616; if not, then the motor can be disabled at step 1618. Disabling the motor at step 1618 can involve setting a flag to indicate that the motor is disabled, and also disabling a motor enable pin. In contrast, enabling the motor at step 1616 can involve setting a flag to indicate that the motor is enabled, but without turning on a motor drive pin. In either case, steps 1616 and 1618 can both be followed by step 1620, at which flags indicating a STB operator user interface fault and/or a force operator user interface fault can be cleared. Then, a response message can be queued at step 1622 that indicates completion of the request, and the expansion bus status flags discussed above can be set at step 1624.

In the case of a light command at step 1602, the light control globals can be set at step 1626, and the light can be turned on or off as requested at step 1628. Step 1628 can be followed by step 1622 and step 1624 as described above. Similarly, in the case of an alarm siren at step 1604, the alarm control globals can be set at step 1630, and the alarm can be turned on or off as requested at step 1632. Step 1632 can also be followed by step 1622 and step 1624, as described above. However, in the case of an STB error lockout command, thermal overload, or force error at step 1606, the operator UI fault can be cleared at step 1634. Then, if it is a force error or STB error lockout command, the motor can be disabled at step 1636, which can entail disabling the motor drive pin and setting a motor enable flag to indicate that the motor is not enabled. Then, step 1636 can be followed by step 1622 and step 1624 as described above.

In the case of a module identity request at step 1608 or a voltage/current read request at step 1610, appropriate response messages can be queued respectively at step 1638 and step 1640, and these steps can be followed by step 1624 as described above. However, in the case of a get uninitiated packet request at step 1612, a further determination can be made at decision step 1642 whether there is an uninitiated packet in the queue. If so, then the uninitiated packet can be queued at step 1644 for delivery over the expansion bus. Otherwise, a response message containing no data can be queued at step 1646 for delivery over the expansion bus. In either case, step 1644 and step 1646 can be followed by step 1624 as described above.

Returning now to FIG. 14, following step 1424, an expansion bus link task step 1426 can be preformed. This expansion bus link task step 1426 can be the same procedure performed at step 1406, as described in detail above with reference to FIG. 15. Then, a determination can be made at decision step 1428 whether the expansion bus transmit flag is set to indicate readiness of the expansion bus to transmit. If not, then the master sync task step 1202 (see FIG. 12) can be complete. Otherwise, processing proceeds through step 1402B and step 1404B as described above, and thereafter returns to step 1400 as also described above.

Another branch of processing can be followed after step 1418 if the sequence number is not determined to be valid.

In this case, a determination can be made at step 1430 whether the retry flag is set to permit a retry attempt. If so, then the retry flag can be reset at step 1432 to disallow a further retry attempt, and a generic response can be queued at step 1434, after which processing proceeds to step 1426 as described above. However, if the retry flag is determined at step 1430 to be set to disallow a retry attempt, then a sequence number error event can be triggered at step 1436, followed by steps 2000 and 2002 (see FIG. 20) as described above.

Another branch of processing can be followed after step 1420 if the CRC is not determined to be valid. In this case, a determination can be made at step 1438 whether the retry flag is set to permit a retry attempt. If so, then the retry flag can be reset at step 1432 to disallow a further retry attempt, and a generic response can be queued at step 1434, after which processing can proceed to step 1426 as described above. However, if the retry flag is determined at step 1438 to be set to disallow a retry attempt, then a CRC error event can be triggered at step 1440, followed by steps 2000 and 2002 (see FIG. 20) as described above. If an event occurs that requires reset of the Main processor, an event system can disable the motor if it was already enabled.

Figure 17A:
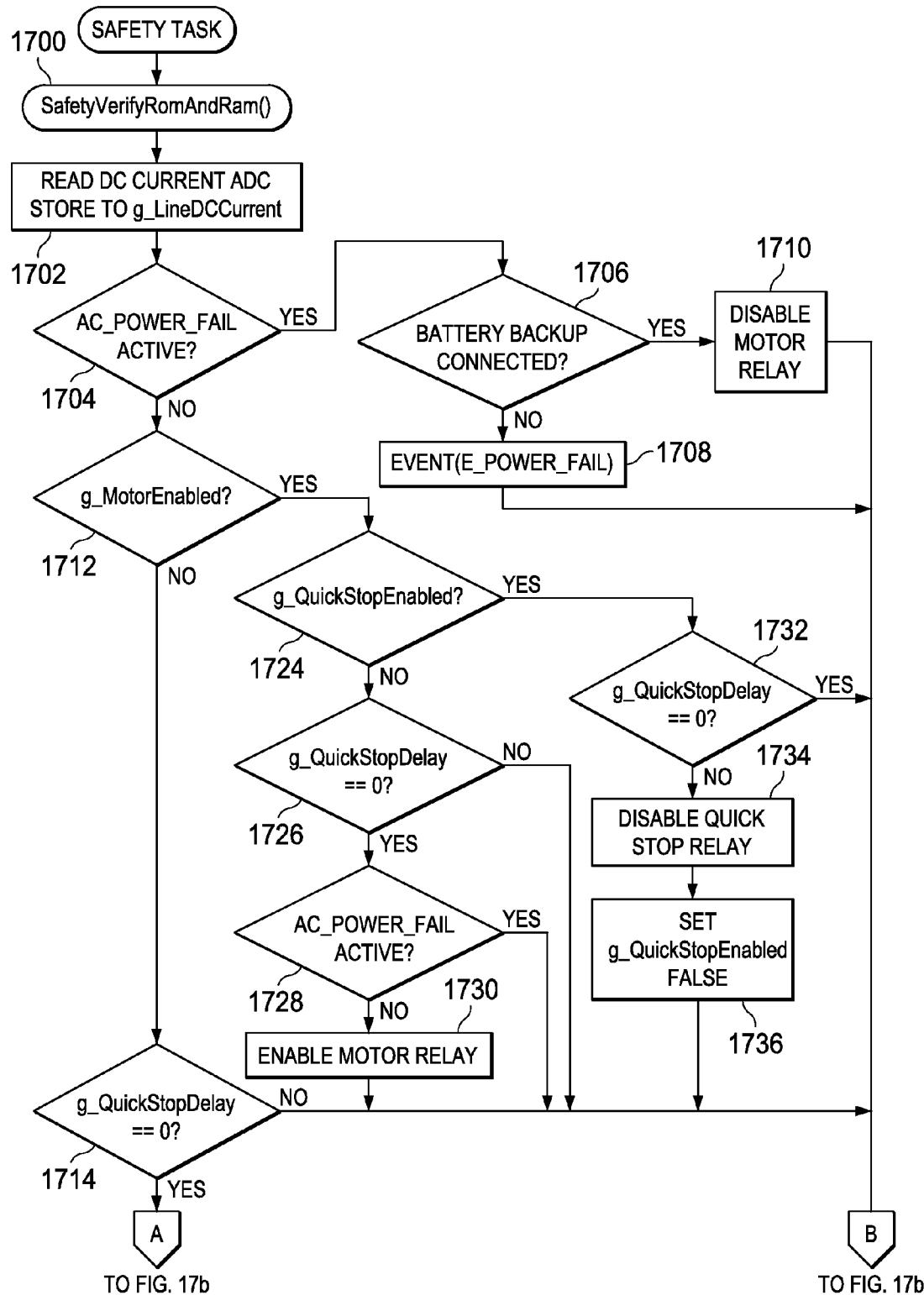
FIGS. 17a and 17b are flow diagrams illustrating a motor safety task carried out by the secondary microcontroller of the controller unit of FIG. 10.
Figure 17B:
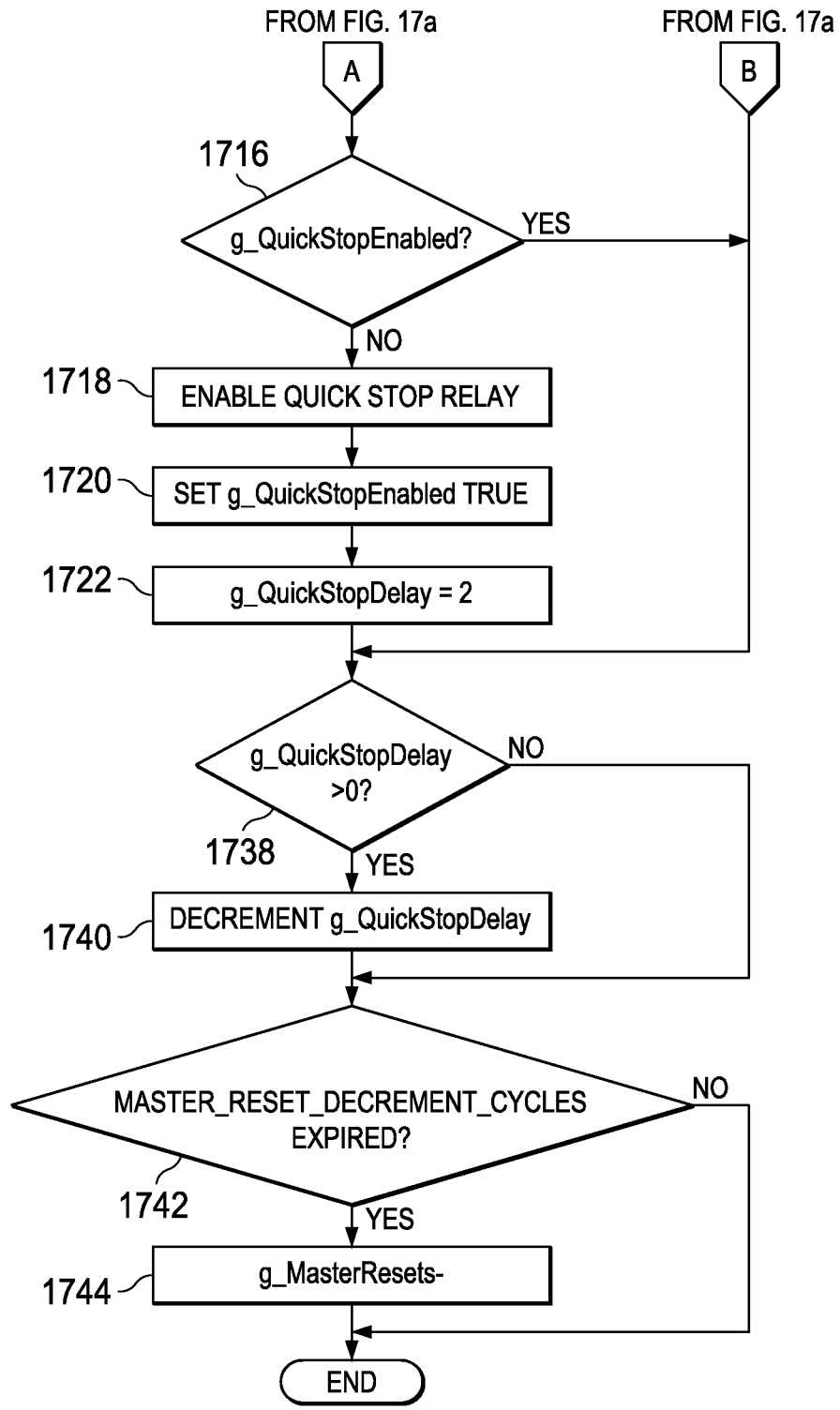
Figure 18:
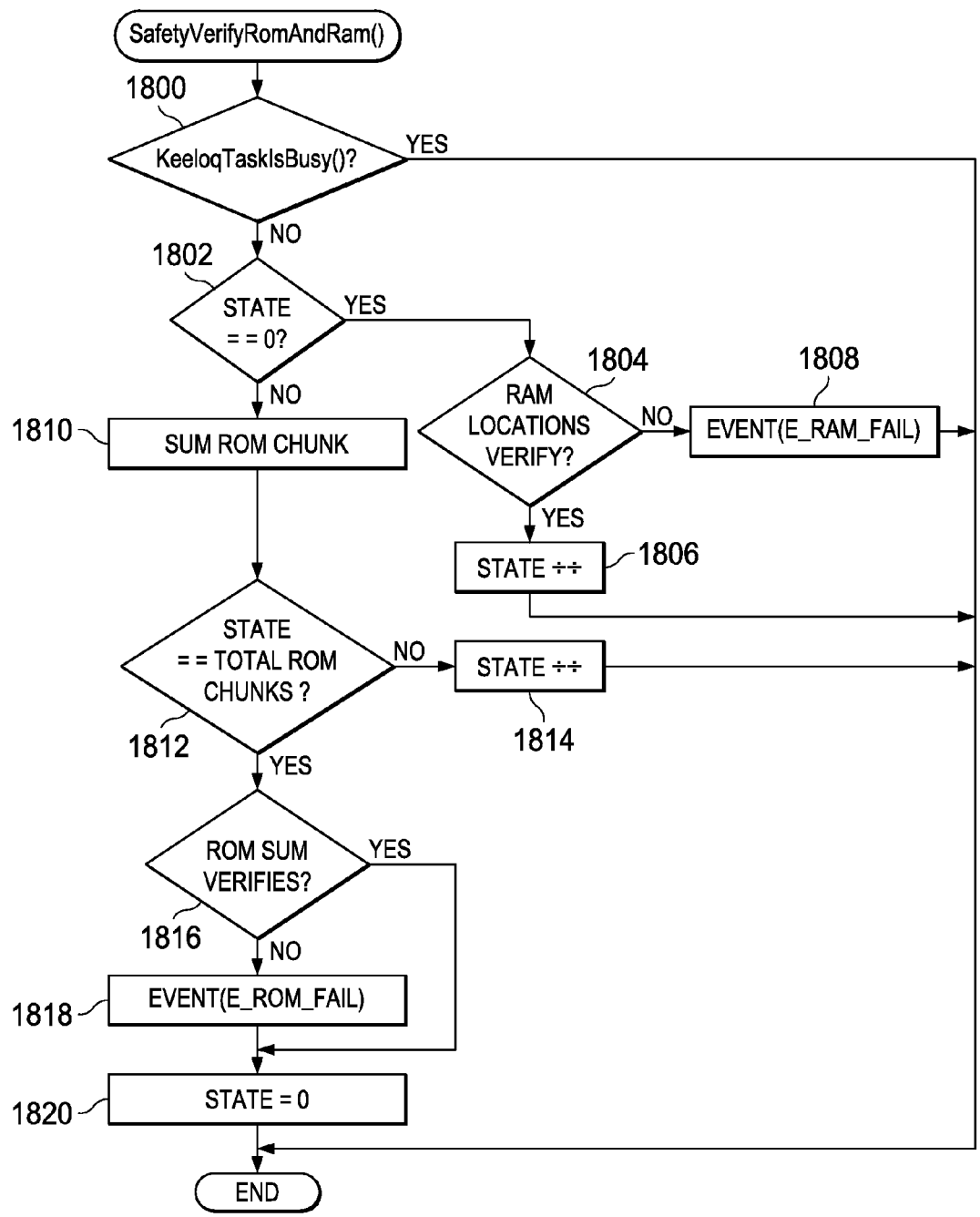
FIG. 18 is a flow diagram illustrating a ROM and RAM verification process carried out by the secondary microcontroller of the controller unit of FIG. 10.
Figure 19B:
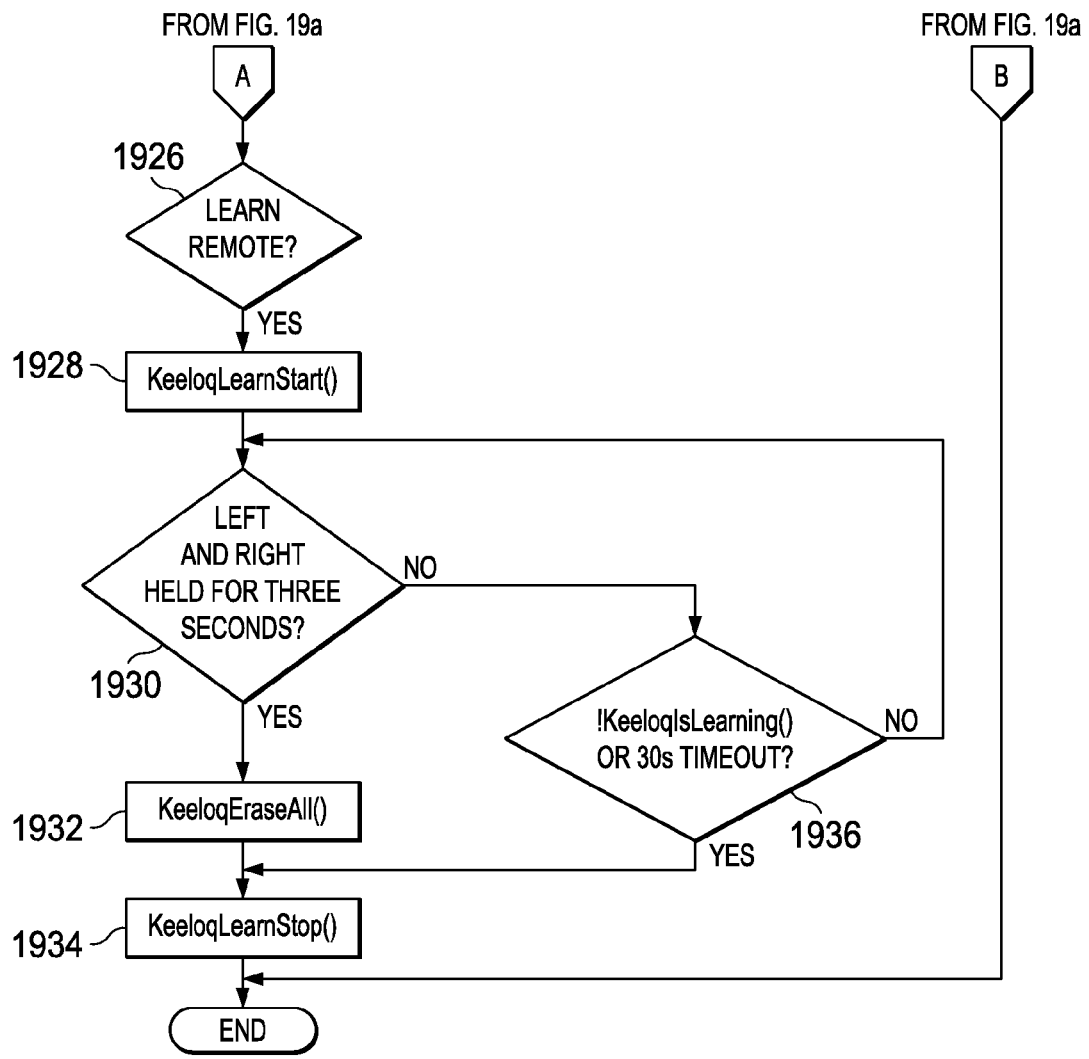

Turning now to FIG. 17, the motor safety task 1204 (see FIG. 12) can begin with verifying the ROM and RAM at step 1700. Turning briefly to FIG. 18, the process employed to verify the ROM and RAM can be skipped if a determination is made at step 1800 that a KEELOQ® task is busy. Otherwise, a value stored in a state variable can determine which one of three branch components of the process can be followed for this cycle. For example, when the state variable is determined to have a zero value at step 1802, then a determination can follow at step 1804 whether all of the RAM locations can be verified. If so, then the state variable can be incremented at step 1806, and step 1700 (see FIG. 17) thus completed for this cycle. If the RAM locations cannot be verified at step 1804, then a RAM failure event can be triggered at step 1808, thus completing step 1700 (see FIG. 17) for this cycle. However, if the state variable is determined to have a non-zero value at step 1802, then a sum can be taken of the total ROM chunks at step 1810. Then, if the number of ROM chunks summed in step 1810 is determined at step 1812 not to be equal to the value of the state variable, the state variable can be incremented at step 1814, completing step 1700 (see FIG. 17) for this cycle. Once the state variable has been incremented to a value that is determined at step 1812 to match the number of ROM chunks summed in step 1810, then a determination can be made at step 1816 whether the ROM sum can be verified. If not, then a ROM failure event can be triggered at step 1818. In either case, step 1816 can be followed by resetting the state variable value to zero before ending step 1700 (see FIG. 17) for this cycle.

Returning now to FIG. 17, following step 1700, a number of decisions can be made regarding whether to disable or enable a motor relay and/or a quick stop relay. With regard to these decisions, it should be understood that, in some embodiments, the quick stop relay is always disabled prior to a motor enable being activated. It should also be understood that, when the motor enable relay 1019 is deactivated, a quick stop delay counter can be set to one (e.g., fifty milliseconds), thus ensuring that the quick stop relay can activate fifty milliseconds after the motor enable relay 1019 is deactivated. Additionally, it should be understood that, before activating the motor enable, an AC power fail line can be checked. If it is high (active), a power failure event can be triggered, thus temporarily disabling the motor enable relay 1019. However, if the AC power fail line has gone low (inactive) and if a flag is set to indicate that the motor is enabled, then the motor enable relay 1019 can be activated again. Further, if the motor started on battery backup, the motor enable can be prevented from activating when power is returned during a run. Instead, the motor enable can stay deactivated to allow completion of the run on the battery backup, and the next run can return to normal operation. Yet further, if a flag is set to indicate a critical fault condition, then the quick stop relay can be prevented from activating, thus preventing dangerous conditions in the case of component failure. Finally, if the AC power fail line is active (high), the quick stop relay can only stay activated for two-hundred fifty milliseconds after disabling the motor, thus providing a quick stop in the event of a power failure, but avoiding needless drain of the battery backup, if connected.

An example procedure for carrying out step 1204 (see FIG. 12), following step 1700, can include reading the DC current at step 1702 and storing the value in a variable. Then, if an AC power fail is determined to be active at step 1704, and if it is determined at step 1706 that a battery backup unit is not connected, then a power fail event can be triggered at step 1708. However, if the battery backup unit is determined to be connected at step 1706, then the motor relay 1019 can be disabled at step 1710. Otherwise, if an AC power fail is not determined to be active at step 1704, then a determination can be made at step 1712 whether a flag is set to indicate that the motor is enabled. If not, then another determination can be made at step 1714 whether the quick stop delay counter is at a zero value. If so, then a further determination can be made at step 1716 whether a flag is set to indicate that a quick stop is enabled. If not, then the quick stop relay can be enabled at step 1718, and the quick stop flag can be set at step 1720 to indicate that the quick stop is enabled. Then the quick stop delay counter can be set equal to two at step 1722.

If the determination is made at step 1712 that the motor enabled flag was set to indicate that the motor was not enabled, then further determinations can be made at steps 1724-1728 whether the flag is set to indicate that a quick stop is enabled (i.e., step 1724), whether the quick stop delay counter is at a zero value (i.e., step 1726), and whether the AC power fail is active (i.e., step 1728). If the quick stop is not already enabled, the quick stop delay counter is at zero, and the AC power fail is not active, then the motor relay can be enabled at step 1730. On the other hand, if the quick stop was determined to be enabled at step 1724, but it is determined at step 1732 that the quick stop delay counter value has not yet reached zero, then the quick stop relay can be disabled at step 1734, and the quick stop flag can be reset at step 1736 to indicate that the quick stop is not enabled.

At the end of the example procedure for carrying out step 1204 (see FIG. 12), the quick stop delay counter and a counter recording the number of resets of the main microcontroller 1000 (FIG. 10) can be managed. For example, a determination can be made at step 1738 whether the quick stop delay counter value is greater than zero, and if so, this counter can be decremented at step 1740. Also, a determination can be made at step 1742 whether a number of cycles has passed for decrementing the counter storing the number of master resets. If so, then this counter can also be decremented at step 1744.

Figure 20:
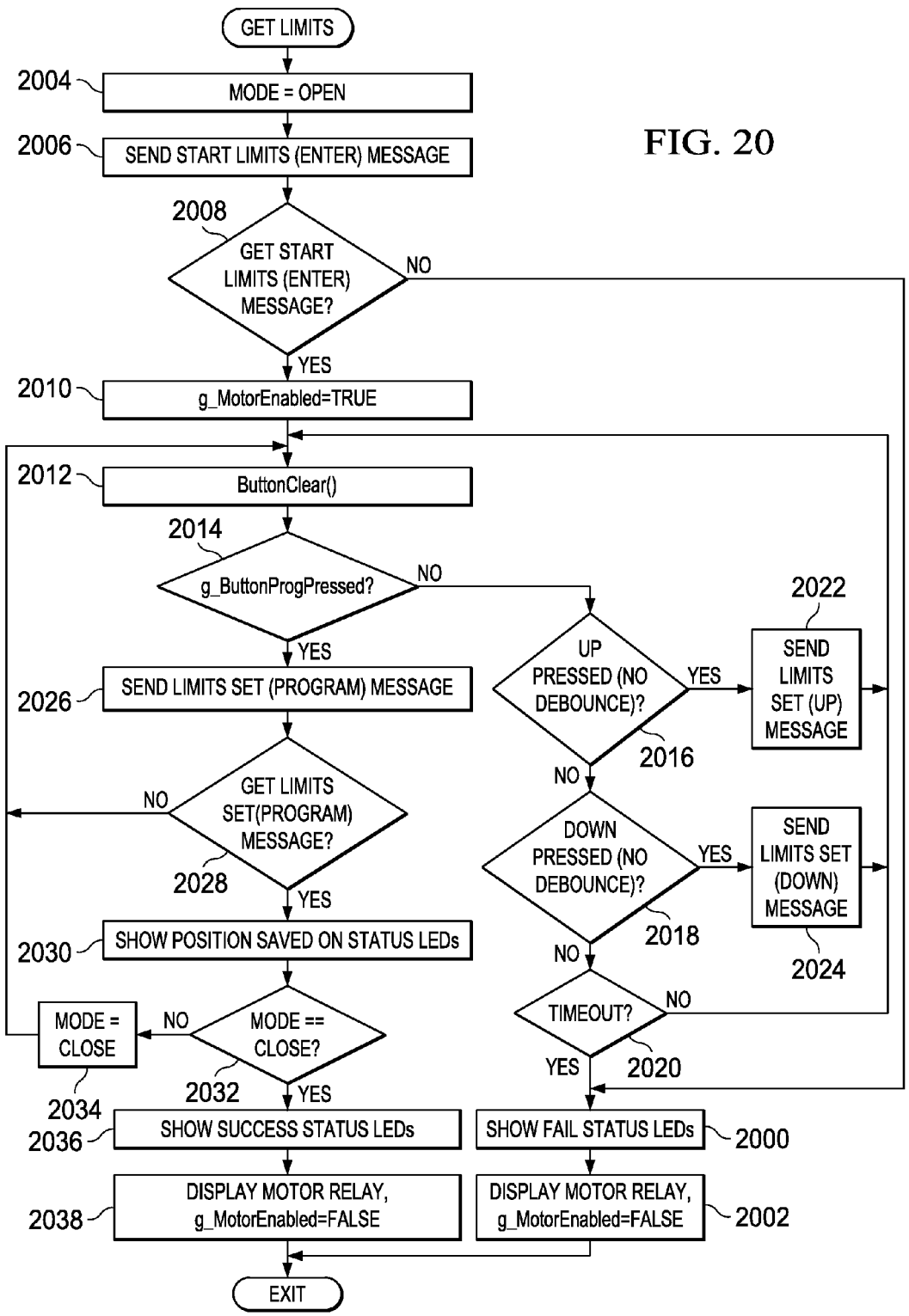
FIG. 20 is a flow diagram illustrating a limits setting procedure carried out by the secondary microcontroller of the controller unit of FIG. 10.

Turning now to FIG. 19 and FIG. 20, step 1206 (FIG. 12) can display faults on the LEDs 1040 (FIG. 10) and handle presses of up, down, and program buttons 1072 (see FIG. 10). Steps 1900-1912 can accomplish debounce of buttons, check button press duration, display faults, respond to calibration and setup menu selections, and, if the user selects to set limits, perform entry to limit setting procedures, wherein steps 2004-2038 can set mode variables and flags for setting of limits, check with the main microcontroller 1000 to determine if limit setting can be performed, and perform the limit setting procedure in coordination with the main microcontroller.

Motor Configuration Bits Define Performance Characteristics

If the user's choice is determined at step 1914 to be a choice to set the barrier (door) speed, then the speed choice can be obtained at step 1916, and a message can be queued at step 1918 for delivery over the expansion bus to indicate the chosen speed adjustment. In order to allow the user to adjust barrier speed, a matrix can be employed to offer some preset options based on the drive and motor types that are present. For example, this matrix can define "good", "better", and "best" versions of screw, belt, and chain drives with both AC and DC motors. Good/Better/Best features in accordance with this feature of the invention, is a difference in software. Thus, in some embodiments, one software image can be able to control all types of motors and drive systems in a family of barrier opener products having various types of drives and motors. Software can determine which type of unit it is operating from a value stored in EEPROM 1016 (FIG. 10), and this value can be programmed into the EEPROM 1016 at the factory. For example, in accordance with one of the unique features of the invention, motor configuration bits can be programmed into the EEPROM 1016 (see FIG. 10) at the factory, and these bits can be read any time the unit is powered up. Thus, they can identify for the software what type of unit it is to be (belt, chain, screw/good, better, best). This information indicates what level of performance is to be delivered from the motor. In this way, one software image can be able to control all operators regardless of variety in motor type or drive type.

The speed of the DC motor can depend, among other things, upon the characteristics of the operator. For example in the DC version, the software can determine what type of door (e.g., California one piece or sectional) is to be moved, appropriately regulating the speed depending upon this determination. Moreover, in the DC motor version, motor configuration bits can be programmed into the EEPROM 1016 at the factory, indicating whether the unit is a belt, chain, or screw drive type, or whether a "good", "better", or "best" performance is to be rendered. During the motor operation, the software can then take these factors into consideration, upon power up, and automatically identify and adjust the speed that the motor 1022 of that particular unit is to be driven. The software can then monitor the output of the opto-interrupter 1020 (see FIG. 10) to assure that the actual speed matches the goal speed; and if not, the software can adjust the PWM 1010, and therefore the motor speed, accordingly.

As explained above, the software can control a DC motor through the use of PWM circuitry 1010. The different units: chain, belt, and screw as good, better, and best, can provide different speeds for the homeowner. Examples of these speeds for a forty pound door are shown below in TABLE 2 and TABLE 3, wherein opening and closing speeds respectively are provided in inches per second.

TABLE 2

| | Chain | | Belt | | Screw | | |
|---|---|---|---|---|---|---|---|
| | Better | Best | Better | Best | Good | Better | Best |
| 1 (min) | 5.5 | 5.5 | 5.5 | 5.5 | 5.5 | 5.5 | 5.5 |
| 2 | 6.25 | 7 | 6.25 | 7 | 7 | 8.5 | 8.5 |
| 3 (max) | 7 | 8.5 | 7 | 8.5 | 10 | 10 | 12 |

TABLE 3

| | Chain | | Belt | | Screw | | |
|---|---|---|---|---|---|---|---|
| | Better | Best | Better | Best | Good | Better | Best |
| 1 (min) | 5.5 | 5.5 | 5.5 | 5.5 | 5.5 | 5.5 | 5.5 |
| 2 | 6.25 | 7 | 6.25 | 7 | 7 | 7 | 7 |
| 3 (max) | 7 | 8.5 | 7 | 8.5 | 7 | 8.5 | 8.5 |

When configuring the speed, a first LED can, for example, flash blue three times, and then indicate the current setting, and whether the opening speed limit or closing speed limit is being set. The actual speeds can depend on the good/better/best operator. In some instances, the DC units are capable of providing three speeds in the up direction and three speeds in the down direction, except for in the case of a good screw drive having an AC motor, in which case the AC motor only operates at a single speed based on the load. In any case, a default speed (e.g., five and five tenths inches per second) can be used when setting the limits and determining the force profile.

In step 1916 (FIG. 19A), the user can set the speed limit by pressing the up and down buttons until the desired value is reached, and then pressing the program button again. At this point, a second LED can, for example, flash blue three times as the first LED goes out. Then the user can set the closing speed limit by pressing the up and down buttons until the desired value is reached, and then pressing the program button again. If the speed limit set is successful, both LEDs can, for example, light blue for two seconds, and then go out. Otherwise they can light red in the same way to indicate an error.

Similarly, if the user's choice is determined at step 1920 to be a choice to set the barrier force sensitivity, then the force sensitivity threshold adjustment choice can be obtained at step 1922, and a message can be queued at step 1924 for delivery over the expansion bus to indicate the chosen force adjustment. However, if the user's choice is determined at step 1926 (FIG. 19B) to be a learn remote procedure, then a KEELOQ® learn start procedure can be initiated at step 1930 in which a KEELOQ® remote is learned. During this procedure, if both the up and down buttons are seen to be pressed and held down for a requisite period of time (e.g., three seconds) then all of the barrier operator remote devices 1038 (FIG. 10) stored in memory can be erased at step 1932, and the KEELOQ® learn procedure can be exited at step 1934. In some embodiments, the erasure process at step 1932 can leave in memory remote control devices that are accessories 1036 (see FIG. 10). Otherwise, if the up and down buttons are not held down, then a determination can be made at step 1936 whether there is any reason to stop the learn remote process at step 1934. For example, once a KEELOQ® remote is being learned, or in some embodiments, once a timeout condition is reached, then the KEELOQ® learn procedure can be exited at step 1934. At the end of any of the branches of this procedure, the LEDs 1040 can be operated to indicate success or failure of the operator user interface task as described above. A timeout can trigger a failure indication for all processes, while failure of the main microcontroller 1000 to acknowledge the limits, force, and speed settings can similarly trigger a failure indication as described above.

Figure 25:
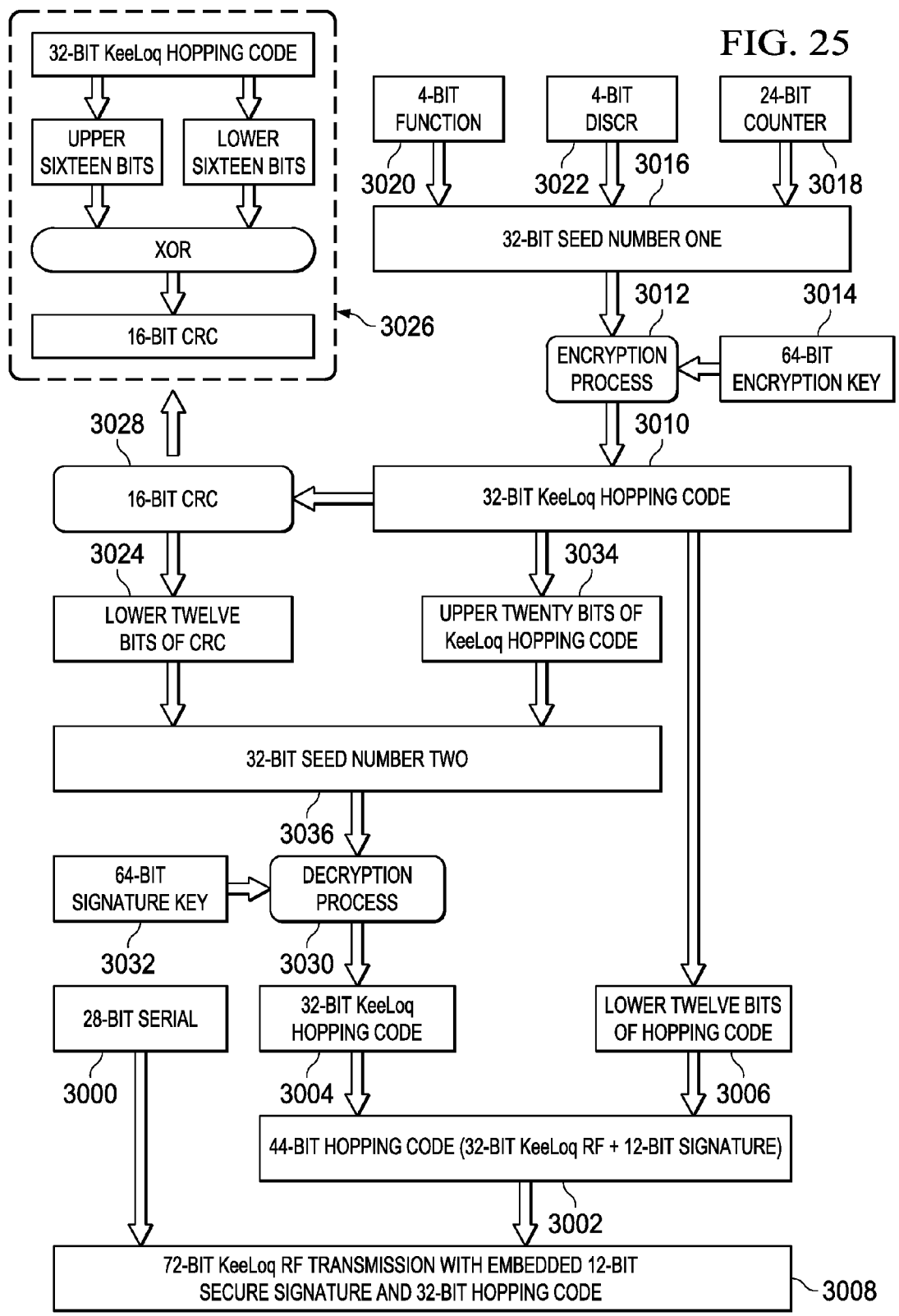
FIG. 25 is a flow diagram illustrating a novel method of encryption for use in the remotely controlled barrier operator system of FIG. 1.

Turning to FIG. 25, the barrier operator 20 can employ an INTELLICODE® II KEELOQ® encryption process mentioned above, and it can be employed instead of, or in addition to, previous KEELOQ® encryption schemes (e.g., INTELLICODE® I). Table 4 shows an example of bit information for this transmission, including a twenty-eight bit serial number 3000 (FIG. 25), and a forty-four bit hopping code 3002 composed of a thirty-two bit KEELOQ® hopping code 3004 and a twelve bit secure signature 3006. In this example, the total number of data transmission bits adds up to a total of seventy-two for one complete KEELOQ® code word 3008. Each codeword can contain both encrypted and unencrypted portions. The fixed code, or unencrypted portion, can contain the twenty-eight bit device serial number 3000. The encrypted portion can contain a combination of the twelve bit secure signature 3006 and the thirty-two bit KEELOQ® hopping code 3004.

TABLE 4

INTELLICODE ® II 72-bit KEELOQ ® Packet Format

| Unencrypted (28 bits) | Encrypted (44 bits) | | |
|---|---|---|---|
| Serial Number (28 bits) | Secure Signature (12 bits) | Func/Discr (8 bits) | Sync Counter (24 bits) |

Continuing with reference to FIG. 25, a thirty-two bit KEELOQ® hopping code data portion 3010 can be calculated using the traditional KEELOQ® thirty two bit block cipher encryption process 3012 that employs a sixty-four bit Encryption Key (EKEY) 3014 and a thirty-two bit seed 3016. Information contained within these first thirty-two bits can be the twenty-four bit synchronization counter 3018, a four bit function code 3020, and a four bit user defined discrimination bits 3022. The sixty-four bit EKEY 3014 used for each transmitter can be unique to that transmitter. The EKEY 3014 can be derived from a sixty-four bit manufacturer's code and the device's unique twenty-eight bit serial number. This sixty-four bit manufacturer's code can be changed regularly over time for added security.

The number of bits for the KEELOQ® synchronization counter 3018 can be increased from the previous sixteen bits to a new twenty-four bits to increase the number of counter combinations from sixty-five thousand, five-hundred thirty-six to sixteen million, seven-hundred seventy-seven thousand, two-hundred sixteen. This huge increase in the number of counter values can assist in preventing selective transmission capturing techniques. INTELLICODE® II transmitters can also be assigned a random starting counter value during production programming to better utilize this large counter space. An eight bit function/discrimination code can contain four bits of button information as well as four customer configurable constant bits. These bits can be used during KEELOQ® post decryption validation checks, and also ultimately identify what button or function action is required.

The addition of twelve additional encrypted data transmission bits, called the secure signature bits 3024, can be performed to increase the level of security of the overall KEELOQ® code hopping system without switching to another, more complicated encryption algorithm. Increasing the security of the security system generally requires the use of stronger encryption algorithms, the use of longer encryption keys or multiple encryption keys/calculations, or a combination of these methods. By using more than one sixty-four bit encryption key within the same system, any brute force type attack scheme needs to calculate more key combinations to attack the security of the system.

All block cipher algorithms, such as the one used with KEELOQ®, typically works on a fixed block size, thirty-two bits for the traditional KEELOQ® encryption algorithm, or one-hundred twenty-eight bits for AES. So, for example, to jump from one block cipher algorithm (e.g., KEELOQ®) to another (e.g., AES) requires a significant increase in the number of data bits that is needed, and this jump can also sometimes complicate existing RF designs, perhaps even requiring a redesign or a reduction in the overall system performance.

Various algorithmic schemes can be employed to utilize these additional signature bits, ranging from a simple CRC checksum calculation to more sophisticated secure hashing algorithms, such as SHA-1. To reduce the number of additional data bits needed, the INTELLICODE® II system can utilize a sixteen bit CRC calculation 3026 that performs an XOR of the upper and lower sixteen bits of the thirty-two bit KEELOQ® hopping code 3010 to obtain a sixteen bit CRC 3028. Then, instead of simply sending the result unencrypted, the encoder can obscure the result by using the KEELOQ® decryption process 3030, and a second sixty-four bit decryption key, called the signature key (SKEY) 3032. Intermingling of the upper twenty bits 3034 of the thirty-two bit KEELOQ® code hopping code 3010 with the twelve bit CRC 3024 to obtain a thirty-two bit seed 3036 for the decryption process 3030 can be employed to produce the thirty-two bit KEELOQ® hopping code 3004 in order to further increase security, for now two sixty-four bit keys need to be determined to allow the security system to work. The secure signature 3006 can also be the lower twelve bits of the hopping code 3010. The SKEY 3032 can be the same for all devices or unique to each device. Having them unique to each device can add additional security to each transmitter.

The foregoing description is of exemplary and preferred embodiments of a new and improved remote controlled barrier operator system and the methods for operation of same. The invention is not limited to the described examples or embodiments. Various alterations and modifications to the disclosed embodiments may be made without departing from the spirit and scope of the appended claims.

The invention claimed is:

1. A moveable barrier operator system, comprising:
software operable to control different types of drive assemblies and different types of motors;
an EEPROM having a data set stored thereon, the data set comprising identification information indicating one of the different types of drive assemblies and indicating one of the different types of the motors, and the for each combination of one of the drive assemblies and one of the motors, the data set including a plurality of motor operating speeds, wherein the one of the different types of drive assemblies is connected to one of the different types of motors and adapted to the be connected to a movable barrier for moving the movable barrier between open and closed positions;
a controller unit, under control of the software, operative to (i) retrieve the identification information from the EEPROM, (ii) receive one of the plurality of motor operating speeds selected by a user from the plurality of motor operating speeds for the one of the different types of motors, and (iii) operate the one of the different types of motors to move the one of the different types of drive assemblies for moving the movable barrier based on the one of the plurality of motor operating speeds selected by the user, the one of the different types of drive assemblies, and the one of the different types of motors; and a user interface operable to enable the user to select the one of the plurality of motor operating speeds for the one of the different types of motors.

2. The system of claim 1 wherein the one of the plurality of motor operating speeds selected by the user is one of an opening speed and a closing speed, the closing speed being separately selectable from the opening speed.

3. The system of claim 1 wherein the one of the motors is a direct current motor and is operated using pulse width modulation circuitry.

4. The system of claim 1 wherein the one of the motors is selected from the group consisting of a DC-motor and an AC-motor.

5. The system of claim 1 wherein the user interface is operable to display a plurality of movable barrier speeds which corresponds to the plurality of motor operating speeds for the one of the motors.

6. The system of claim 1 wherein the user interface includes at least one button and pressing the button selects the one of the plurality of motor operating speeds.

7. The system of claim 1 wherein the one of the of different types of drive assemblies is selected from the group consisting of a chain drive assembly, a screw drive assembly, and a belt drive assembly.

8. The system of claim 1 wherein the identification information further includes a type of the movable barrier.

9. The system of claim 8 wherein the type of the movable barrier is selected from the group consisting of a one-piece door and a sectional door.

10. A moveable barrier operator system, comprising:

software operable to control different types of drive assemblies and different types of motors;

a memory device having a data set stored therein, the data set comprising identification information indicating one of the different types of drive assemblies and one of the different types of motors, and plurality of motor operating speeds corresponding to the one of the drive assemblies and the one of the motors; and a controller unit, under control of the software, operative to (i) retrieve the identification information from the memory device, (ii) receive a selected one of the plurality of motor operating speeds, and (iii) operate the one of the different types of motors at the selected one of the motor operating speeds to move a movable barrier via the one of the drive assemblies.

11. The movable barrier operating system recited in claim 10, further including a user interface operable to enable a user to select the one of the plurality of motor operating speeds.

12. The movable barrier operating system recited in claim 10, in which the movable barrier is a garage door.

* * * * *